(12) United States Patent
King et al.

(10) Patent No.: US 6,586,898 B2
(45) Date of Patent: Jul. 1, 2003

(54) SYSTEMS AND METHODS OF ELECTRIC MOTOR CONTROL

(75) Inventors: Kenyon M. King, Alta Loma, CA (US); Kiet Binh To, Chino Hills, CA (US)

(73) Assignee: Magnon Engineering, Inc., Rancho Cucamonga, CA (US)

( * ) Notice: Subject to any disclaimer, the term of this patent is extended or adjusted under 35 U.S.C. 154(b) by 6 days.

(21) Appl. No.: 09/954,639

(22) Filed: Sep. 12, 2001

(65) Prior Publication Data

US 2002/0185926 A1 Dec. 12, 2002

Related U.S. Application Data

(60) Provisional application No. 60/287,908, filed on May 1, 2001.

(51) Int. Cl.$^7$ ................................................ H02K 23/00
(52) U.S. Cl. ........................ 318/254; 318/138; 318/439; 318/805; 318/798
(58) Field of Search ................................ 318/254, 138, 318/439, 805, 798

(56) References Cited

U.S. PATENT DOCUMENTS

| 4,136,308 | A |   | 1/1979  | King            |         |
|-----------|---|---|---------|-----------------|---------|
| 4,286,202 | A |   | 8/1981  | Clancy et al.   |         |
| 4,295,083 | A |   | 10/1981 | Leenhouts       |         |
| 4,329,635 | A |   | 5/1982  | Reilly          |         |
| RE31,229  | E |   | 5/1983  | King            |         |
| 4,477,757 | A |   | 10/1984 | Palombo et al.  |         |
| 4,484,124 | A |   | 11/1984 | White et al.    |         |
| 4,510,429 | A |   | 4/1985  | Squire          |         |
| 4,551,665 | A |   | 11/1985 | Antognini et al |         |
| 4,580,087 | A |   | 4/1986  | Bocca et al.    |         |
| 4,591,774 | A |   | 5/1986  | Ferris et al.   |         |
| 4,618,808 | A |   | 10/1986 | Ish-Shalom et al. |       |
| 4,658,194 | A | * | 4/1987  | Richter et al.  | 318/696 |
| 4,851,755 | A |   | 7/1989  | Fincher         |         |
| 4,928,043 | A |   | 5/1990  | Plunkett        |         |
| 5,256,943 | A |   | 10/1993 | German          |         |
| 5,543,696 | A |   | 8/1996  | Huggett et al.  |         |
| 5,783,916 | A |   | 7/1998  | Blackburn       |         |
| 5,859,520 | A | * | 1/1999  | Bourgeois et al. | 318/805 |
| 5,889,535 | A |   | 3/1999  | Jackson et al.  |         |
| 6,150,789 | A |   | 11/2000 | Pulford, Jr.    |         |

FOREIGN PATENT DOCUMENTS

WO      WO 00/22480      4/2000

* cited by examiner

*Primary Examiner*—Karen Masih

(57) ABSTRACT

Apparatus and methods that control motor power in an electric motor such as a stepper motor, advantageously allow improved open-loop motor performance, allow reduced motor hunting, detect stalls, detect out-of-synchronization errors, control and synchronize multiple motors, and can automatically configure motor parameters to provide a motor with a power and load combination that gives an optimized performance. In one embodiment, an EMF commutation circuit detects a rotor position at which to sequence the motor to provide an optimized performance from the motor. In another embodiment, pulse width modulation (PWM) controls power, and the embodiment measures the rotor position within a detent position. Particular embodiments of the invention utilize a motor controller adapted to respond to a commutation signal, a pulse, or both in conjunction with a sensing device, such as an EMF detector or an optical encoder.

98 Claims, 65 Drawing Sheets

EXTRACTING COMMUTATION
WHILE POWER CHOPPING

| FIG. 8A | FIG. 8B |

POWER CONTROL USING
COMMUTATION TIMER

ANTI-HUNTING USING COMMUTATION RATE OF CHANGE IN CLOSED LOOP MODE, TO ALTER SEQUENCE TIME, POSITIVE SLOPE SHOWN

ANTI HUNTING USING COMMUTATION TIMER
TO CONTROL MOTOR POWER OR TIMING OF
PULSE TIMER OR DELAY TIMER

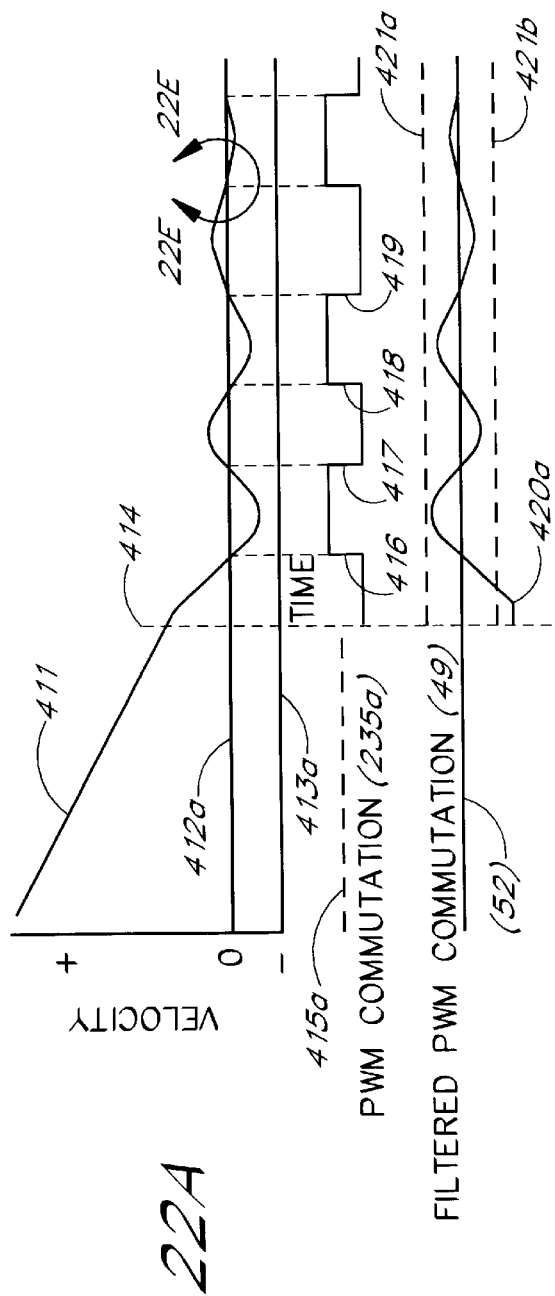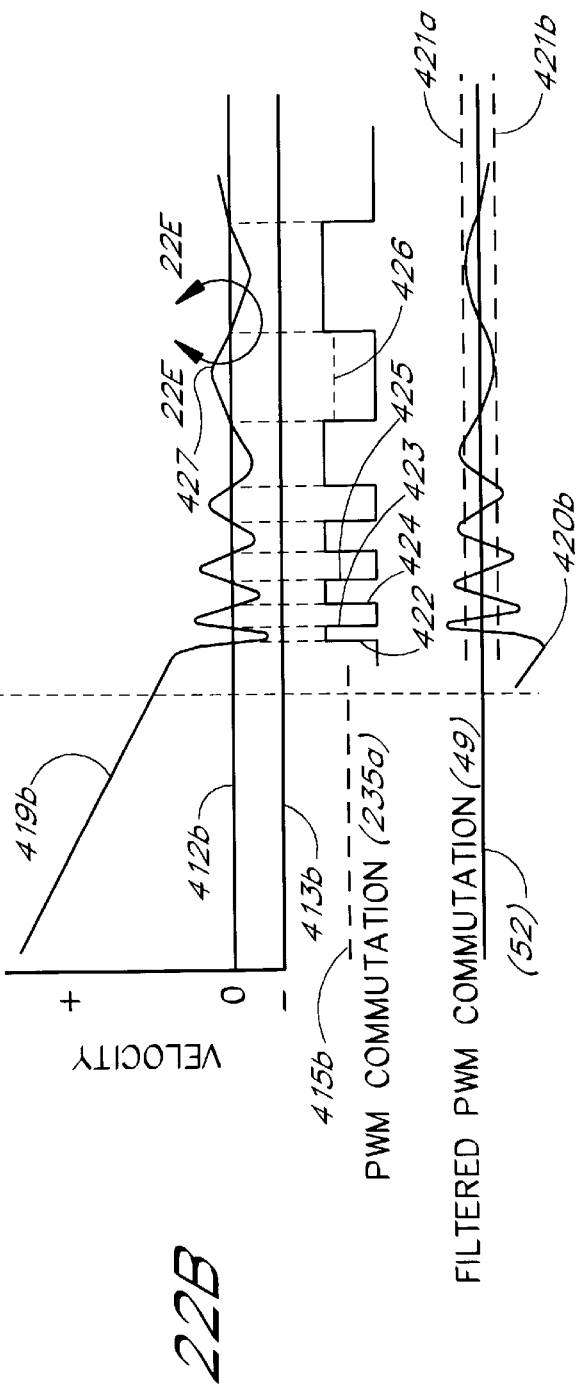
FIG. 22A
FIG. 22B

PWM ANTI-RINGING AND DETENT ZERO POSITIONING USING DIGITAL PWM COMMUTATION

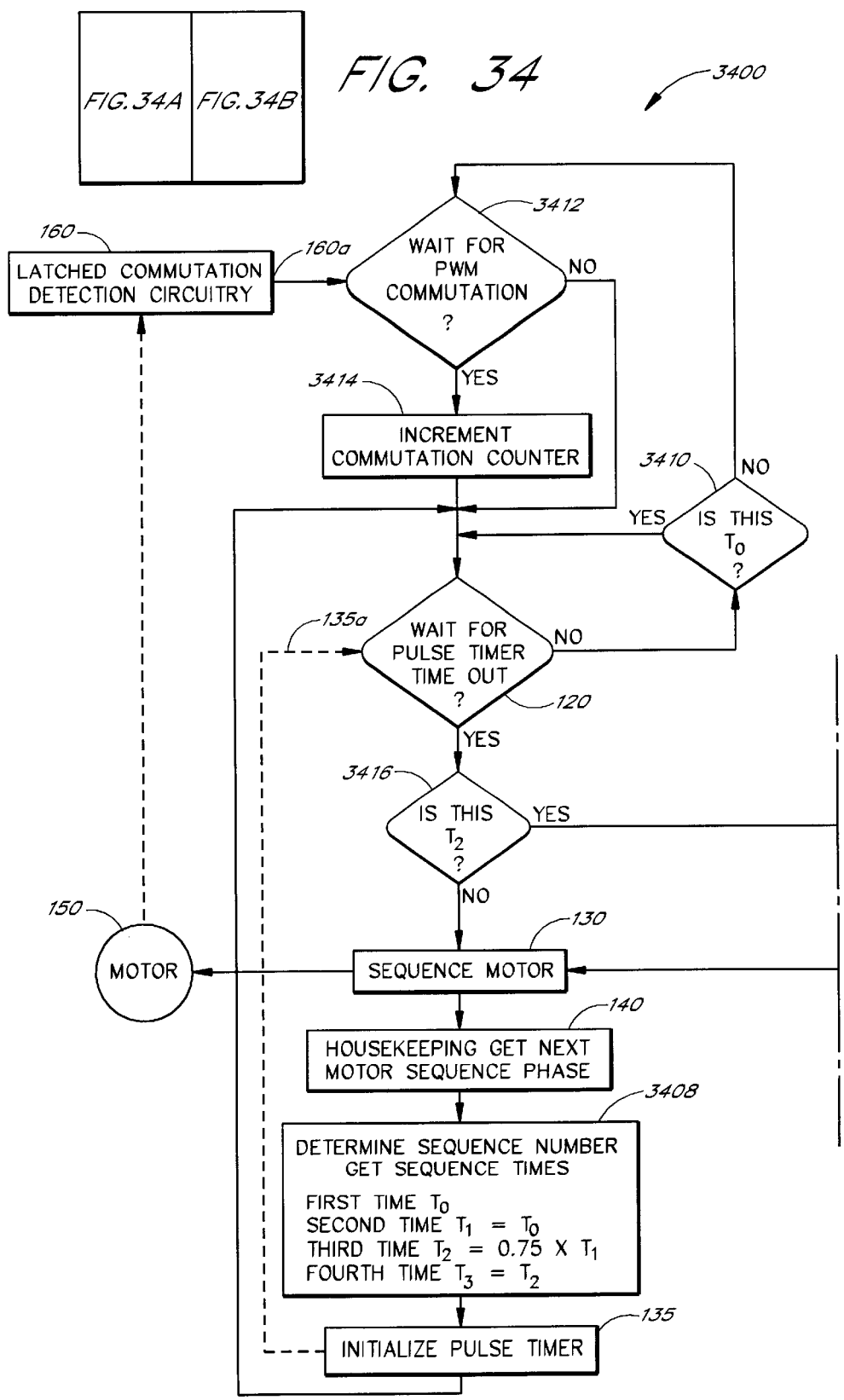

SYSTEMS AND METHODS OF ELECTRIC MOTOR CONTROL

This application claims the benefit under 35 U.S.C. § 119(e) of U.S. Provisional Application No. 60/287,908, filed May 1, 2001, the entirety of which is hereby incorporated by reference.

BACKGROUND OF THE INVENTION

1. Field of the Invention

The invention generally relates to motor control. In particular, the invention relates to brushless direct current (DC) motors with electronic commutation.

2. Description of the Related Art

A stepper motor is a type of electric motor that "steps" or rotates in an increment in response to an energizing of the stepper motor's windings. To rotate a stepper motor, the windings of the stepper motor are activated or energized in a sequence. In addition, stepper motors can generate a "holding torque" to maintain a particular position. These features make stepper motors quite useful in many automated control applications.

A stepper motor is controlled by a translator or sequencer circuit, which determines the sequence by which the windings of the stepper motor are energized for a particular desired motion. A driver circuit further buffers the control signals from the translator circuit and switches current to the windings of the stepper motor.

Conventional stepper motor drive circuits are inefficient. For example, where the stepper motor drive circuit applies a constant current at a relatively high voltage to windings of the stepper motor, the efficiency of the combination of the motor and the drive circuit can be as low as 10 percent. This low efficiency of prior drive circuits has limited the applicability of stepper motors to those applications where low efficiency can be tolerated. However, many mechanical systems, including those that are powered by batteries, remain relatively sensitive to inefficiency.

U.S. Pat. No. 4,136,308 to Kenyon M. King, entitled "Stepping Motor Control," discloses a control circuit for operating a stepper motor from a DC power source by switching current successively through four stator windings. U.S. Pat. No. 4,136,308 is incorporated by reference in its entirety. The switching time, as related to shaft position, is controlled by sensing the back electromotive force (EMF) in the stator coils of the stepper motor. The voltages across two windings of the stator at the transformer are used to generate a commutation pulse each time the EMFs from the stator windings are equal. The commutation pulses are then used to generate clock pulses for sequencing the stator windings. Because the phases of the EMF across two windings are used to generate the commutation signal, the commutation signal is virtually independent of sequence rate.

SUMMARY OF THE INVENTION

Embodiments of the present invention are directed to apparatus and methods that control motor power in an electric motor, such as a stepper motor. Embodiments of the invention advantageously allow improved open-loop motor performance, allow reduced motor hunting, detect stalls, detect out-of-synchronization errors, control and synchronize multiple motors, and can automatically configure the starting and stopping sequence times, for a given load, to optimize performance. One embodiment is an EMF commutation circuit that detects a rotor position at which to sequence the motor to provide an optimized performance from the motor. Another embodiment includes pulse width modulation (PWM) to control power, and the embodiment measures the rotor position within a detent position. Embodiments of the invention can utilize a motor controller adapted to respond to a commutation signal, a commutation pulse, or both in conjunction with a sensing device, such as an EMF detector or an optical encoder.

Embodiments of the present invention overcome the disadvantages of the low-efficiency of conventional motor drive processes by using a commutation signal from external rotary sensors or a commutation signal derived from the EMF to develop relatively efficient power control. The relatively efficient power control supplies a motor with enough power for the motor to drive its load and preferably, nothing more. The improved efficiency power control can also be combined with anti-hunting logic, which reduces the hunting of the motor by monitoring the rate of the commutation signal with respect to the sequencing. In another embodiment, an improved EMF commutation process develops a commutation signal at a relatively high sequence rate and a detent position sensor PWM commutation at a relatively low or stopped sequence rate. This enables the detection of a traversal of a detent position upon stopping, and allows an embodiment according to the present invention to ascertain the fastest deceleration slope it can use without inducing errors such as traversals. Further, embodiments of the present invention include routines that dampen oscillations after a stop. The use of the EMF commutation signal is also instrumental in the control and synchronization of multiple motors.

The techniques disclosed herein apply generally to a wide variety of electric motors including direct current (DC) motors, alternating current (AC) motors, stepper motors, variable reluctance (VR) motors, permanent magnet (PM) motors, multiple-phase motors (such as 2 or 3 phase motors), linear motors, and the like. It will be understood by one of ordinary skill in the art that an applicable motor should be appropriately wound or have a stator/rotor configuration that allows independent control of each motor winding.

The invention overcomes the disadvantages of the prior art by improving the efficiency of electric motors with commutation control. One embodiment of the invention uses an external rotor sensor or uses the EMF to provide a commutation signal, which controls the power applied to the motor such that the motor is driven with relatively little excess drive and at a relatively high efficiency.

One embodiment of the invention further includes advanced anti-hunting logic that advantageously reduces the hunting of the motor by monitoring the rate of change of the commutation signal with respect to the sequencing of the windings.

One embodiment of the invention is a technique to control a motor so that it stops relatively quickly. At relatively low sequence rates including zero, a detent position sensor (PWM commutation) is used to develop a commutation signal. At relatively high sequence rates, an improved EMF commutation process develops the commutation signal. Advantageously, embodiments of the invention can decelerate at relatively high speeds and can stop with a relatively high amount of damping so that the motor stops with relatively little oscillation or resonance. The improved EMF commutation process can also advantageously be used to control and to synchronize the motors of a system with multiple motors.

One embodiment of the invention includes an improved EMF detection technique that develops the EMF commutation signals when EMF is present. When the EMF is absent or low, a PWM commutation signal represents the imbalance in the charging currents of the two motors windings that are on. The imbalance represents the offset of the rotor from the rotor's zero detent position.

One embodiment includes an EMF commutation sensing process and a PWM commutation sensing process for bipolar wound motors.

Another embodiment includes a process that controls motor power based on the timing from sequencing to the arrival of the commutation signal.

Another embodiment includes a process that reduces motor hunting based on the rate of change of the commutation signal with respect to the sequencing of the motor.

Another embodiment includes a process that improves open loop performance using the commutation signals to control power, hunting and instantaneous sequence time.

Another embodiment includes a process that determines if a detent position has been traversed, using the improved PWM commutation detection technique.

Another embodiment includes a process that derives signals to actively dampen and to position a rotor within a detent position using the improved PWM commutation detection technique.

Another embodiment includes a process that automatically determines the motor parameters that provide each power/load/motor combination with the best performance.

Another embodiment includes a process that detects stalls, motor torque and out-of-synchronization errors and a corrects the detected errors.

Another embodiment according to the present invention includes a technique for controlling and synchronizing multiple motors.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

FIG. 22A illustrates the waveforms generated by a PWM commutation sensing circuit after the last open-loop stopping step is taken, and where the motor is holding position.

FIG. 22B illustrates the waveforms generated by a PWM commutation sensing circuit after the last open-loop stopping step is taken, and where the motor is not holding position.

DETAILED DESCRIPTION OF THE PREFERRED EMBODIMENTS

Figure 1:
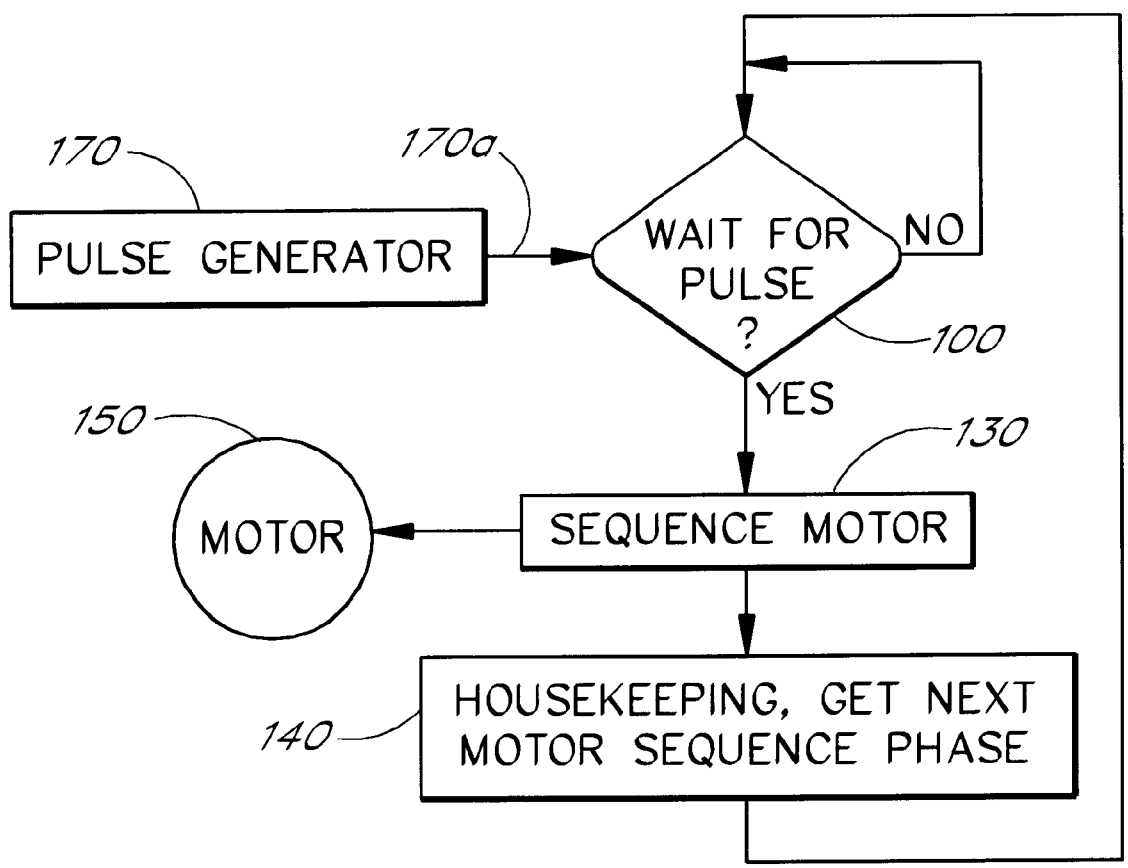
FIG. 1 illustrates a process of open-loop motor control.

Although this invention will be described in terms of certain preferred embodiments, other embodiments that are apparent to those of ordinary skill in the art, including embodiments which do not provide all of the benefits and features set forth herein, are also within the scope of this invention. Accordingly, the scope of the invention is defined only by reference to the appended claims.

Glossary of Terms

In general, unless otherwise indicated, the following terminology is used herein with the following meanings:

Back sequencing or dampening: Back sequencing is a technique of sequencing back to the previous sequence phase or turning on selected motor windings to dampen resonance, to reduce the torque produced by the motor, or both.

Commutation: A reference signal, which can be derived from a variety of sources such as mechanical, optical, and magnetic that indicates a position of a motor's rotor or armature. Commutation corresponds to an EMF phase angle. There are two distinct EMF degree commutation signals required for a four-phase motor: a 135-degree EMF angle signal, which sets the earliest sequencing limit, and the 315-degree EMF angle signal, which sets the latest sequencing limit. Sequencing between these limits changes the motors torque from maximum positive to maximum negative. Motors having 3 or 5 phase windings exhibit commutation signals at a different EMF phase angle and rotor position.

Damping: A reduction to the instantaneous oscillations, hunting, resonances, or ringing around a set sequence rate or detent position.

Delay signal: A signal that indicates a time period with which to delay the sequencing of a motor. The delay signal is initiated by an activation of a commutation signal.

Detent position: A rotor holding position, generally specified with one or two windings turned on. The torque required to jump out of a detent position is called the holding torque. The number of detent positions on a four-phase stepper motor, with fixed windings on, is equal to the number of steps available per revolution divided by four, e.g., a 200 steps per revolution stepper motor has 50 detent positions with fixed windings. In addition, each stepping sequence has a corresponding detent position, thus a 200 steps per revolution stepper motor has 200 detent positions in a full-step mode. Further, twice as many detent positions are available in a half-step mode so that a 200 fall-step stepper motor has 200 additional half-step detent positions.

Detent-Zero Position: The mid-point of a detent position.

EMF: Electromotive force.

Half and micro stepping: Sequencing the motor by controlling winding currents to provide a higher resolution than the full step resolution. A commutation signal derived from an external sensor, as opposed to a commutation signal derived from EMF sensing, can be used for commutation in almost any speed or step angle resolution. EMF sensing applies only to full step positions.

Hunting: An instantaneous oscillation of a motor's rotor around a fixed sequencing rate.

Input pulse signal: A series of pulses that is not associated with a motor's performance, but is used to control the sequencing of the motor. An input pulse signal is generally associated with a direction signal.

Phase: (a) When referred to in the context of EMF, phase represents the angular degree of the waveform. One cycle equals 360 degrees. (b) When referred to in the context of motor sequencing, phase represents the condition, i.e., on or off, of each motor winding. (c) When referred to in the context of a motor, phase represents the angular degrees of rotation. One revolution equals 360 degrees.

Pulse: The signal that controls a motor's sequencing.

Pulse generator: A source of pulses independent of a motor's orientation that is used to sequence the motor in the open-loop or pulse following modes.

Pulse timer: A pulse timer maintains a time period, which starts tracking an interval of time upon a sequencing of the motor during which commutation is not allowed to directly sequence the motor.

Pulse Width Modulation (PWM) commutation signal: A commutation signal detected while pulse width modulating a motor's current, and where the motor is either in a holding position or operating at relatively low sequence rates. The PWM commutation signal is a combination of the EMF and the rotor position in a detent position, as determined by detecting a change in a winding's inductance.

Sequencing: The act of switching current through a motor's windings so as to maintain a desired torque, whether positive or negative, in a specified direction. Sequencing is also referred to as stepping.

Timers: The timers described in the process can include at least two types: (a) a timer that resets to zero at a specified time, and measures time from the reset, and (b) a timer that loops continuously and never stops. In the later timer, event times are loaded from the timer and new times are added, e.g., if an event needs to occur at a known time from the current time, its time is added to the current time and loaded into a comparator. When a match occurs between the counter and the known time, the comparator activates the event. To measure a time period, the first time is subtracted from the second time.

Open Loop Versus Closed Loop Operation

An open loop operation or a closed loop operation as described herein relates to the switching of the current in the windings of a multiphase motor, defined as sequencing. An open loop controller sequences the motor without regard to its motion or rotor position. Thus, in open loop operation, a motor is limited in its performance, i.e., in getting too close to its limits, the motor could stall.

A closed loop motor's controller sequences the motor with knowledge of the rotor position. This allows a motor to be operated at its acceleration, speed and deceleration limits. Preferably, feedback of the motor's rotor position should represent a rotor position where sequencing can be referenced. The feedback should be aligned with the EMF developed in each winding of the motor. This allows torque to be directly related to EMF. Encoders, commonly used with DC servo systems, are one source of this feedback information. EMF sensing of multiphase motors is another source of this feedback information.

Pulse Following Mode

In the pulse following mode, the commutation signal is used to alter the instantaneous timing of the input pulses to control power, to reduce motor hunting and to increase motor performance and efficiency. The controls described in connection with closed loop mode can also be implemented in the pulse following mode.

In the pulse following mode, sequencing is synchronized to the input pulses. Except as described under anti-hunting operation, other aspects of power control for pulse following mode are the same as described in connection with motor power control.

DETAILED DESCRIPTION OF THE DRAWING FIGURES

In one embodiment, the power transistors used in the circuits described herein are metal-oxide semiconductor field-effect transistors (MOSFETs). However, it will be understood one of ordinary skill in the art that the illustrated circuits can also be implemented with other devices such as silicon bipolar transistors and insulated gate bipolar transistors (IGBTs).

FIG. 1 illustrates a process of open-loop motor control. It will be understood by one of ordinary skill in the art that the processes disclosed herein can be implemented serially or in parallel. The illustrated process loops continuously with an input pulse sequencing a motor 150 with a phase determined by a housekeeping step 140. Further details of the housekeeping step 140 are described later in connection with FIG. 26. A pulse generator 170 provides input pulses 170a to an input of a controller, which waits for the receipt of a pulse in a decision block 100. In one embodiment, the pulse sets an interrupt and the process responds to the receipt of the corresponding interrupt by activating an interrupt service routine. In another embodiment, the controller continuously loops back to the decision block 100 and polls to determine whether an input pulse has been received.

In response to the receipt of an input pulse, the process proceeds from the decision block 100 to a motor sequencing step 130. The motor sequencing step 130 applies the next motor phase sequence to the motor 150, which generates torque in response to the new sequence phase. The process advances from the motor sequencing step 130 to the housekeeping step 140 and obtains the next sequence phase.

In one embodiment, the housekeeping step 140 obtains the next sequence phase from a phase table to sustain motor performance. In the housekeeping step 140, various non-motor functions such as sequence counting, polling limit switches, communications, and other operations can be performed. The housekeeping step includes the items necessary to maintain the motor's operation. The time immediately after sequencing is a preferred time to perform all other necessary functions such as counting, calculations, stall sensing, setting or clearing flags, enabling or disabling interrupts, checking I/O for data and limit switches and preparing for the next sequence by retrieving the next motor phase from the phase table. The process then returns from the housekeeping step 140 to the decision block 100 for the next input pulse.

With open-loop control, the pulse generator 170 generates input pulses on its own and without feedback of the corresponding motor's motion or rotor position. Disadvantageously, open-loop control can result in a stall of the motor 150 when the motor 150 is operated too close to its performance limits.

With closed-loop control, a motor's controller sequences the motor 150 in response to an indication of the position of the motor's rotor. The feedback of the position of the rotor advantageously allows a motor to be operated near or at its acceleration limit, speed (rpm) limit, and deceleration limit. Preferably, the feedback of the motor's rotor position represents a rotor position where sequencing can be referenced, i.e., the feedback can be used for commutation. The feedback is preferably aligned with the EMF developed in each winding of the motor 150 because torque is directly related to EMF. In one embodiment, an encoder is used to generate the feedback signal. In another embodiment, sensing of the EMF from the motor 150 is used to generate the feedback signal.

Figure 2:
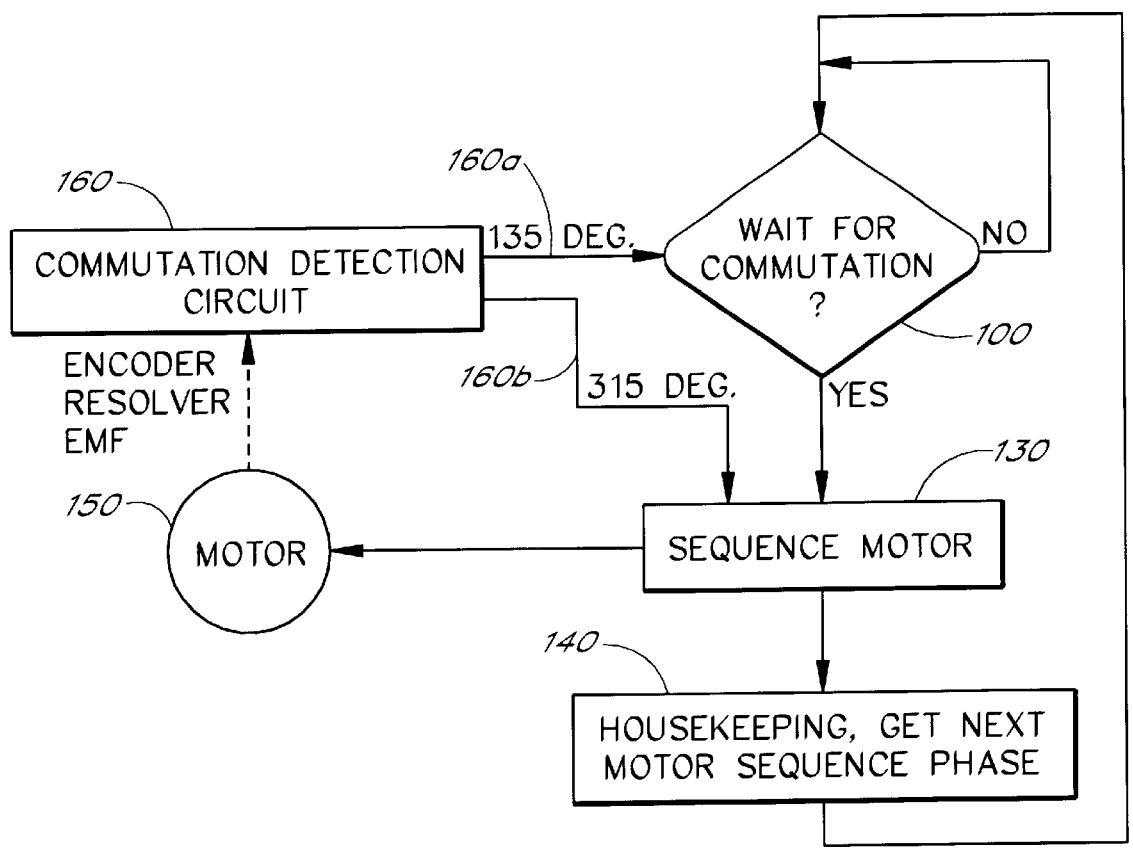
FIG. 2 illustrates a process of closed-loop mode control.

FIG. 2 illustrates a process of closed-loop mode control. The windings of a motor are continually activated in an appropriate sequence to rotate the motor 150. The process starts at the decision block 100, where the process waits for activation of a first commutation signal 160a. In one embodiment, the process receives the first commutation signal 160a as an interrupt. In another embodiment, the process polls an input terminal to detect an activation of the first commutation signal.

In response to a detection of the first commutation signal 160a, the process advances from the decision block 100 to the motor sequencing step 130. In the motor sequencing step 130, the process activates the appropriate windings to sequence the motor 150. The process advances from the motor sequencing step 130 to the housekeeping step 140. In the housekeeping step 140, the process determines which windings to activate for the next sequence. The process returns from the housekeeping step 140 to the decision block 100 and waits for the next activation of the first commutation signal 160a.

As the rotor of the motor 150 rotates, the position of the rotor changes and the change in position is detected by a commutation detection circuit 160. The commutation detection circuit 160 generates the first commutation signal 160a in response to an observation of a 135-degree EMF phase angle. The commutation detection circuit 160 generates a second commutation signal 160b if sequencing has not taken place and the motor 150 has rotated to a 315-degree EMF phase angle.

The illustrated commutation detection circuit 160 produces two outputs: a first commutation signal 160a at 135 EMF degrees, and a second commutation signal 160b at 315 EMF degrees. The first commutation signal 160a and the second commutation signal 160b are not activated at the same time, but are rather separated by 180 EMF degrees.

The commutation detection circuit 160 activates the second commutation signal 160b at 315 EMF degrees only if sequencing has not reset the first commutation signal 160a, which is activated at 135 EMF degrees. During normal operation, only the first commutation signal 160a is used because the first commutation signal 160a is reset when the motor 150 is sequenced. The commutation detection circuit 160, after resetting, waits for the 135 EMF degree from the new combination of windings.

After the 135 EMF degree signal is detected and the first commutation signal 160a is activated, the motor 150 should be sequenced. If for some reason the motor 150 is not sequenced after the detection of the 135 EMF degree signal, then the motor 150 continues to rotate and eventually reaches the 315 EMF degree phase angle, which is indicated by activation of the second commutation signal 160b. With activation of the second commutation signal 160b, the motor 150 should be sequenced immediately or the motor torque will be reduced, which can result in a loss of motor to pulse synchronization. The polarity of the first commutation signal 160a and the polarity of the second commutation signal 160b depends on the phase of the "on windings" and direction, as described in connection with a motor housekeeping function 141 and in connection with FIGS. 26 and 27.

It will be understood by one of ordinary skill in the art that the commutation detection circuit 160 can vary to accommodate the type of rotor position sensor used.

For example, the rotor position sensor can include an encoder circuit with logic to develop pulses and direction signals from a quadrature encoder signal. The pulses, the number per revolution of which depends upon the encoder's resolution, are divided to obtain a desired resolution. In another example, an EMF detection described in connection with U.S. Pat. No. 4,136,308 (incorporated by reference herein) is used for the commutation detection circuit 160. The EMF detection circuit described in connection with U.S. Pat. No. 4,136,308 sets a commutation signal with the detection of commutation and resets the commutation signal with the sequencing of the motor. Two outputs are generated for the commutation signal at 135-degrees EMF 160a, and 315-degrees EMF 160b. These two degrees for EMF, 135-degrees and 315-degrees, are not exact and can be varied for improved performance.

Where an encoder is used, there can again be two commutation outputs. In an example where a 4000-count encoder is used with a 200 step per revolution motor, every 20th count or pulse represents rotation corresponding to a full step. Thus, after an initial determination of a 135 EMF degree count, then every 20th pulse or step thereafter relative to the 135 EMF degree count represents another 135 EMF degree commutation signal assuming that the motor is sequenced upon the detection of the 135 EMF degree commutation signal. If the motor is not sequenced with the 135 EMF degree commutation signal, the 40th count or pulse from the encoder from detection of the last 135 EMF degree signal corresponds to 315 EMF degrees and the motor should be sequenced immediately.

Usually, the commutation detection circuit 160 generates only the first commutation signal 160a. However, if the motor 150 has not been sequenced and the 315-degree EMF phase angle is reached, the 315-degrees EMF 160b is initiated. Preferably, the motor sequencing step 130 is activated with a relatively high priority interrupt or is activated directly by the hardware so that the motor sequencing step 130 can be activated almost immediately without having to wait for a microprocessor to compute which windings to activate, to wait for the microprocessor to poll a status, and the like.

One technique to control the speed of a motor under closed-loop control is to vary the supply voltage applied to the motor. The speed of a motor under closed-loop control and without any restricted delays or other controls varies in accordance with the voltage applied to the motor, e.g., the higher the voltage applied, the higher the speed of the motor. A motor operates on the difference between the power supply voltage and the EMF amplitude. A higher supply voltage allows a higher EMF, and thus a higher speed.

Another technique to control the speed of a motor under closed-loop control is to vary the time, i.e., vary the EMF phase angle, between the receipt of the commutation signal and the actual sequencing of the motor. In one embodiment, the commutation detection circuit 160 is configured to provide the first commutation signal 160a at approximately a time at which a corresponding sequencing of the motor 150 would produce maximum torque. The introduction of a delay step between the receipt of the commutation signal and the actual sequencing of the motor 150 then reduces the motor's torque. By varying an amount of delay in the delay step, the amount of torque produced by the motor 150 can be varied and hence the speed of the motor 150 can be controlled as described later in connection with FIG. 6.

Figure 3:
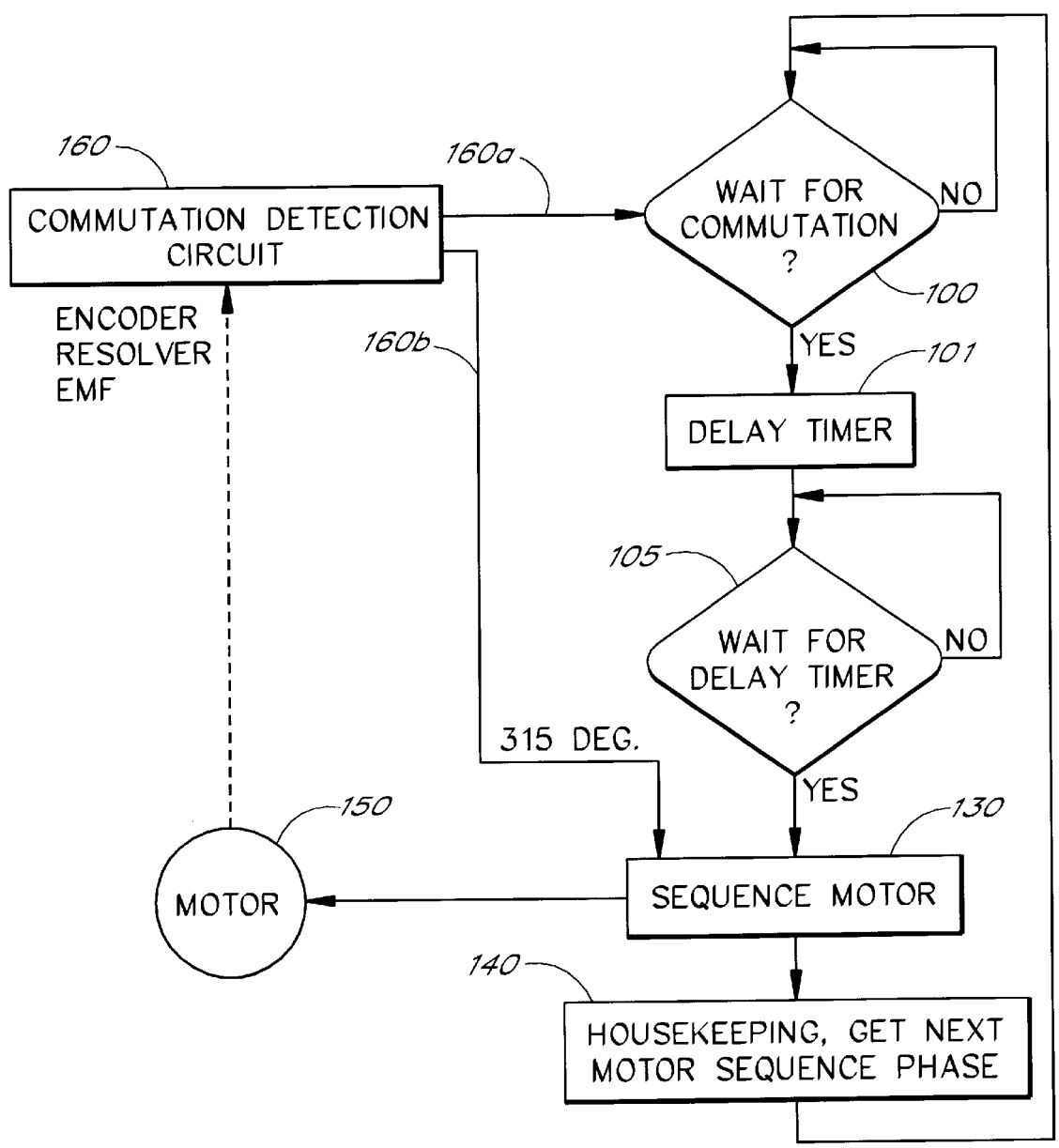
FIG. 3 illustrates a process of speed control by delaying a sequencing event for a time after detecting the commutation signal.

FIG. 3 illustrates a process of delayed commutation speed control. With reference to FIG. 3, the process includes a delay timer step 101 to vary the time between receipt of the first commutation signal 160a and an actual sequencing of the motor 150 with the motor sequencing step 130 in order to control an amount of torque produced by the motor.

As the motor 150 rotates, the commutation detection circuit 160 receives signals indicating the position of the rotor. The commutation detection circuit 160 activates the first commutation signal 160a in response to an observation of a first rotor position, and the commutation detection circuit 160 activates the second commutation signal 160b, if sequencing has not taken place, in response to an observation of a second rotor position. In one embodiment, the first rotor position and the second rotor position correspond to the 135-degree EMF phase angle and the 315-degree EMF phase angle. The first commutation signal 160a is provided as an input to the decision block 100, and the second commutation signal 160b is provided as an input to the motor sequencing step 130.

In the decision block 100, the process waits for activation from the first commutation signal 160a. The process can receive the first commutation signal 160a as an interrupt, or the process can poll an input terminal to detect an activation of the first commutation signal. In response to a receipt of the first commutation signal 160a, the process advances from the decision block 100 to the delay timer step 101. In the delay timer step 101, the process activates a timer that produces an output upon the expiration of a predetermined period of time. In one embodiment, the timer is internal to a microcontroller in a programmable timer controller. The process advances from the delay timer step 101 to a wait for delay timer step 105.

In the wait for delay timer step 105, the process waits for the expiration or the passage of the predetermined time. The predetermined time can also correspond to a predetermined delay in phase. In one embodiment, the process receives an indication of the expiration or the "timing out" of the predetermined time by receiving an interrupt triggered by a timer controller. When the "timing out" is detected, the process advances from the wait for delay timer step 105 to the motor sequencing step 130, which activates the appropriate windings of the motor 150. The process advances from the motor sequencing step 130 to the housekeeping step 140.

In the housekeeping step 140, the process obtains the next sequence, i.e., determines which windings to activate for the next sequence. The process returns to the decision block 100 to wait for the next activation of the first commutation signal 160a.

If sequencing has not taken place to reset the commutation detection circuit 160 when the 315 EMF degree position is reached, the second commutation signal 160b is activated. This process activates the motor sequencing step 130 without incurring the delay of the delay timer step 101 and the wait for delay timer step 105.

Higher sequencing rates are more affected by a given delay time than lower sequencing rates. At relatively high sequencing rates, a fixed delay time produces a nonlinear speed-torque curve. By contrast, configuring a delay timer to represent a fixed EMF phase angle produces a relatively linear speed-torque curve.

In another embodiment, the process includes an encoder to detect commutation. Instead of controlling the torque produced by the motor 150 by varying the delay time, the process shifts an encoder count for one period of the sequence to control the torque produced by the motor. Subsequent sequences can return to a normal count.

The performance of a motor controlled with delayed sequencing is similar to that of voltage control, i.e., motor speed varies with load. The larger the time delay or EMF phase delay, the flatter the speed versus torque curve.

Figure 4:
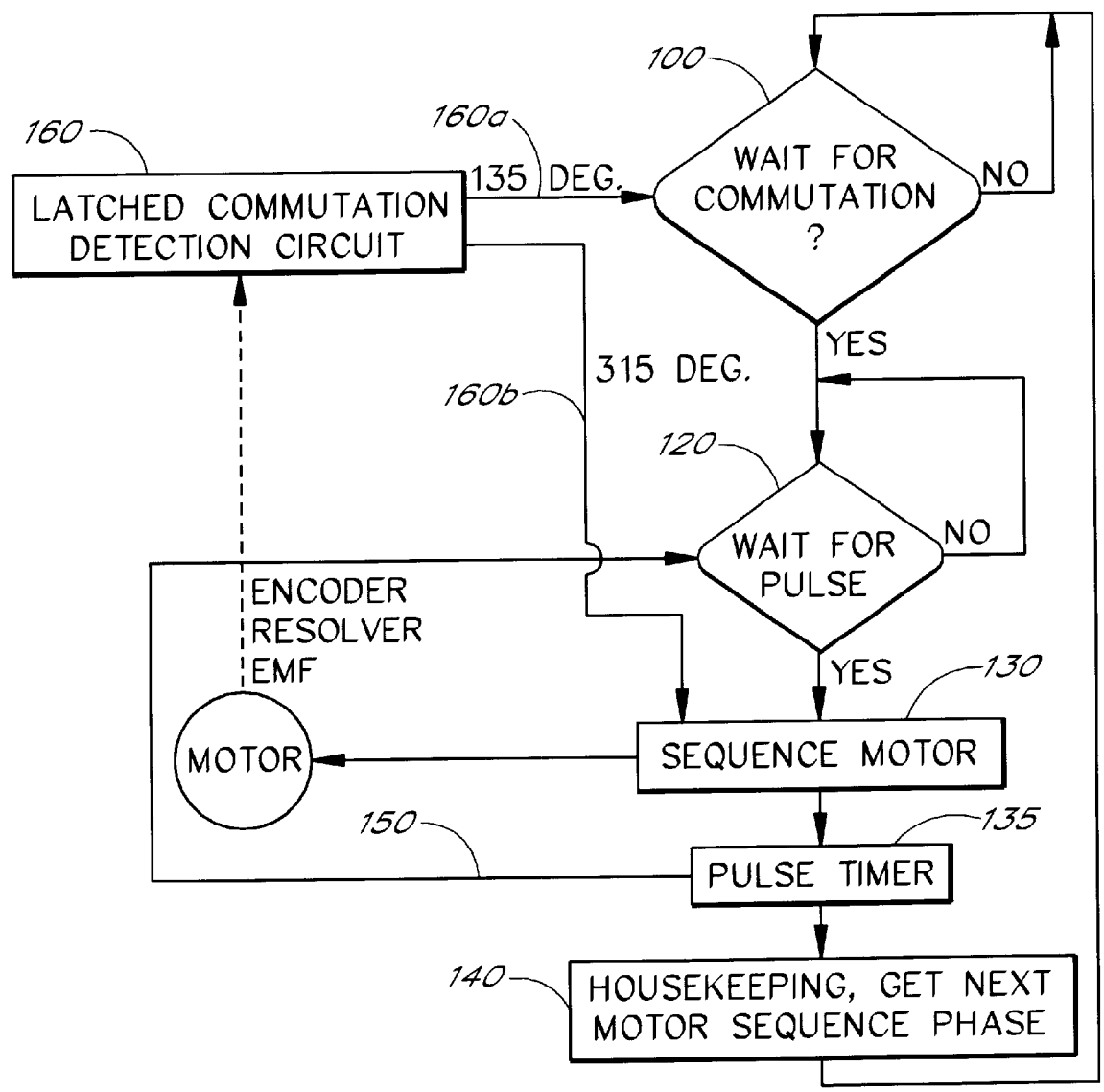
FIG. 4 illustrates a process of speed control that sets a minimum time for the next sequence.

FIG. 4 illustrates a process of controlling timing from sequence to sequence for motor speed control. The commutation detection circuit 160 latches the detected change in position and generates the first commutation signal 160a and, if the motor 150 is not sequenced, the second commutation signal 160b in response to an observation of a 135-degree EMF phase angle.

In the decision block 100, the process waits to detect the activation of the first commutation signal 160a. The process proceeds from the decision block 100 to a pulse timer wait step 120. In response to an indication of a time-out from a pulse timer step 135, the process advances from the pulse timer wait step 120 to the motor sequencing step 130. If the commutation detection circuit activates the second commutation signal 160b prior to the time-out from the pulse timer step 135, the process also advances to the motor sequencing step 130. Otherwise, the process returns to the pulse timer wait step 120 and waits for the time-out from the pulse timer step 135 to arrive.

In the motor sequencing step 130, the motor 150 is sequenced by activation of the appropriate windings. The process advances from the motor sequencing step 130 to the pulse timer step 135. In the pulse timer step 135, the process starts a timer, which maintains a minimum interval for which to wait before re-sequencing the motor 150 again. An output of the pulse timer step 135 is provided as an input to the pulse timer wait step 120. The process advances from the pulse timer step 135 to the housekeeping step 140. In the housekeeping step 140, the process obtains the next sequence, i.e., determines which windings to activate for the next sequence. The process returns from the housekeeping step 140 to the decision block 100 to await the next activation of the first commutation signal 160a.

In one embodiment, the motor sequencing step 130 resets the latches in the commutation detection circuit 160 to reset the first commutation signal 160a and, if sequencing has not taken place, the second commutation signal 160b. Where the pulse timer in the pulse timer step 135 has timed out prior to a new activation of the first commutation signal 160a, the process sequences the motor 150 virtually instantly when the first commutation signal 160a arrives. Where the pulse timer in the pulse timer step 135 has not timed out prior to the activation of the first commutation signal 160a, the sequencing rate of the motor 150 is then controlled by the pulse timer in the pulse timer step 135. This develops a relatively flat speed-to-torque curve over a sequence rate set by the pulse timer step 135, until the torque of the motor 150 cannot sustain the sequence rate. If the motor 150 cannot sustain or reach the speed set by the pulse timer 135, the pulse timer time-out occurs before the first commutation signal 160a, and the commutation rate is then determined by the activation of the first commutation signal 160a.

Figure 5:
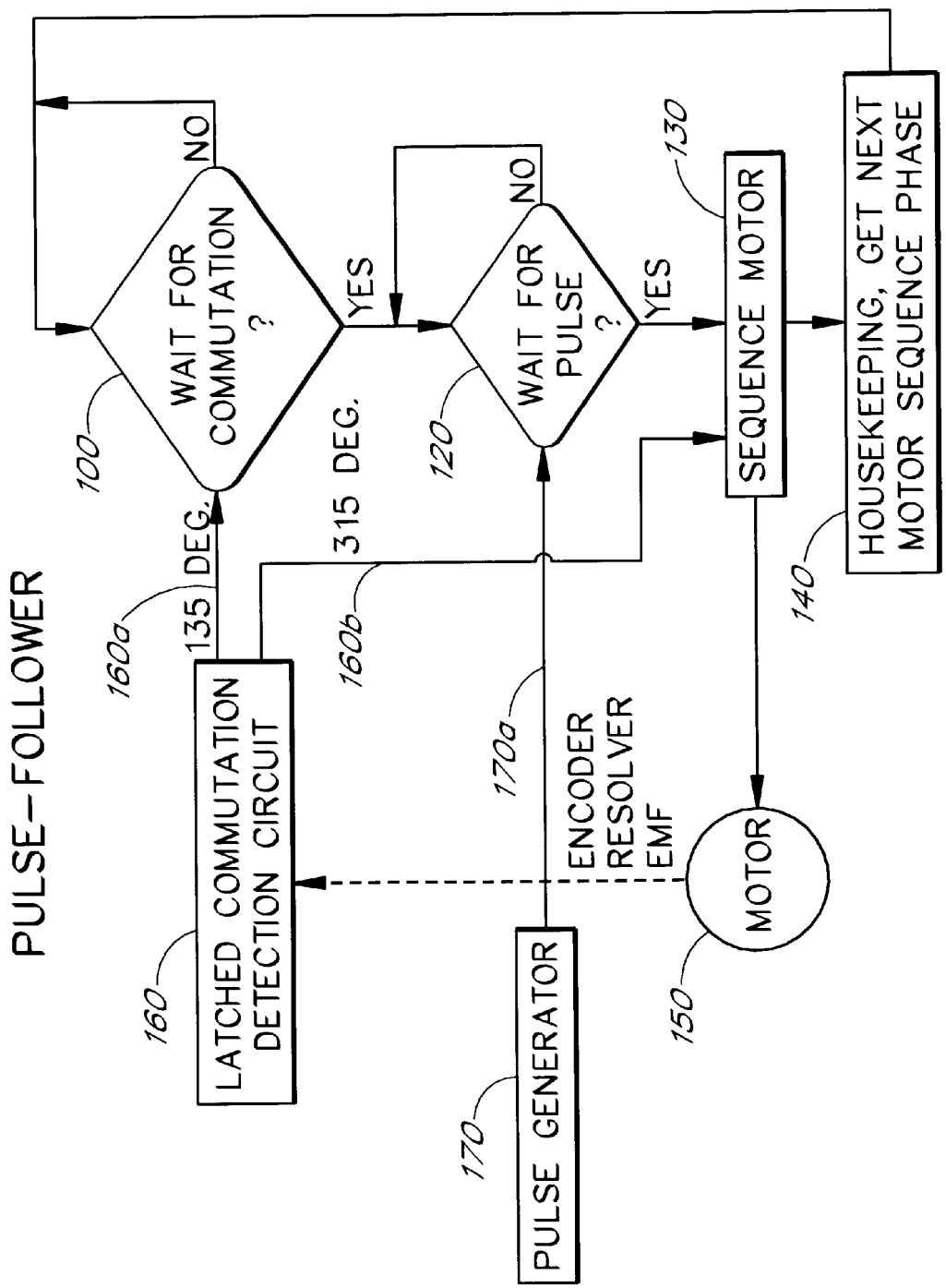
FIG. 5 illustrates a process of sequencing a motor in a closed-loop pulse following mode.

FIG. 5 illustrates a process of sequencing a motor in a pulse following mode. The pulse following mode advantageously can use the first commutation signal 160a to control power and to suppress hunting. The pulse following mode corresponds to an open-loop configuration with position feedback. The commutation detection circuit 160 generates the first commutation signal 160a in response to an observation of a 135-degree EMF phase angle, and, if sequencing has not taken place, generates the second commutation signal 160b and an observation of a 315-degree EMF phase angle.

In the decision block 100, the process waits to detect the activation of the first commutation signal 160a. The process proceeds from the decision block 100 to the pulse timer wait step 120. In response to an input pulse 170a from the pulse generator 170, the process advances from the pulse timer wait step 120 to the motor sequencing step 130. Also, when the commutation detection circuit activates the second commutation signal 160b prior to the time out from the pulse timer step 135, the process can advance to the motor sequencing step 130. Otherwise, the process returns to the pulse timer wait step 120 and waits for an activation of the input pulse 170a from the pulse generator 170.

In the motor sequencing step 130, the motor 150 is sequenced by activation of the appropriate windings. The process advances from the motor sequencing step 130 to the housekeeping step 140. In the housekeeping step 140, the process obtains the next sequence, i.e., determines which windings to activate for the next sequence. The process returns from the housekeeping step 140 to the decision block 100 to await the next activation of the first commutation signal 160a.

In the pulse following mode, the first commutation signal 160a is used to alter the instantaneous timing of the input pulses, to control power, and to reduce motor hunting. This use of the first commutation signal 160a increases both motor performance and efficiency. When a motor is hunting, sequencing is delayed until both the first commutation signal 160a has been activated and the corresponding input pulse 17a has arrived. When the input pulse 170a arrives and the first commutation signal 160a has not yet been detected in the decision block 100, the process waits for the first commutation signal 160a to arrive.

In one embodiment, the timing of the input pulses 170a from the pulse generator 170 remains relatively constant. Typically, the subsequent motor sequencing will eventually be delayed from the input pulses 170a. When the motor 150 is rapidly decelerating or is violently hunting, the motor 150 can rotate faster than the corresponding rate of input pulses 170a from the pulse generator. One embodiment immediately sequences the motor 150 to prevent a motor stall in response to a receipt of the second commutation signal 160b, which corresponds to a 315-degree EMF phase angle. In a closed-loop mode, a loss of synchronization between the motor controller and the motor 150 is self-correcting. However, a motor operating in the pulse following mode may stall unless the motor's speed while hunting makes up for the time changed to maintain an average pulse rate equal to the pulse generator's pulse rate.

One embodiment of a motor controller can automatically switch from the pulse following mode to a closed-loop mode as described in connection with FIG. 2, FIG. 3, and FIG. 4 in response to a detection that the motor 150 is not able to respond to the input pulses. In one embodiment, the number of input pulses 170*a* and the number activations of the first commutation signal 160*a* are counted and compared so that the controller can make up the difference at a later time.

Figure 6:
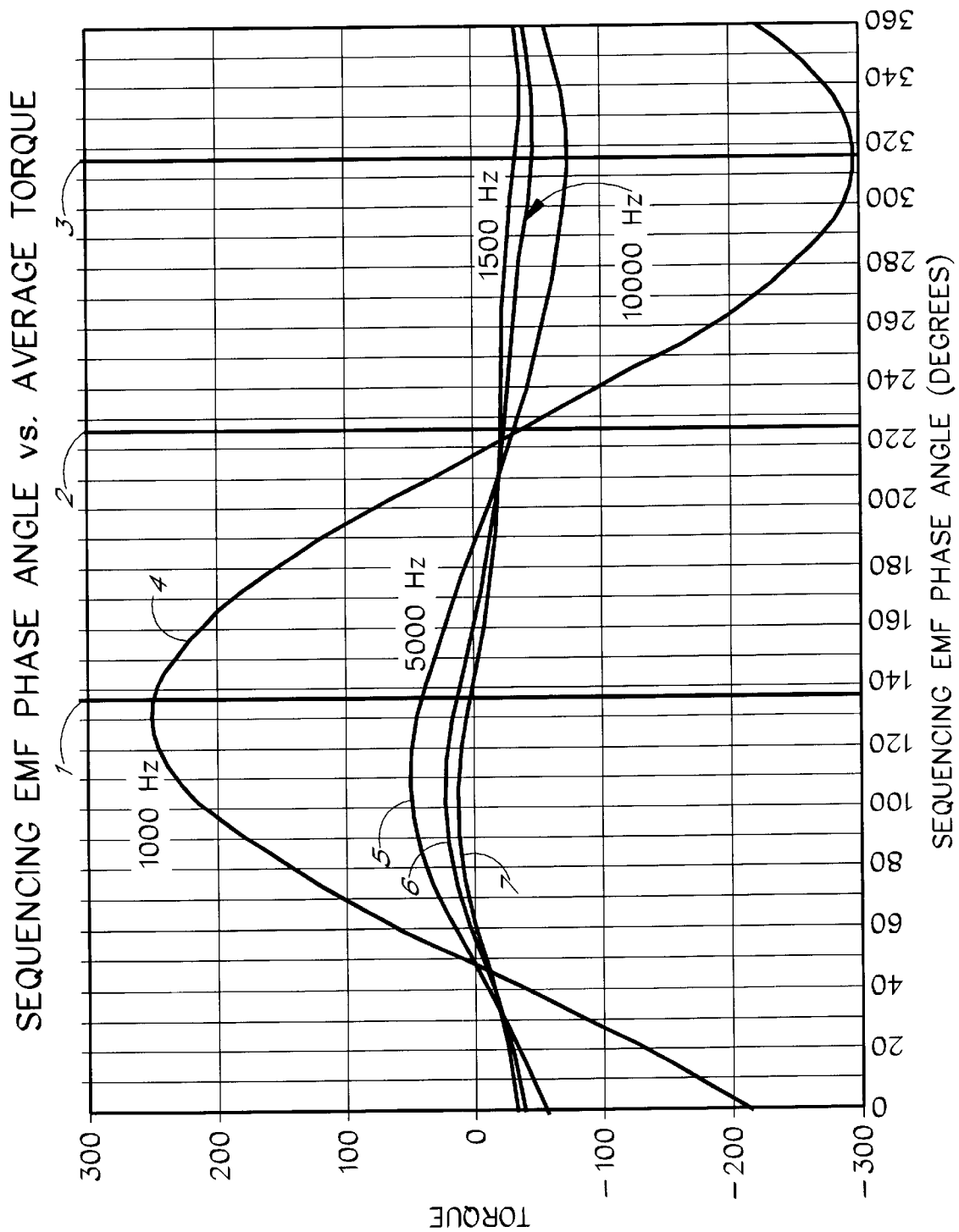
FIG. 6 illustrates the relationship between motor torque sequencing EMF phase angle and sequence rate.

FIG. 6 illustrates an example of an amount of torque produced by a motor with respect to sequencing EMF phase angle and sequence rate. The example shows the amount of torque generated by a four-phase unipolar stepper motor operating with a fixed voltage power source. A horizontal axis indicates the sequencing EMF phase angle, i.e., the angle at which the winding is turned on. In the full-step mode example illustrated in FIG. 6, each winding of the four-phase unipolar stepper motor is activated for about 180 degrees so that two of the four windings are always on and two of the four windings are always off, irrespective of the position of the rotor.

A vertical axis indicates an average amount of full-step torque. A first vertical line 1 indicates a 135-degree EMF phase angle. A third vertical line 3 indicates a 315-degree EMF phase angle. The region between the first vertical line 1 and the third vertical line 3 typically corresponds to the region where the motor 150 is sequenced in order to maintain synchronization with the input pulse. Although sequencing within the region defined by the first vertical line 1 and the third vertical line 3 may not always suffice, such sequencing forms the basis of closed-loop operation.

Preferably, a winding should not be sequenced until after the 135-degree EMF phase angle represented by the first vertical line 1. Preferably, the winding is sequenced before the 315-degree EMF phase angle represented by the third vertical line 3. Sequencing the winding at the 135-degree phase angle, as represented by the first vertical line 1, achieves near maximum positive torque. Sequencing the winding at the 315-degree phase angle, as represented by the third vertical line 3, produces near maximum negative torque. The desired torque from the motor 150, whether positive or negative, can be obtained by sequencing the motor 150 within the region. Sequencing outside of the region typically causes the motor 150 to stall. A second vertical line 2 indicates a sequence phase angle of about 225-degrees EMF or sequence delay of about 90-degrees EMF from the 135-degree line, which will generally provide zero or negative torque depending on the sequence rate. As shown in FIG. 6, a delay or phase shift from the 135 EMF degree line will develop torque from a maximum torque at 135 EMF degrees to a minimum torque at 315 EMF degrees.

At relatively high sequencing rates, the sequencing angles to maximum positive torque and to maximum negative torque advance due to time constants associated with the winding. A first waveform 4, a second waveform 5, a third waveform 6, and a fourth waveform 7, correspond to an amount of torque produced at a 1,000 Hertz (Hz) sequence rate, a 5,000 Hz sequence rate, a 10,000 Hz sequence rate, and a 15,000 Hz sequence rate, respectively. The first waveform, the second waveform 5, the third waveform 6, and the fourth waveform 7 graphically illustrate that as the sequence rate increases, the sequencing angle that provides maximum positive torque advances. For example, the sequencing angle for peak torque of the illustrated motor at 15,000 Hz is about 100 degrees EMF, which is advanced from 130 degrees EMF for maximum torque at 1,000 Hz. Advancing the sequencing rate allows the illustrated motor to operate as a relatively high-speed spindle motor with light loads. During normal sequencing, the sequencing occurs between about 135-degrees degrees and an EMF phase angle that develops sufficient torque to drive the applied load. To apply a decelerated force or to act as a generator, the sequence phase angle can extend to the 315-degree EMF sequence phase angle as illustrated by the third vertical line 3.

The paragraphs that follow describe two such techniques: EMF phase commutation and encoder commutation. However, it will be understood by one of ordinary skill in the art that embodiments of the invention can use a broad variety of commutation techniques. Any other angular or linear position sensor can be used with commensurate commutation detection circuit modifications.

Advantages of using EMF commutation sensing include relatively low cost, relatively high reliability, self-alignment, self-correction, and relatively high resolution of commutation sensing. Sensing the EMF signal to generate a commutation signal is possible on 3-phase, 4-phase, or 5-phase motors of both linear and rotating design. The motor 150 can be of variable reluctance design, of permanent magnet design, of hybrid design, and can be either linear or rotating in design, i.e., any motor where two or more windings are either on or off. Using two or more windings for EMF detection of phases allows the detection of phase over a relatively large range of speed (rpm) and EMF amplitude.

One EMF detection technique is described in U.S. Pat. No. 4,136,308 (incorporated by reference herein). The disclosure of U.S. Pat. No. 4,136,308 describes an EMF detection technique with a transformer or simulated circuit (a difference amplifier) to eliminate the charging current of the inductance (L/R current) from the EMF signal. A typical stepper motor has a winding time constant of about 1 to 2 milliseconds. For switching periods near to or faster than the winding time constant, the charging current is nearly linear. Thus, subtracting the L/R current from the two quadrature "on" windings eliminates the charging current from the resulting waveform. In this process, the resulting EMF signal is shifted 45 degrees. The use of a transformer or a circuit simulating a transformer, such as a difference amplifier, a differentiator, or an integrator circuit, shifts the resulting waveform by about 90 degrees, thereby allowing the detection of the EMF phase angle of 135 degrees at one zero crossover (motor phase and direction dependent) and the detection of the EMF phase angle of 315 degrees at the other zero crossover of the resulting waveform.

One disadvantage of using EMF to trigger sequencing is that a motor needs to be moving fast enough so that the subtraction of the nonlinear L/R charging currents from the two "on" windings does not cause a relatively large apparent EMF phase shift. The use of several open-loop starting steps to obtain speed is generally required before using the commutation signal. The zero crossover of the EMF commutation signal can be shifted by a phase lead/lag circuit, or by injecting a signal to alter the zero crossover point of the analog commutation signal. The control of the commutation and sequencing takes place during or in between each pulse, thereby providing a completely different control than servoing power or controlling input pulse rate.

An optical encoder can also be used to derive a desired EMF phase angle for commutating a motor. The optical encoder technique has certain advantages over sensing the EMF to derive a commutation signal. One advantage is that the optical encoder technique is usable at relatively low motor speeds. Another advantage is that the commutation is not masked by the flyback voltage or by the switching currents generated by the switching of the motor windings at relatively high speeds and relatively high currents. However, the optical encoder technique typically has certain disadvantages such as a relatively high cost, the addition of wiring for the optical encoder, a larger physical size to accommodate the optical encoder, a more limited temperature range, and a more limited commutation resolution.

One circuit that interfaces with an optical encoder is a circuit that takes the quadrature inputs from an encoder to produce pulses and direction signals that correspond to each cross of the quadrature encoder output. A microprocessor or an external circuit relates to the commutation location by counting the pulses.

To eliminate critical alignment and to obtain the resolution required to alter the turn-on EMF phase angle, one embodiment of the invention uses a high line count encoder as described in U.S. Pat. No. 5,256,943, which is incorporated by reference herein. For example, a 1000-line incremental encoder can be coupled to a 200 steps per revolution stepper motor. The quadrature output of the encoder develops 4000 steps per revolution or 20 steps per motor sequence. This corresponds to a resolution of about 4.5 degrees of EMF phase angle or 0.09 degrees of rotor rotation.

One embodiment determines a 135-degree reference (commutation) by applying a relatively large current to the two "on" windings of a non-rotating motor (full step mode), waiting for oscillations to stop or diminish, and using this encode position as a reference for the 135-degree commutation point. In one embodiment, the motor 150 is operated to generate a first starting step, then a second step at an encoder count between 5 and 10, and then sequencing on every 20th step from the initial reference commutation position.

An optimum EMF phase angle for operating other motors, such as 3-phase motors or multi-phase motors can be found using similar techniques. An optimum commutation EMF phase angle also varies in accordance with the number of poles, the number of windings, the time constant, the EMF constant and the motor's speed.

In one embodiment, the 135-degree EMF phase angle and the 315-degree EMF phase angles are preferred for a commutation signal for a two-phase or for a four-phase motor. The 135-degree EMF phase angle and the 315-degree EMF phase angles are relatively easily and relatively reliably detected by sensing and comparing the EMF from the two "on" windings. Normal undelayed sequencing takes place at approximately 135-degrees EMF. As sequencing is delayed or advanced from the commutation signal at 135-degrees EMF, motor torque will range from near maximum positive torque from a sequence EMF phase angle of 100 to about 135 degrees EMF to negative torque at about 315 degrees EMF.

Figure 7:
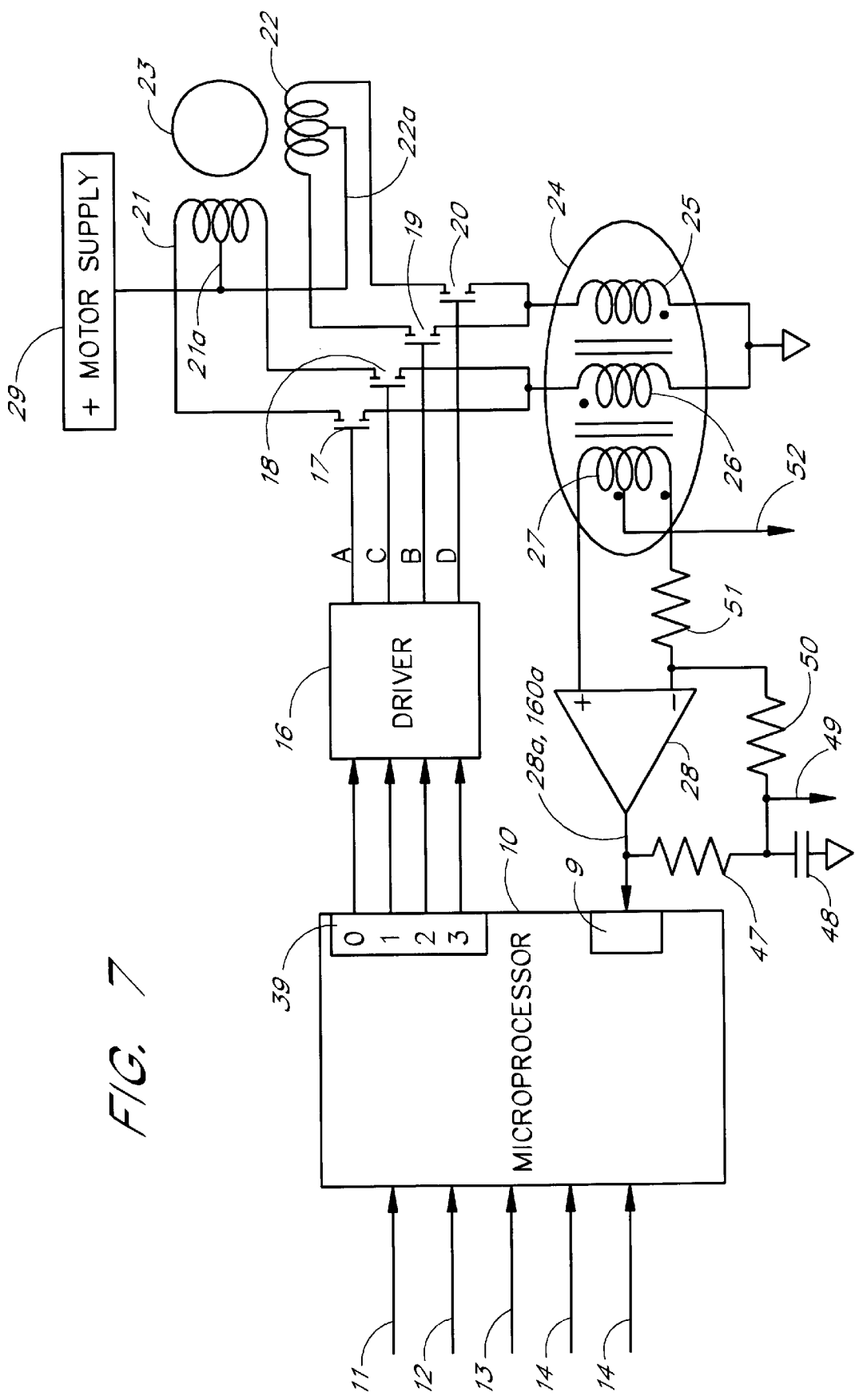
FIG. 7 illustrates a schematic diagram of one embodiment according to the invention of PWM control with a motor's winding inductance.
Figure 9:
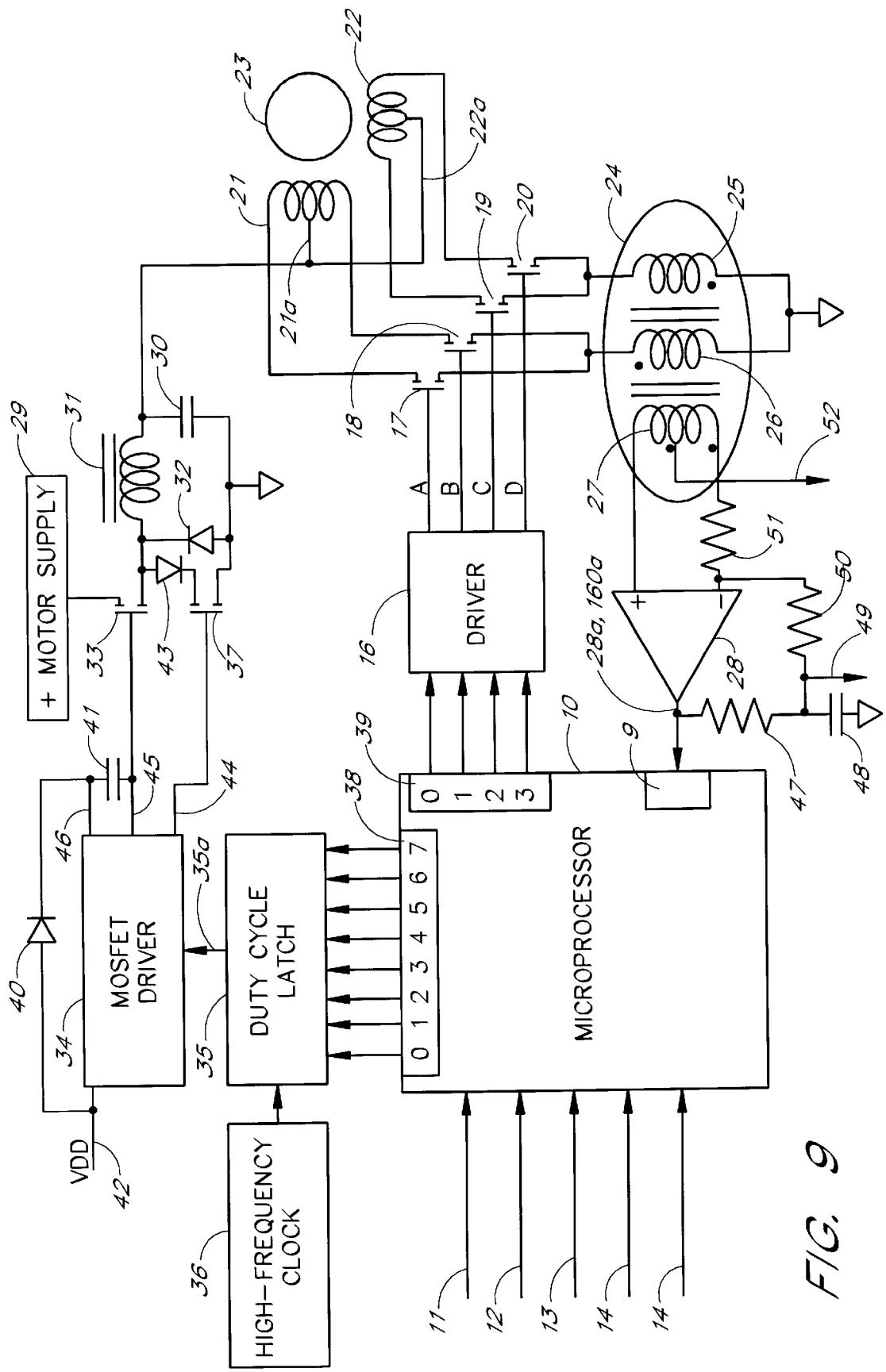
FIG. 9 is a schematic diagram according to another embodiment of the invention that includes a controlled direct current (DC) power supply.

FIG. 7 and FIG. 9 describe two methods for controlling a motor's power. FIG. 7 illustrates PWM control using a motor's winding inductance for filtering. FIG. 9 illustrates a controlled power supply using high frequency chopping and filters to derive a variable DC bias for the motor supply. In the embodiment illustrated in FIG. 7, a motor power supply 29 is of fixed voltage. To effectively reduce the motor's power, a microprocessor 10 uses PWM chopping of the motor's drive current. This type of power control has a limitation in that the PWM chopping causes hysteresis heating of the motor. To reduce this heating, the motor's current is kept relatively low and the PWM chopping frequency is also kept relatively low to reduce hysteresis heating. However, the PWM chopping frequency is preferably maintained beyond the audible frequency range. In the illustrated embodiment, schematic shows the details of the EMF commutation circuit that also senses the zero detent offset defined as PWM commutation.

The microprocessor 10 includes 5 main external control inputs: a pulse input 11, a direction input 12, a positive (+) limit switch input 13, a negative (−) limit switch input 14, and a communications input 15. The pulse input 11 is used in the pulse following mode to receive pulses from a pulse generator. The direction input 12 specifies the direction of the motor's rotation when a motor 23 is operated in the pulse following mode. In one embodiment, the positive limit switch input 13 and the negative limit switch input 14 stop the motor 23 when activated. The communications input 15, which is illustrated by a single line, can correspond to multiple lines and can be used to receive and to transmit commands and data to a host in a closed-loop mode.

In one embodiment, the microprocessor 10 includes an output port 39 with one signal per phase of the motor 23. In the embodiment shown in FIG. 7, the motor has four-phases and the output port 39 correspondingly has four output signals. The output port 39 provides output pulses that are used to sequence the motor 23. The signals of the output port 39 are provided as inputs to a driver 16. The driver 16 receives the signals from the output port 39, and the driver 16 drives the inputs of multiple output transistors. In the illustrated embodiment, the driver 16 drives a first transistor 17, a second transistor 18, a third transistor 19, and a fourth transistor 20. In one embodiment, the first transistor 17, the second transistor 18, the third transistor 19, and the fourth transistor 20 are N-channel power metal oxide semiconductor field effect transistors (MOSFETs). One such MOSFET is an IR3315.

In the illustrated embodiment, the driver 16 drives the gates of the first transistor 17, the second transistor 18, the third transistor 19, and the fourth transistor 20. The drains of the first transistor 17, the second transistor 18, the third transistor 19, and the fourth transistor 20 are coupled to the motor 23. In the embodiments described in connection with FIGS. 7 and 9, the motor 23 is a unipolar motor. In a unipolar motor, each winding is split into two coils. Only one of the two coils can be energized at a given time, and the direction of the current that energizes a coil is fixed. By contrast, the embodiment described in connection with FIG. 10 uses a bipolar motor. In a bipolar motor, the entire winding can be energized and the direction of the current that energizes the coil can change direction.

The first transistor 17, which corresponds to phase A, and the second transistor 18, which corresponds to phase C, are coupled to opposing ends of a first winding 21 of the motor 23. A second winding 22 is driven by the third transistor 19 and by the fourth transistor 20, which correspond to phase B and to phase D, respectively.

A center tap 21a of the first winding 21 and a center tap 22a of the second winding 22 are connected to the motor power supply 29. The sources of the first transistor 17, the second transistor 18, the third transistor 19, and the fourth transistor 20 are coupled to an EMF sensing transformer 24. The source of the third transistor 19 and the source of the fourth transistor 20 are connected to a first terminal of a first winding 25 of the EMF sensing transformer 24. The source of the first transistor 17 and the source of the second transistor 18 are connected to a first terminal of a second winding 26 of the EMF sensing transformer 24. A second terminal of the first winding 25 and a second terminal of the second winding 26 are connected to ground.

A first terminal and a second terminal of a third winding 27 of the EMF sensing transformer 24 are coupled to a comparator 28. The third winding 27 of the EMF sensing transformer 24 includes a center-tap. In one embodiment, the center tap of the third winding 27 is connected to a reference voltage source 52. The comparator 28 generates a PWM commutation signal 28a as an output when the motor 23 is operated in a PWM mode. The skilled artisan will appreciate that the PWM commutation signal 28a is the same as the first commutation signal 160a. When the motor 23 is not operated in a PWM mode, the output of the comparator 28 corresponds to the first commutation signal 160a.

In one embodiment, the output 28a, 160a of the comparator 28 is provided as an input to an input port 9 of the microprocessor 10. With the motor operating in PWM, the amplitude of the PWM commutation signal 28a from the comparator 28 reflects the difference in current and the difference in the EMF of the "on" windings of the motor 23, and the deviation of the rotor from the zero detent position, which is a function of the PWM charging currents of the "on" windings of the motor 23. A first resistor 47, a second resistor 50, and a capacitor 48 are selected to form a filtering circuit. The filtering circuit generates a filtered signal 49, which represents the deviation. The filtering circuit also applies feedback to the comparator 28 to stabilize the comparator's output 28a, 160a as described in connection with FIGS. 7, 9 and 10.

Figures 8, 8A:
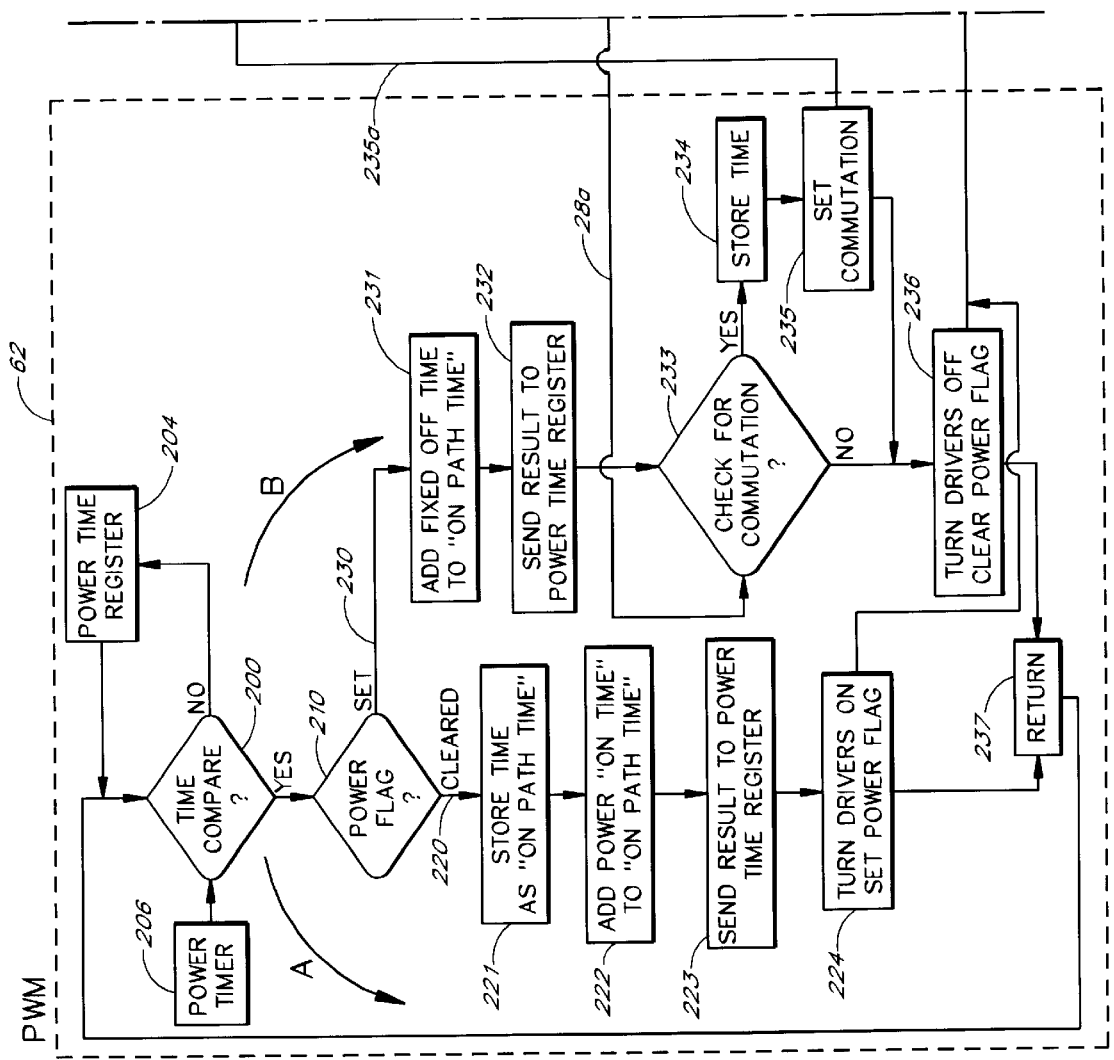
FIG. 8 consists of FIGS. 8A and 8B and illustrates a process of detecting a PWM commutation signal while chopping power to the motor with PWM.
Figure 8B:
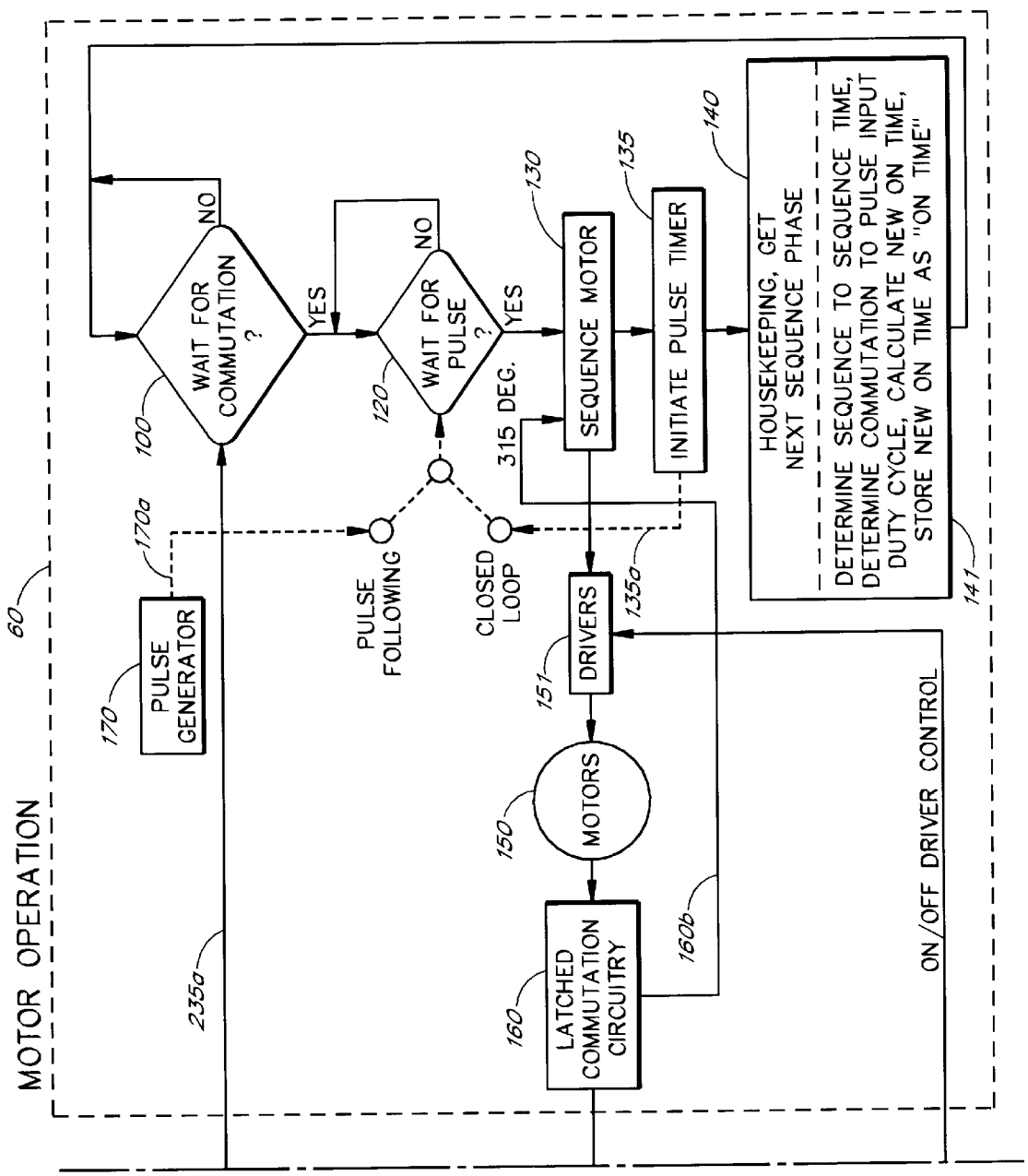

FIG. 8 illustrates a process of detecting a PWM commutation signal while pulse width modulating the power to the motor 150. Extracting the PWM commutation signal from the EMF of a PWM-chopped motor is difficult because of the filtering required and the nearness of the motor operating frequency to the PWM frequency. However, with circuit improvements including increasing the frequency of the PWM and increasing the bandwidth of the EMF commutation circuit, a relatively reliable commutation signal can be extracted despite the presence of the PWM chopping.

FIG. 8 illustrates a process including both a motor operation process 60 and a PWM process 62. In the motor operation process 60, the motor 150 responds to either an output 135a of the pulse timer step 135 or to an output 170a of the pulse generator 170. The motor's operating mode determines which is used. The motor sequencing step 130 sequences the motor 150 when the output 135a of the pulse timer step 135 or the output 170a of the pulse generator 170 is detected by the pulse timer wait step 120. A next sequence is generated by the housekeeping step 140, and the process waits for the next activation of the output 135a of the pulse timer step 135 or the output 170a of the pulse generator 170. Further details are described earlier in connection with FIG. 5.

The PWM process 62 illustrated in FIG. 8 includes two loops: a power-on loop labeled "A," and a power-off loop labeled "B." In one embodiment, the PWM rate corresponds to approximately 20,000 Hz. Each iteration through the PWM process 62 sets in a set step 224 or clears in a power flag off step 236 a power flag, which is read in the subsequent iteration in a power flag decision block 210 to determine whether the process flows through the power-on or "A" loop or the power-off or "B" loop.

Each iteration of the PWM process 62 also loads a power time register 204 that is compared with an output of a power timer 206 in a time compare decision block 200. An "on time" is determined after each motor sequence in the motor housekeeping function 141. In one embodiment, an "off time" is fixed at approximately 1/20,000 of a second or at about 50 microseconds. It will be understood by one of ordinary skill in the art that the "actual" off time is the difference between the "on time" and the fixed "off time."

In the power-on or "A" loop, the current time is stored by an "on path time" step 221. The "on time" from the motor housekeeping function 141 is added to the "on path time" in an addition step 222. A sending step 223 provides the sum as an input to the power time register 204 for comparison with an output of the power timer 206. The power flag is then set by the set step 224. In one embodiment, the power timer 206 is a continuously running clock.

Figure 26:
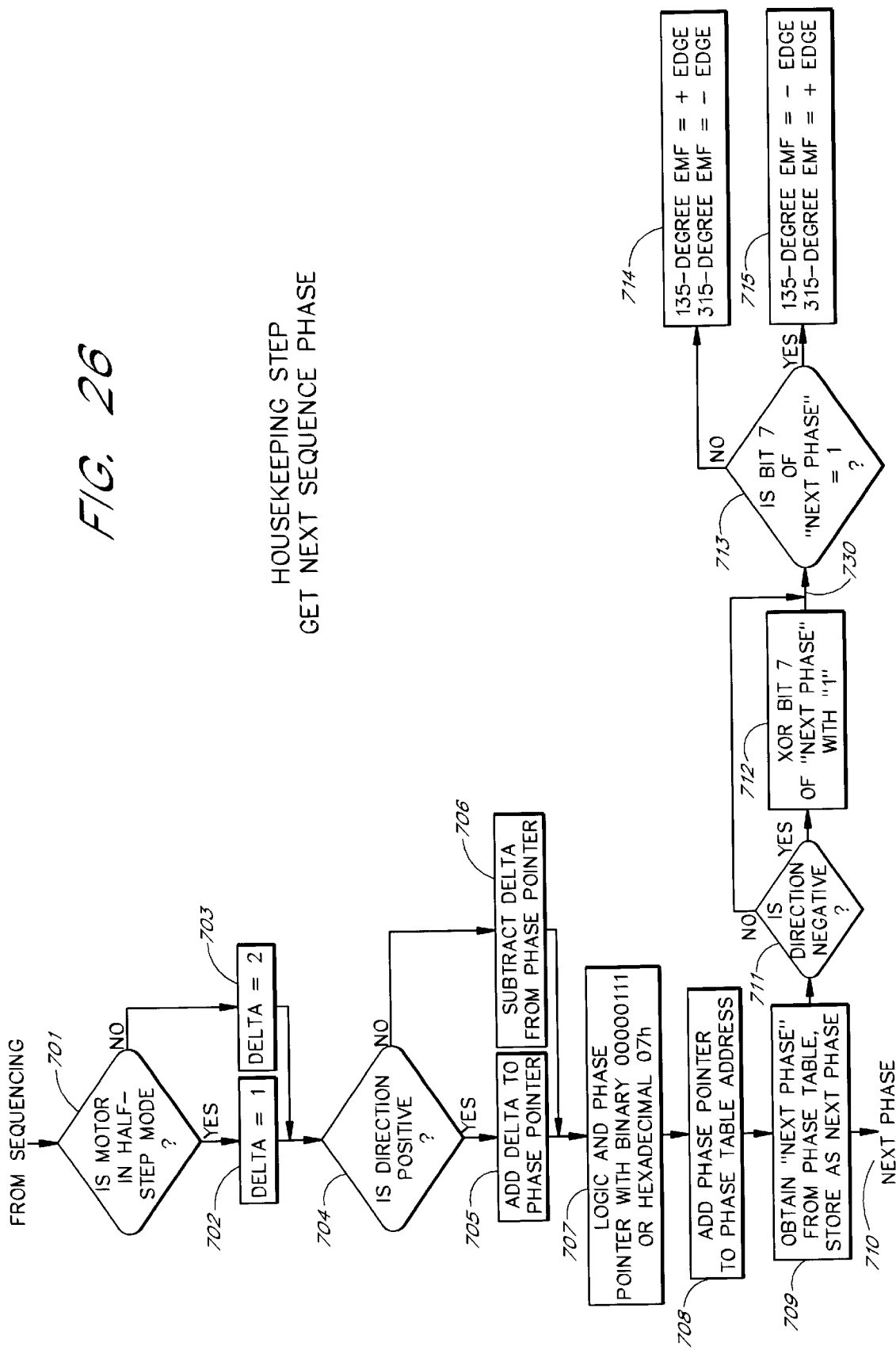
FIG. 26 illustrates a process of housekeeping to retrieve a next sequence.

When a value stored in the power time register 204 matches with the output of the power timer 206, and the power flag is set from the set step 224, the process proceeds down the power-off or "B" loop. A fixed "off time" is added to the "on path time" by a fixed "off time" addition step 231 to the value maintained by a store "on path time" step 221. A result of the fixed "off time" addition step 231 is provided as an input to a power time register in a send step 232. Before the power is turned off to the motor, the PWM commutation detection circuit's output 28a is checked for a commutation signal in a check step 233. FIG. 22E, FIG. 22F, and housekeeping steps 714, 715 in FIG. 26 illustrate further details of the process. If the commutation signal is not present, then the power is turned off at a power flag off step 236, which clears the power flag. The process then waits for the output of the power timer 206 to match with the output of the power time register 204.

If the commutation signal is present in the check step 233, the time is stored in a store commutation time step 234 and a PWM commutation signal 235a from a set commutation step 235 is provided as an input to the decision block 100. The PWM commutation signal 235a is also used to detect a stopping error as described later in connection with FIG. 23 and is used for anti-ringing and detent-zero positioning as described later in connection with FIG. 24. The PWM commutation signal 235a represents the deviation from the zero detent position when the motor 150 is not being sequenced. In the PWM process 62, the power is turned off and the power flag is cleared by the power flag off step 236. In the motor operation process 60, after the pulse from either the pulse timer step 135 or the pulse from the pulse generator 170 is detected, the pulse timer wait step 120 proceeds to the motor sequencing step 130 to sequence the motor. The pulse timer is then started in the pulse timer step 135. The housekeeping step 140 and the motor housekeeping function 141 then compare the commutation time from a stored commutation time 234 to a desired commutation time, and the "on time" is adjusted to keep the commutation signal time about equal to the desired commutation time. In the PWM process 62, the power-on or A loop is again accessed for the next PWM cycle when the power time register 204 matches with the output of the power timer 206 at the time compare decision block 200, with the power flag cleared 220. Further details of the PWM process are described later in connection with FIG. 22.

Figure 33:
FIG. 33 consists of FIGS. 33A, 33B, 33C, 33D, and 33E and is a schematic of a motor switching and sensing circuit.
Figure 33A:
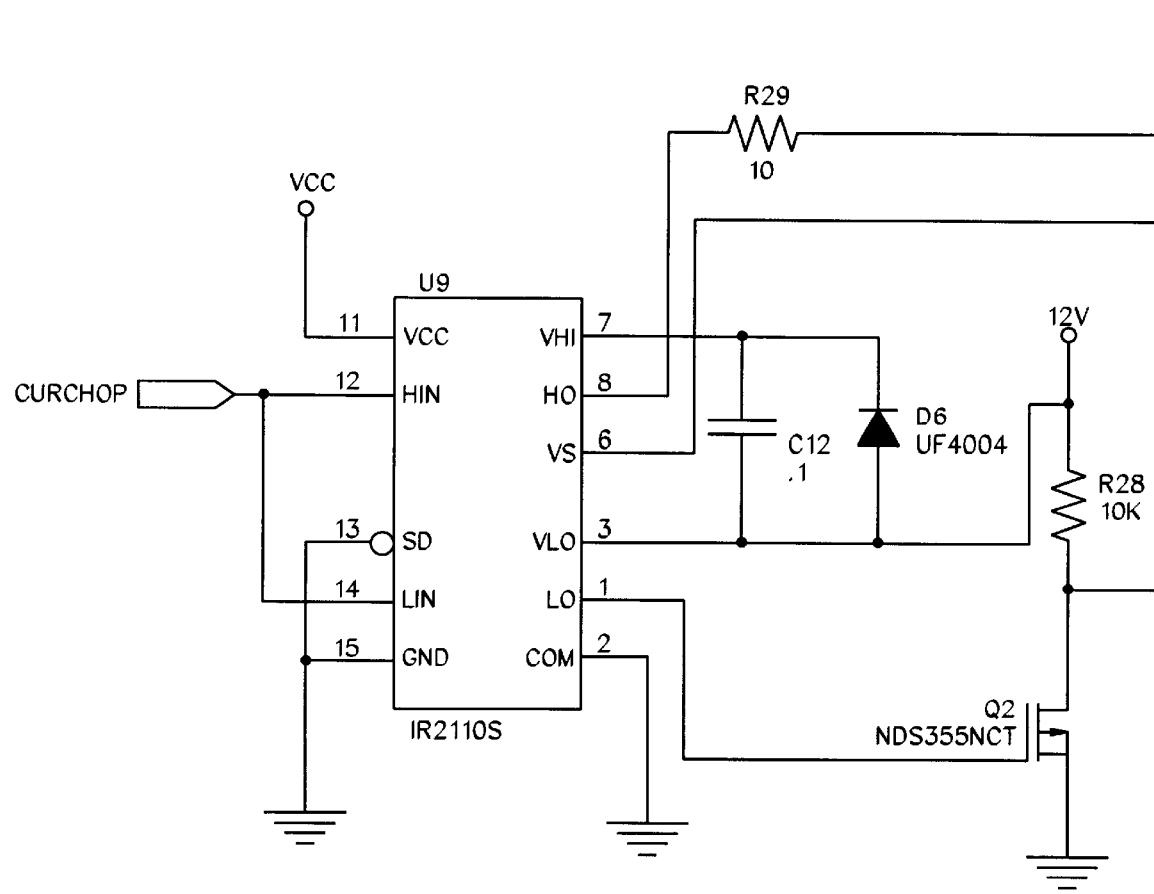
Figure 33B:
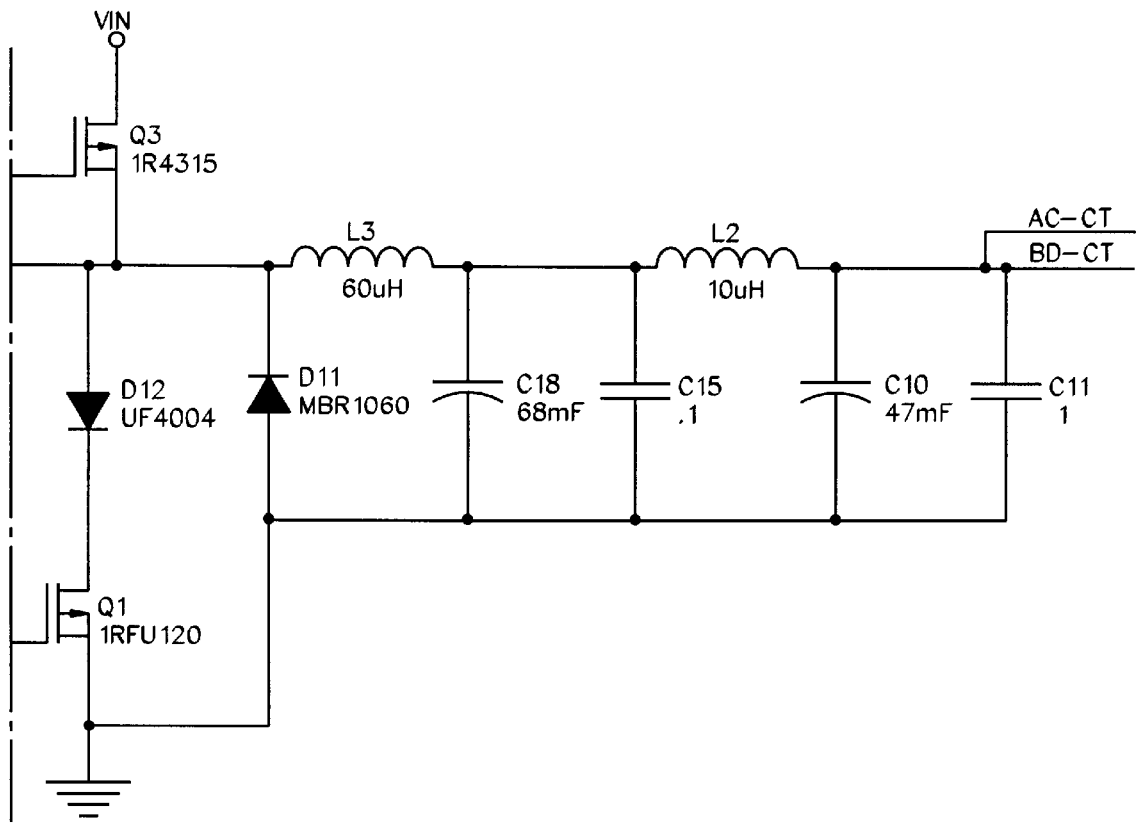
Figure 33B:
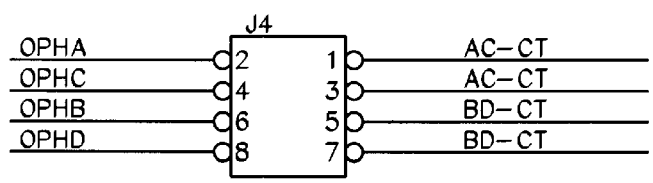
Figure 33C:
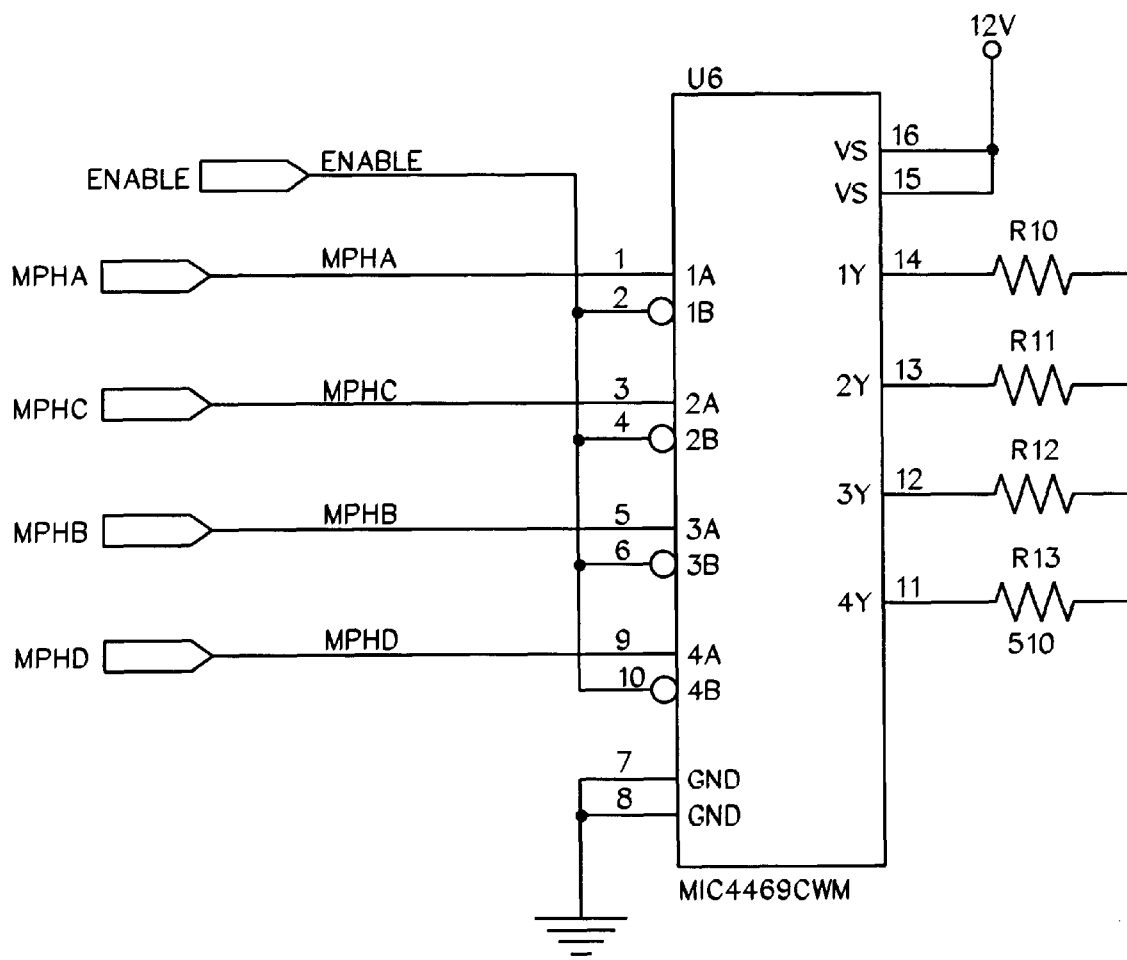
Figure 33D:
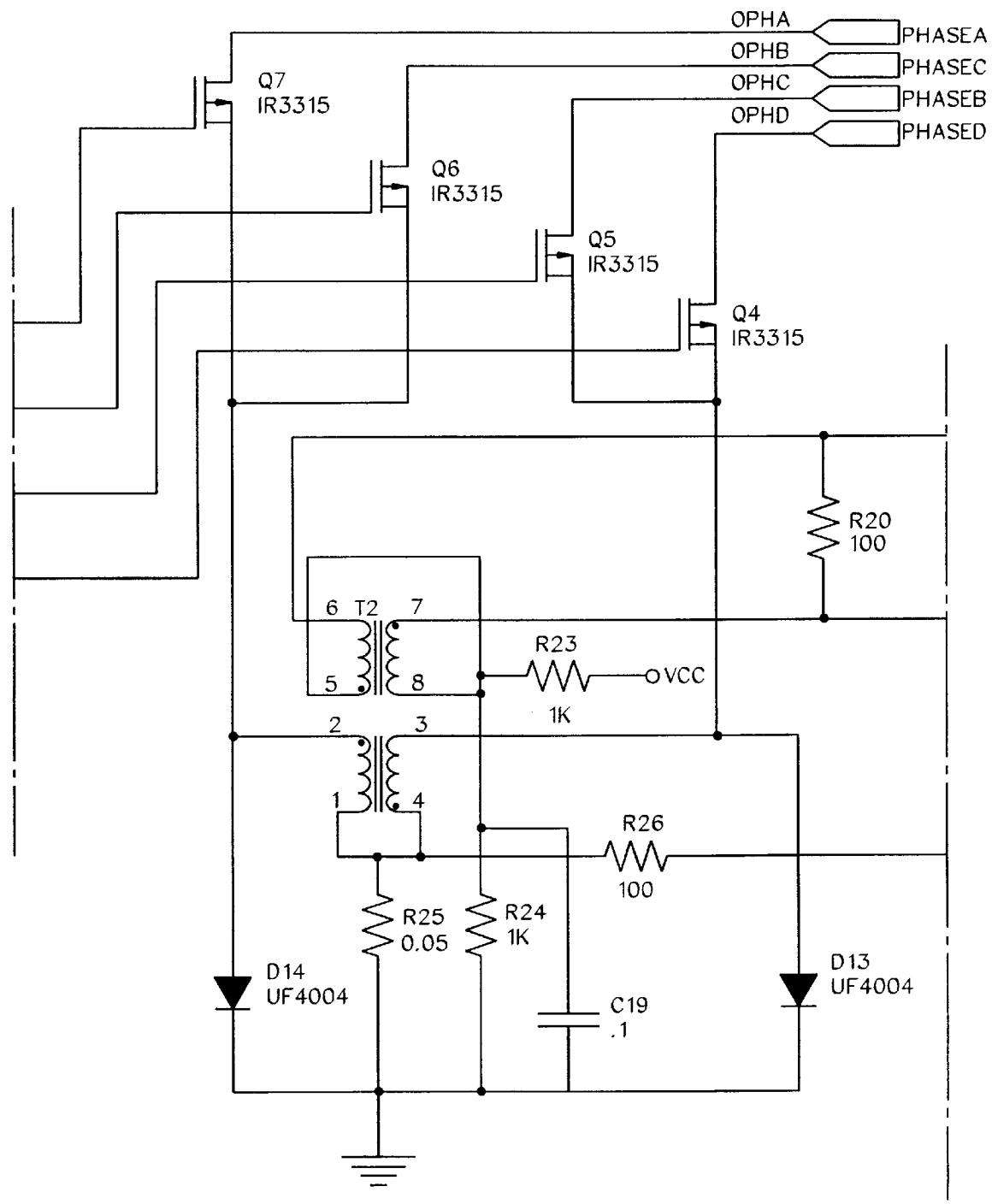
Figure 33E:
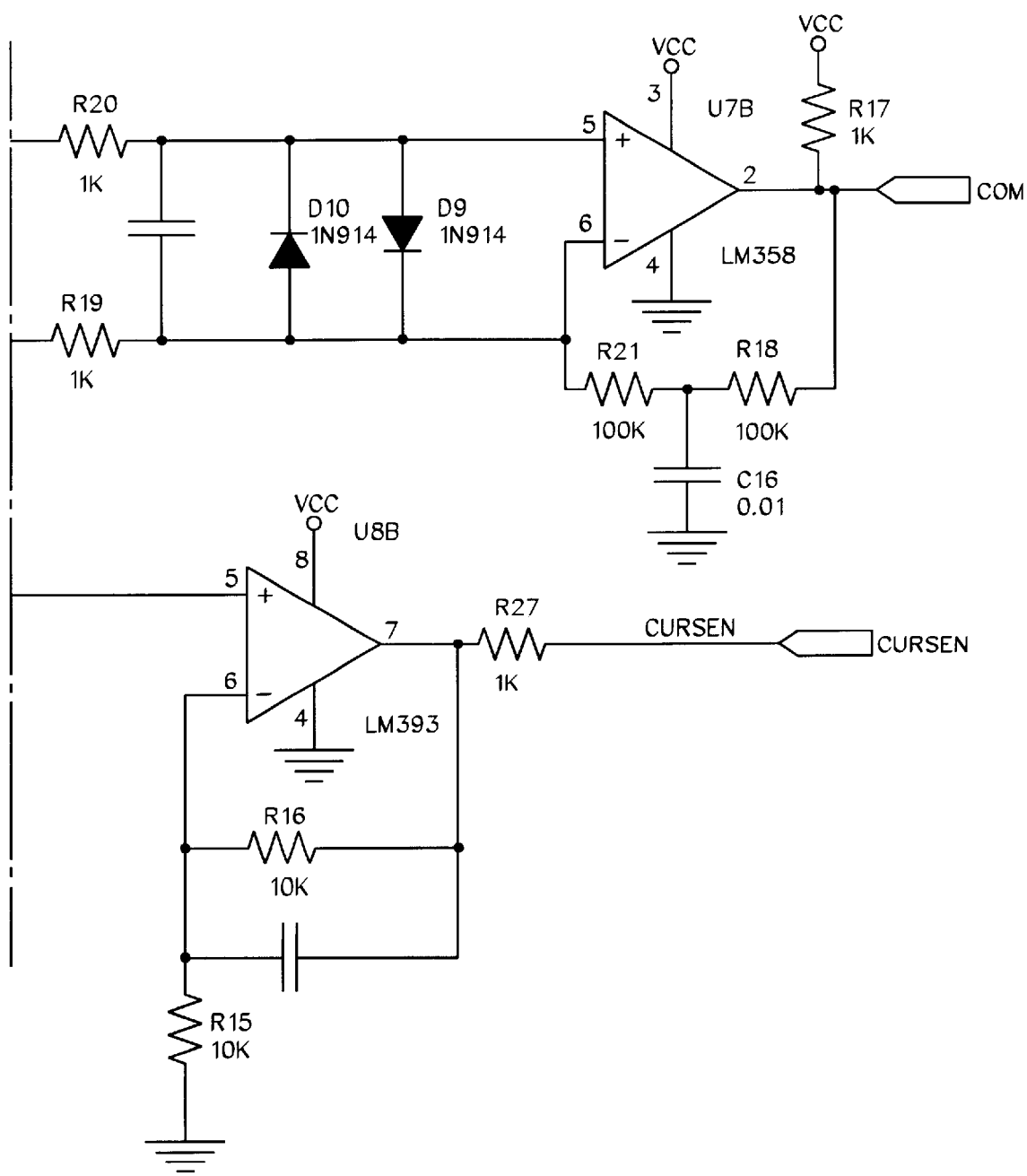

FIG. 9 is a schematic diagram of a unipolar motor drive 900 according to another embodiment of the invention that includes a controlled direct current (DC) power supply. An even more detailed schematic of the unipolar motor drive 900 is described later in connection with FIG. 33. In the illustrated embodiment, the PWM power control uses a separate high-frequency power supply. The separate high-frequency power supply supplies a DC bias of a variable voltage, thereby allowing a relatively high current with a relatively low amount of hysteresis heating.

With reference to FIG. 9, the illustrated power supply includes a duty cycle latch 35 that is set by the microprocessor 10, a high-frequency clock 36, a MOSFET driver 34, a boot-strapping diode 40, a first capacitor 41, a fifth transistor 33, a second diode 32, a third diode 43, an inductor 31, a second capacitor 30 and a sixth transistor 37, which is configured as a clamp. In one embodiment, the fifth transistor 33 and the sixth transistor 37 are N-channel power MOSFETs such as an IR4315 and an IRFU120, respectively.

The operation of the motor controller will now be described with reference to FIG. 9. The duty cycle latch 35 includes an 8-bit counter, which counts cycles of the high-frequency clock 36. In response to a match between the count of the counter in the duty cycle latch 35 and a value applied to the duty cycle latch 35 by an 8-bit port 38 of the microprocessor 10, the duty cycle latch 35a sets an output 35a. When the 8-bit counter in the duty cycle latch 35 passes through zero, i.e., overflows, the duty cycle latch 35 clears the output 35a. It will be understood by one of ordinary skill in the art that a wide variety of bits for the 8-bit counter and for the 8-bit port 38 can be used.

The duty cycle of the output 35a of the duty cycle latch 35 is determined by the value applied to the duty cycle latch 35 by the 8-bit port 38 of the microprocessor 10. In one embodiment, the frequency of the output 35a of the duty cycle latch 35 is the frequency of the high-frequency clock divided by 256. The output 35a of the duty cycle latch 35 is provided as an input to the MOSFET driver 34.

The MOSFET driver 34 shifts the level of the voltage of the output 35a of the duty cycle latch 35 to drive the input of the fifth transistor 33, which can be a MOSFET, and to the level of the motor power supply 29. In the illustrated embodiment, an output of the fifth transistor 33 is filtered by the second diode 32, the inductor 31, and the second capacitor 30. In one embodiment, the fifth transistor 33 is an N-channel MOSFET, and the output of the fifth transistor 33 is taken from the source of the MOSFET.

The gate drive applied to the input of the fifth transistor 33 and the gate drive applied to the input of the sixth transistor 37 by the MOSFET driver 34 are opposite in polarity, i.e., when the fifth transistor 33 is driven "on," the sixth transistor 37 is driven "off," and vice-versa. When the sixth transistor 37 is turned "on" and the fifth transistor 33 is turned "off," and the EMF from the motor 150 is higher than the voltage across the second capacitor 30, the sixth transistor 37 provides a clamp to ground. The third diode 43 ensures that the clamping of the sixth transistor 37 occurs only when the voltage at the junction of the inductor 31, the second diode 32, and the source terminal of the fifth transistor 33 is positive.

The microprocessor 10 controls the output voltage across the second capacitor 30 by updating the value applied to the duty cycle latch 35 by the 8-bit port 38 of the microprocessor. The output voltage across the second capacitor 30 is a variable DC voltage and is not a chopped waveform. The output voltage is provided as a power source to the motor 23 through the center tap 21a of the first winding 21 and the center tap 22a of the second winding 22.

Advantageously, the output voltage provided by the unipolar motor drive 900 is variable to reduce power and increase efficiency. Further advantageously, the output voltage is DC and is not a chopped waveform, and thereby avoids the wasteful hysteresis heating associated with chopped waveforms. Further, the switching frequency of the variable DC source, which in the illustrated embodiment is the frequency of the high-frequency clock 36 divided by 256, can be higher than frequencies conventionally used for chopping-type motor controllers. The higher frequencies advantageously allow power supply components to be smaller. Power supply frequencies from about 50 kHz to over 1 MHz are possible. In addition, PWM power control can also be used in conjunction with this method of power control. For example, PWM can be used to obtain the EMF commutation, a detent position or both.

Figure 10:
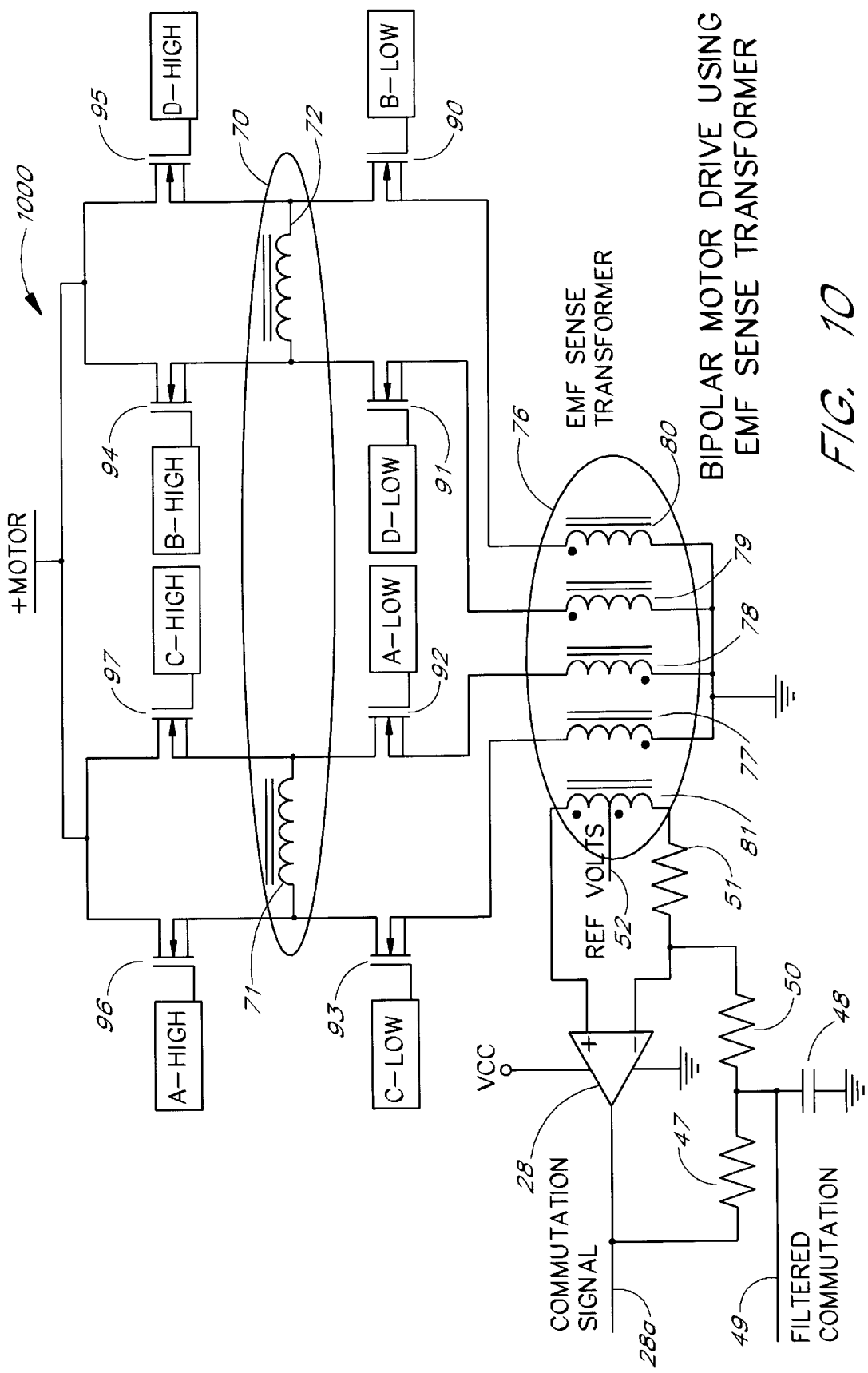
FIG. 10 is a schematic diagram that illustrates a bipolar stepper motor and an EMF and PWM commutation sense.

FIG. 10 is a schematic diagram for a bipolar motor drive 1000 that illustrates a bipolar stepper motor and an EMF and PWM commutation sense. The bipolar motor drive 1000 shares the advantages of the unipolar motor drive 900 described in connection with FIG. 7 and FIG. 9. In addition, a bipolar motor with the bipolar motor drive 1000 can advantageously have reduced winding resistance over a unipolar motor. The reduced winding resistance can provide a higher holding torque and an increased winding time constant.

The illustrated bipolar motor drive 1000 includes an EMF sense transformer 76 and a bipolar stepper motor 70. The bipolar stepper motor 70 includes a first winding 71 and a second winding 72. In an alternative embodiment, a sensor can be included in series with the first winding 71 and the second winding 72. However, a corresponding sensing circuit would then disadvantageously require two controlled inverters to select the correct phase relationship from both current paths.

In the illustrated embodiment, the EMF sense transformer 76 advantageously senses the EMF of the bipolar stepper motor 70 with a first winding 77, a second winding 78, a third winding 79, and a fourth winding 80. The illustrated bipolar motor drive 1000 includes a first H-bridge and a second H-bridge to drive the bipolar stepper motor 70. The first H-bridge includes a first transistor 93, a second transistor 96, a third transistor 92 and a fourth transistor 97. The second H-bridge includes a fifth transistor 91, a sixth transistor 94, a seventh transistor 90 and an eighth transistor 95.

The first winding 77 of the EMF sense transformer 76 is connected in series with the first transistor 93 between a first end of the first winding 71 and a common reference (e.g., ground). The second winding 78 of the EMF sense transformer 76 is connected in series with the third transistor 92 between a second end of the first winding 71 and the common reference. The third winding 79 of the EMF sense transformer 76 is connected in series with the fifth transistor 91 between a first end of the second winding 72 and the common reference. The fourth winding 80 of the EMF sense transformer 76 is connected in series with the seventh transistor 90 between a second end of the first winding 71 and the common reference.

The second transistor 96 is connected between a voltage source (+MOTOR) and the first end of the first winding 71. The fourth transistor 97 is connected between the voltage source and the second end of the first winding 71. The sixth transistor 94 is connected between the voltage source and the first end of the second winding 72. The eighth transistor 95 is connected between the voltage source and the second end of the second winding 72.

The H bridges operate by turning on one pair of transistors at a time for each of the windings 71, 72 to cause current to flow through the respective windings. In particular, as shown in FIG. 10, the second transistor 96 is turned on by an A-HIGH control signal at the same time that the third transistor 92 is turned on by an A-LOW control signal. Turning on the transistors 96, 92 by the pair of A control signals, creates a current path from the voltage source (+MOTOR) through the second transistor 96, through the first motor winding 71, through the third transistor 92, and through the second sense winding 78 to the common reference. When the A control signals are on, the current flows from left to right through the first motor winding 71.

After the second transistor 96 and the third transistor 92 are turned off, the fourth transistor 97 is turned on by a C-HIGH control signal at the same time that the first transistor 93 is turned on by a C-LOW control signal. Turning on the transistors 97, 93 by the pair of C control signals creates a current path from the voltage source through the fourth transistor 97, through the first motor winding 71, through the first transistor 93, and through the first sense winding 77 to the common reference. When the C control signals are on, the current flows from right to left through the first motor winding 71 (i.e., the opposite direction than when the A control signals are on).

The second H-bridge operates in a similar manner. In particular, the sixth transistor 94 is turned on by a B-HIGH control signal at the same time that the seventh transistor 90 is turned on by a B-LOW control signal. Turning on the transistors 94, 90 by the pair of B control signals creates a current path from the voltage source through the sixth transistor 94, through the second motor winding 72, through the seventh transistor 90, and through the fourth sense winding 80 to the common reference. When the B control signals are on, the current flows from left to right through the second motor winding 72.

After the sixth transistor 94 and the seventh transistor 90 are turned off, the eighth transistor 95 is turned on by a D-HIGH control signal at the same time that the fifth transistor 91 is turned on by a D-LOW control signal. Turning on the transistors 95, 91 by the pair of D control signals creates a current path from the voltage source through the eighth transistor 95, through the second motor winding 72, through the fifth transistor 91, and through the third sense winding 79 to the common reference. When the D control signals are on, the current flows from right to left through the second motor winding 72 (i.e., the opposite direction than when the B control signals are on).

Figure 27:
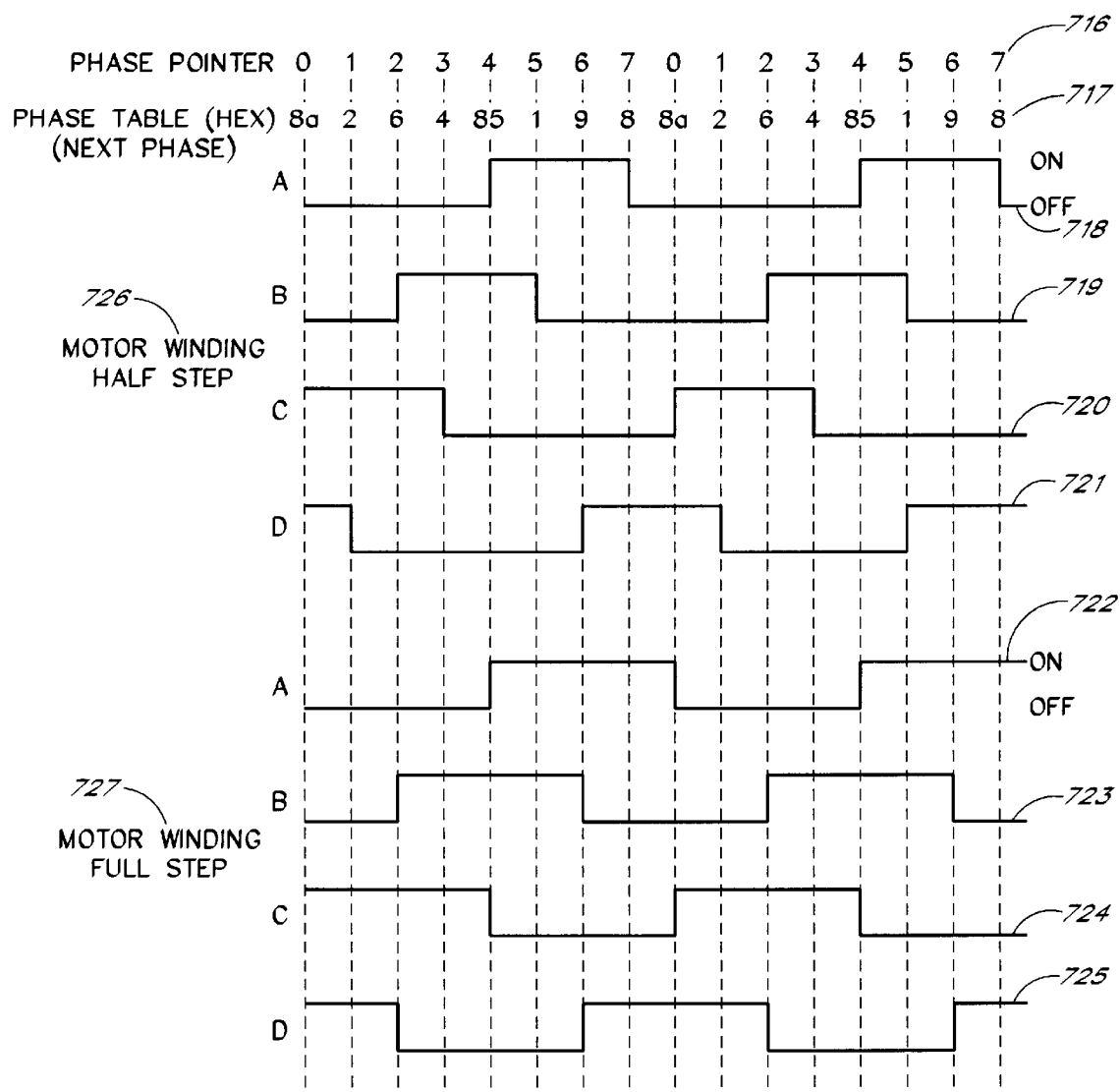
FIG. 27 is a timing diagram that illustrates a relationship between a Phase Pointer and data in a Phase Table.

FIG. 27, discussed below, illustrates exemplary timing diagrams for the A, B, C and D control signals. Note that the A and C control signals are never on at the same time. Similarly, the B and D control signals are never on at the same time.

A fifth winding 81 of the EMF sense transformer 76 couples a resulting signal to the comparator 28, which detects the zero crossover to obtain the commutation signal. As described in connection with FIG. 7, the first resistor 47, the second resistor 50, and the capacitor 48 form a filter, and the comparator 28 generates the commutation signal 28a. In another embodiment, the functionality of the EMF sense transformer 76 is performed by an electrical circuit approximately equivalent to the EMF sense transformer 76. The electrical circuit can include adding, summing, differencing, integration and differentiation circuits as described later in connection with FIG. 26.

There are many similarities between a power control technique and anti-hunting. The difference between the two techniques is that the power control technique uses the time of the commutation signal with respect to the time of the sequence as a reference, whereas the anti-hunting technique uses a rate of change from sequence to sequence of the commutation signal with respect to the sequence time as a reference.

Power control is based on the time between the motor sequence time and the 135-degree EMF commutation time. Power can be controlled by pulsing, PWM, or DC level variation of the motor power supply. Power can also by controlled by selecting motor windings or by altering the timing of the sequence to commutation time.

Figure 11:
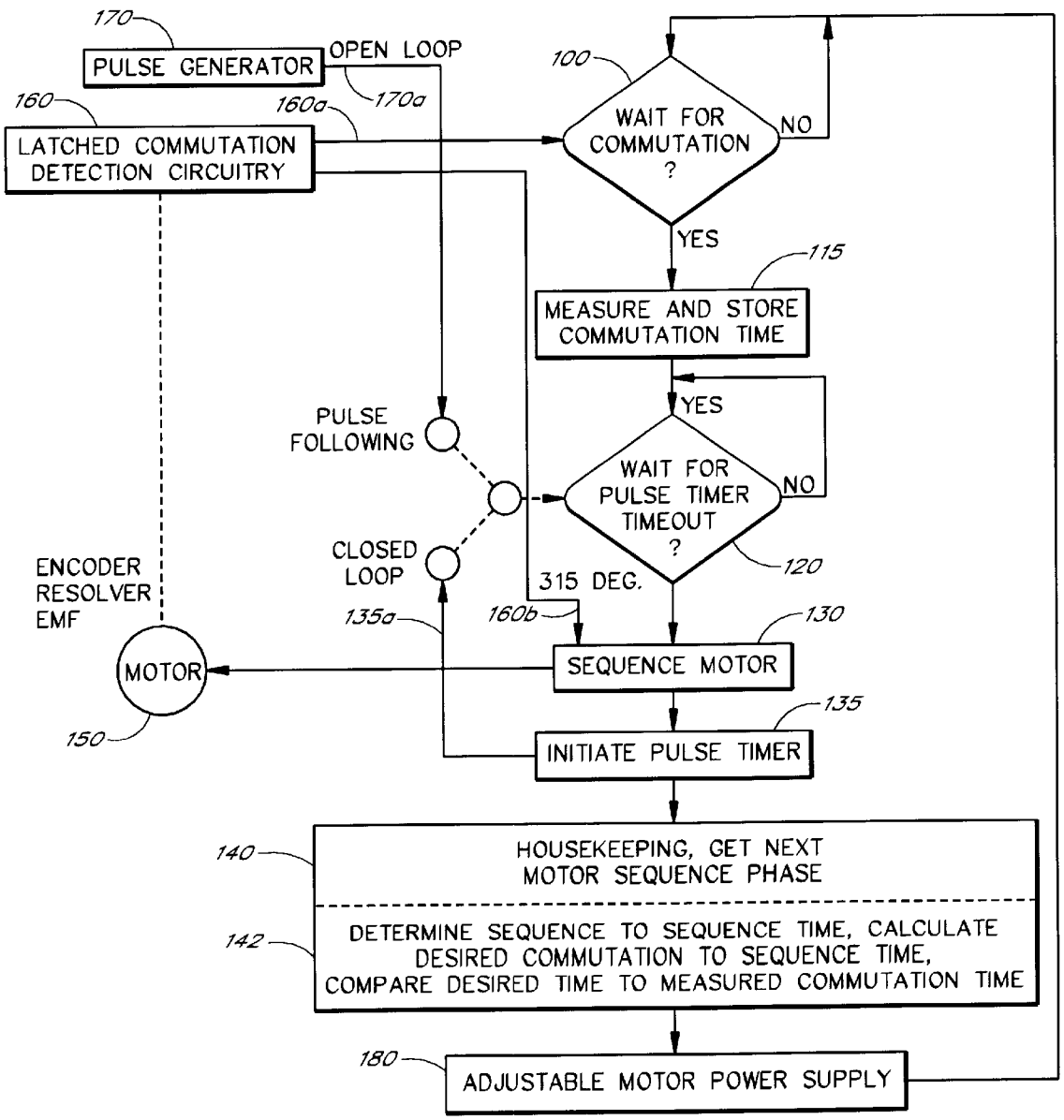
FIG. 11 illustrates a process of controlling the power of a motor with commutation timing.

FIG. 11 illustrates a process of controlling the power of a motor with commutation timing. The commutation timing between detection of the commutation signal and sequencing of the motor 150 is varied to control the motor's power. A desired commutation signal time is predetermined and compared with the actual commutation signal time. If the actual commutation signal time occurs before the desired commutation signal time, the power is then reduced. Conversely, the power applied to the motor 150 is increased if the commutation signal time arrives after the desired commutation time.

The first commutation signal 160a is generated by the commutation detection circuit 160. In response to the activation of the first commutation signal 160a, the process advances from the decision block 100 to a measure step 115. The time of the activation of the first commutation signal is measured in the measure step 115.

The pulse timer wait step 120 is responsive to a pulse 170a from the pulse generator 170 or to an output 135a of the pulse timer step 135, depending on whether the motor 150 is operated in a pulse-following mode or in a closed-loop mode. In response to the pulse 170a or the output 135a, the process advances from the pulse timer wait step 120 to the motor sequencing step 130, and the process sequences the motor 150. After the motor 150 is sequenced by the motor sequencing step 130, the process advances to the pulse timer step 135 and starts the pulse timer. The process advances to the housekeeping step 140. In the housekeeping step 140, the process obtains the next sequence phase. The process advances from the housekeeping step 140 to a determining sequence-to-sequence time step 142. In the determining sequence to sequence time step 142, the process computes a desired commutation time and compares the desired commutation time to the actual commutation time measured and stored in the measure step 115. In response to the comparison, the process adjusts an output voltage of an adjustable motor power supply in an adjustment step 180. The process returns from the adjustment step 180 to the decision block 100.

Figure 12:
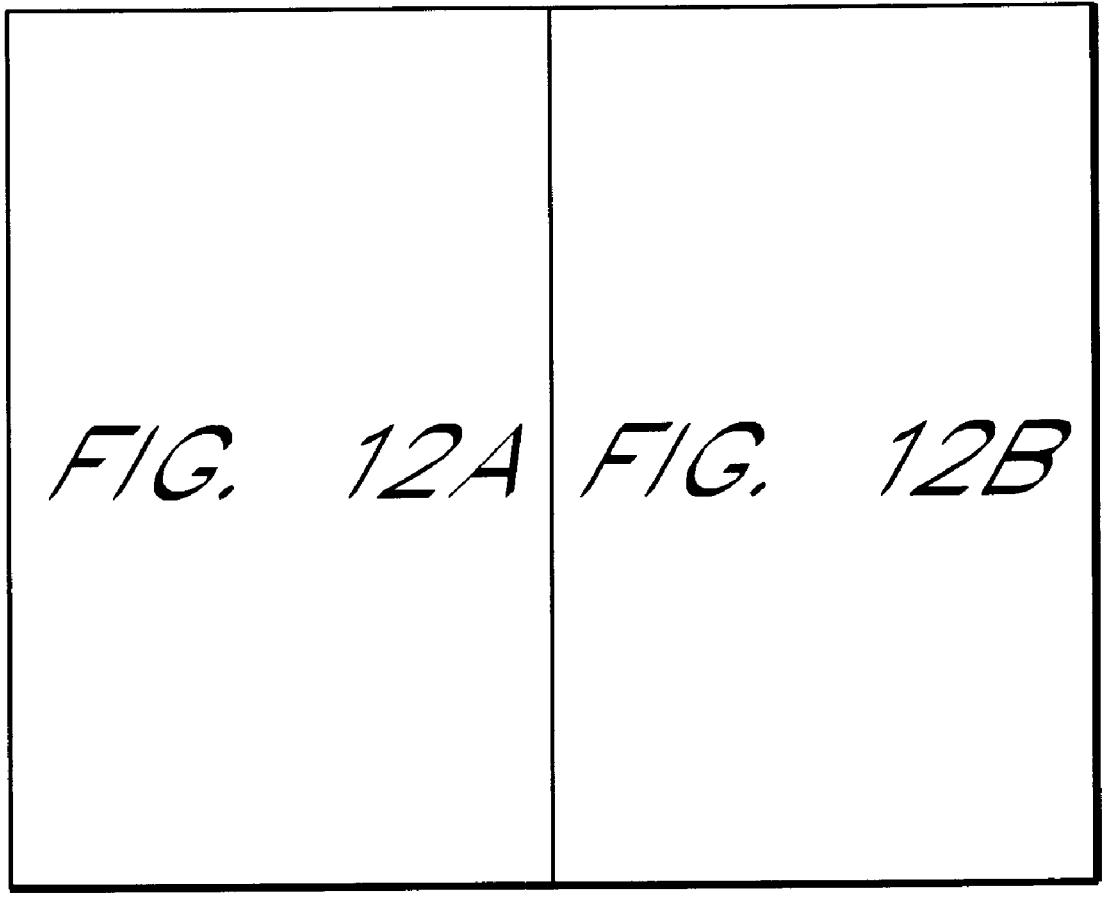
FIG. 12 consists of FIGS. 12A and 12B and illustrates a process of controlling the power of a motor with a duty cycle timer.
Figure 12A:
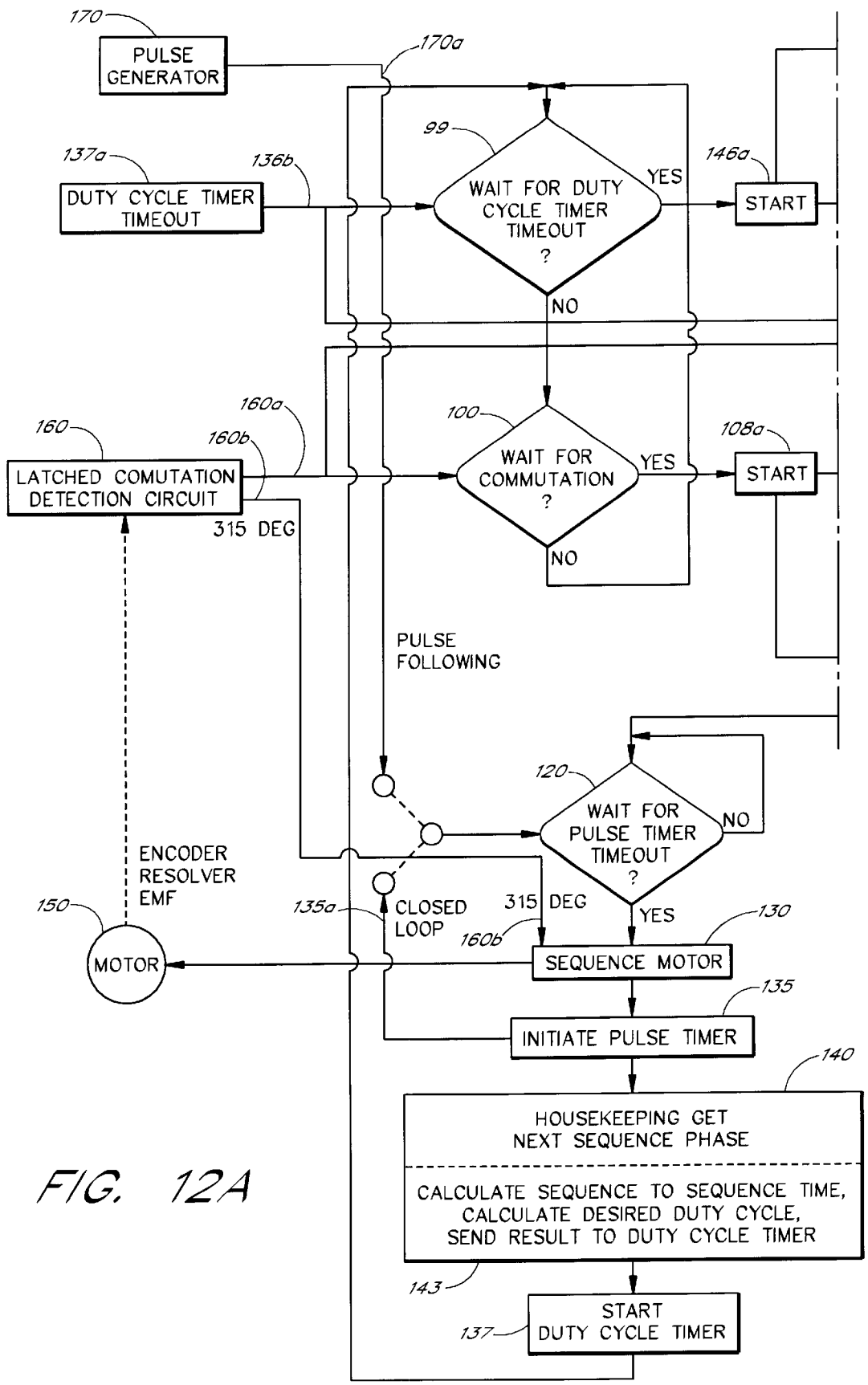
Figure 12B:
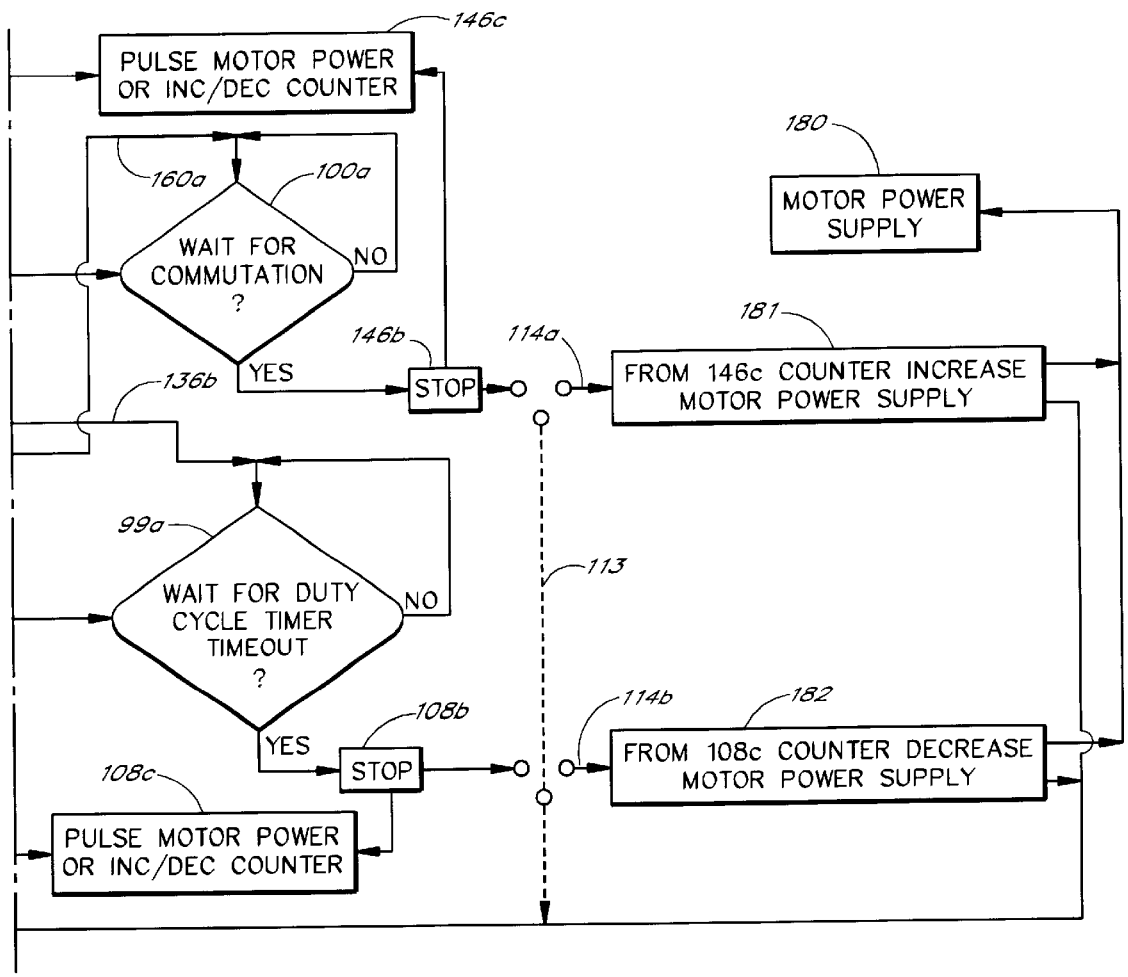

FIG. 12 illustrates a process of controlling the power of a motor with a duty cycle timer. In the illustrated process, power adjustments are made virtually instantaneously. A timer is set in the desired duty cycle time and is started by the sequencing of the motor. Whether the timer "times out" before or after the arrival of the first commutation signal 160a determines the polarity or the direction of the motor power supply adjustment. A magnitude of the time difference between the time-out of the timer and the arrival of the activation of the first commutation signal determines the magnitude of the adjustment.

The power supply correction can be either pulsed or gradually adjusted to maintain the desired duty cycle and the desired time between the commutation signal and sequencing. The process is also capable of manipulating the winding currents of the motor to alter the power requirements.

The motor 150 is sequenced in the motor sequencing step 130 after the detection of a pulse 170a from the pulse generator 170 when in a pulse following mode or detection of a signal 135a from the pulse timer step 135 in a closed-loop mode. After the motor 150 is sequenced in the motor sequencing step 130, the pulse timer is initiated in the pulse timer step 135. The next sequence phase is obtained from the housekeeping step 140. The sequence-to-sequence time is determined and the desired commutation time calculated at a step 143, and the desired commutation time is provided as an input to a duty cycle timer 137a.

Depending on the detection time of the first commutation signal 160a at the decision block 100 or the detection time of the time-out 136b of the duty cycle timer 137a from a wait for last commutation timer time-out step 99, either one of two timers or actions 146a, 108a is started. The timer or action is stopped upon the arrival of the later of the first commutation signal 160a or the time-out 136b. Action taken can include pulsing the motor power higher or lower, opening or shorting the motor windings, and changing motor phase. After the timer or corrective action 108c, 146c is stopped as indicated by a respective stop block 108b, 146b, the process advances along a path 113 to the WAIT FOR PULSE TIMER TIMEOUT block 120. An alternate embodiment uses the time counted in the timers 146c, 108c to control the motor power supply as shown in blocks 181 and 182 via the path 114a or the path 114b, depending on whether the duty cycle timeout from the wait block 99 or the commutation signal from the wait block 100 arrives first.

The earlier of the first commutation signal 160a or the time-out 136b determines the polarity of the power adjustment. Either of the counts maintained in the timer paths 146, 108 can determine the amplitude or duration of the adjustment. One path or both paths 108, 146 can be used. Once the corrective action is taken, the process waits for the pulse timer time-out 135a in the closed-loop mode or the pulse generator signal 170a in the open-loop mode. In one embodiment, the process runs continuously.

Figure 13:
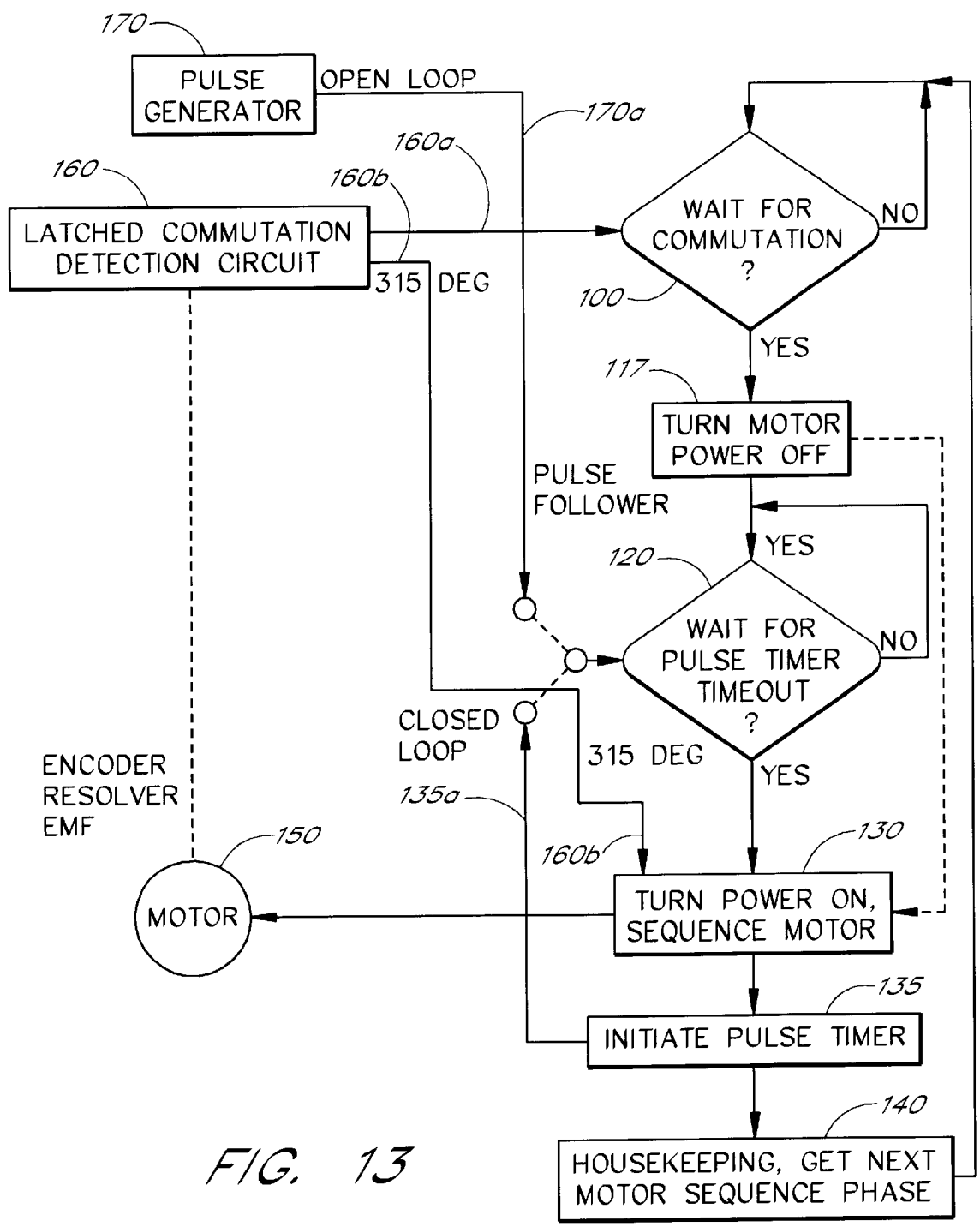
FIG. 13 illustrates a process of cycling commutation power on and off to provide a motor with anti-hunting and power control.

FIG. 13 illustrates a process of cycling power off on the detection of the commutation signal to provide a motor with anti-hunting and power control. In a closed-loop mode, the pulse timer is initiated in the pulse timer step 135, and the motor 150 is sequenced in the motor sequencing step 130. The process advances from the motor sequencing step 130 to the housekeeping step 140. In the housekeeping step 140, the process obtains the next sequence phase. The process advances to the decision block 100. In response to detecting an activation of the first commutation signal 160a from the commutation detection circuit 160, the process advances to a turn motor power off step 117. In the turn motor power off step 117, the power previously applied to the motor 150 is disabled, and power is not re-applied to the motor 150 until the motor sequencing step 130. In the illustrated process, the process can turn off one winding, a portion of the windings, or all of the motor's windings in the motor sequencing step 130.

Power is returned as the motor 150 is sequenced in the motor sequencing step 130 when the output 135a of the pulse timer step 135 is detected in the pulse timer wait step 120 in the closed-loop mode or when the input pulse 170a of the pulse generator 170 is detected in the step in the pulse following mode. The cycle is then repeated. If the output 130a or the input pulse 170a arrives before the commutation signal is detected in the decision block 100, the power is switched off for a relatively short time and the normal operation is unaffected.

In the pulse follower mode, the first commutation signal 160a is used to alter the instantaneous timing of the input pulses, to control power, to reduce motor hunting, and to increase motor performance and efficiency. The control processes described in connection with the closed-loop mode can also be used for the pulse following mode. One difference between the pulse following mode and an open-loop mode or a closed-loop mode is that in the pulse following mode, the motor sequencing step 130 is locked to the input pulses 170a from the pulse generator 170. With the exception of the processes described in connection with anti-hunting, in one embodiment, other aspects of the power control operation are the same as described under motor power control.

Where a commutation signal is derived from an external sensor, i.e., other than through EMF sensing, the commutation signal can be used for commutation at almost any speed or step angle resolution. By contrast, EMF sensing works only when power is applied to two windings as described in U.S. Pat. No. 4,136,308. Power applied to two windings corresponds to a fall-step position. In one embodiment, when stepping in increments smaller than a full-step, such as a half-step or a micro-step, the EMF commutation signal or the PWM commutation signal used for motor power control is sensed only in full-step positions. In another embodiment, where a micro-step resolution allows a micro-step position to be near to a full-step position, then the EMF commutation signal or the PWM commutation signal can again be used.

Anti-hunting is based on the rate of change of the commutation signal with respect to sequencing time. Various methods such as pulsing, adjusting PWM, adjusting DC levels of the power supply, controlling selected motor windings, altering the sequence-to-sequence timing, altering the timing of the delayed sequencing, and the like can be used to control anti-hunting.

Figure 14:
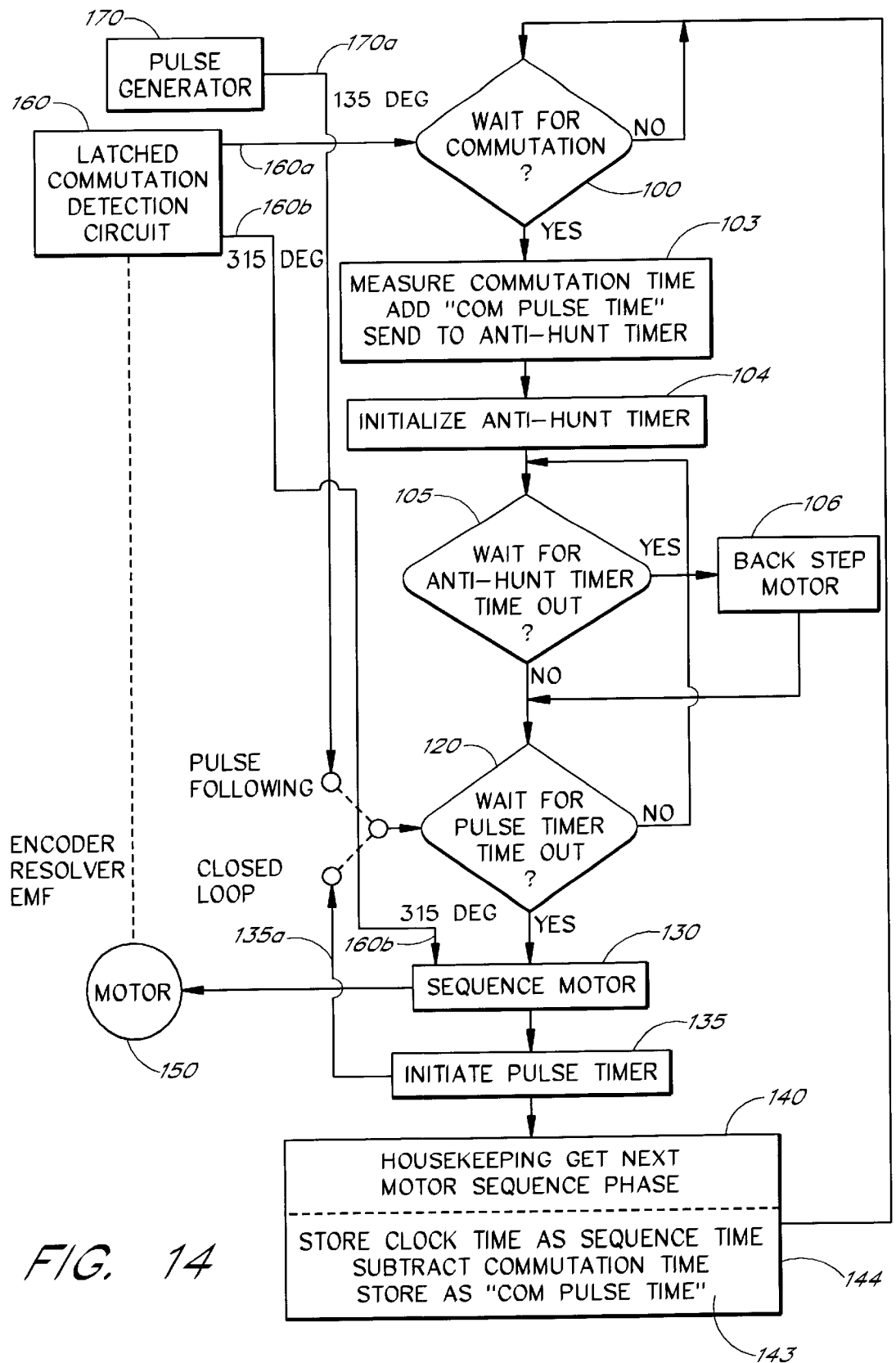
FIG. 14 illustrates a process of back-stepping or damping to provide a motor with an anti-hunting response.

FIG. 14 illustrates a process of back-stepping or damping that provides a motor with an anti-hunting response. Back sequencing is a technique of sequencing back to the last sequence phase, i.e., the last previously commanded sequence, or turning on selected motor windings to dampen or to reduce motor torque. Back sequencing is effective when the motor 150 is accelerating while hunting. In one embodiment, the time from the activation of the first commutation signal 160a to the next sequencing is measured and stored in a variable called "old commutation time," and on subsequent sequences, the "old commutation time" is added to the time of the new commutation time upon the activation of the first commutation signal 160a. The result is provided as an input to a timer, and the process waits for the time-out of the timer.

In response to a time-out of the timer, the process measures a time interval between the new activation of the first commutation signal 160a and the corresponding sequence time. Where the time interval is shorter than the prior time interval, which is retrieved from the "old commutation time" variable, the process back sequences the motor 150 for a time approximately equal to the time difference between the old time and the new time before the next sequence. Where the time interval is about the same or longer than the prior time interval, the process sequences the motor 150 without back sequencing.

In the closed-loop mode, the motor 150 is sequenced in the motor sequencing step 130, and the pulse timer is initiated in a pulse timer step 135. The pulse time is measured in a step 144. The "commutation time" is subtracted, and the result is stored in a variable "Com Pulse time" in the step 143.

After the commutation detection circuit 160 detects commutation and activates the first commutation signal 160a that is provided as an input to the decision block 100, the commutation time is measured in a step 103 and stored in a variable or register "commutation time." The "Com Pulse time" from the step 143 is added to this new "commutation time" in the step 103 and the result is provided to an anti-hunt timer 104. The anti-hunt timer 104 starts timing. The process prepares to back step the motor 150 by loading a back step sequence in a step 106 in response to a time-out of the anti-hunt timer 104 prior to reduce motor torque. If the output from the pulse timer wait step 120 arrives before the time-out of the anti-hunt timer, back stepping does not occur. The motor 150 is sequenced in the motor sequencing step 130, and the process repeats. The motor 150 is back sequenced, via the step 106 and the motor sequencing step 130, when the commutation signal arrives in less time then it did on the prior pulse. The time of the back sequencing via the step 106 and the motor sequencing step 130 is about equal to the change in timing of the commutation signal from sequence to sequence.

Figure 15:
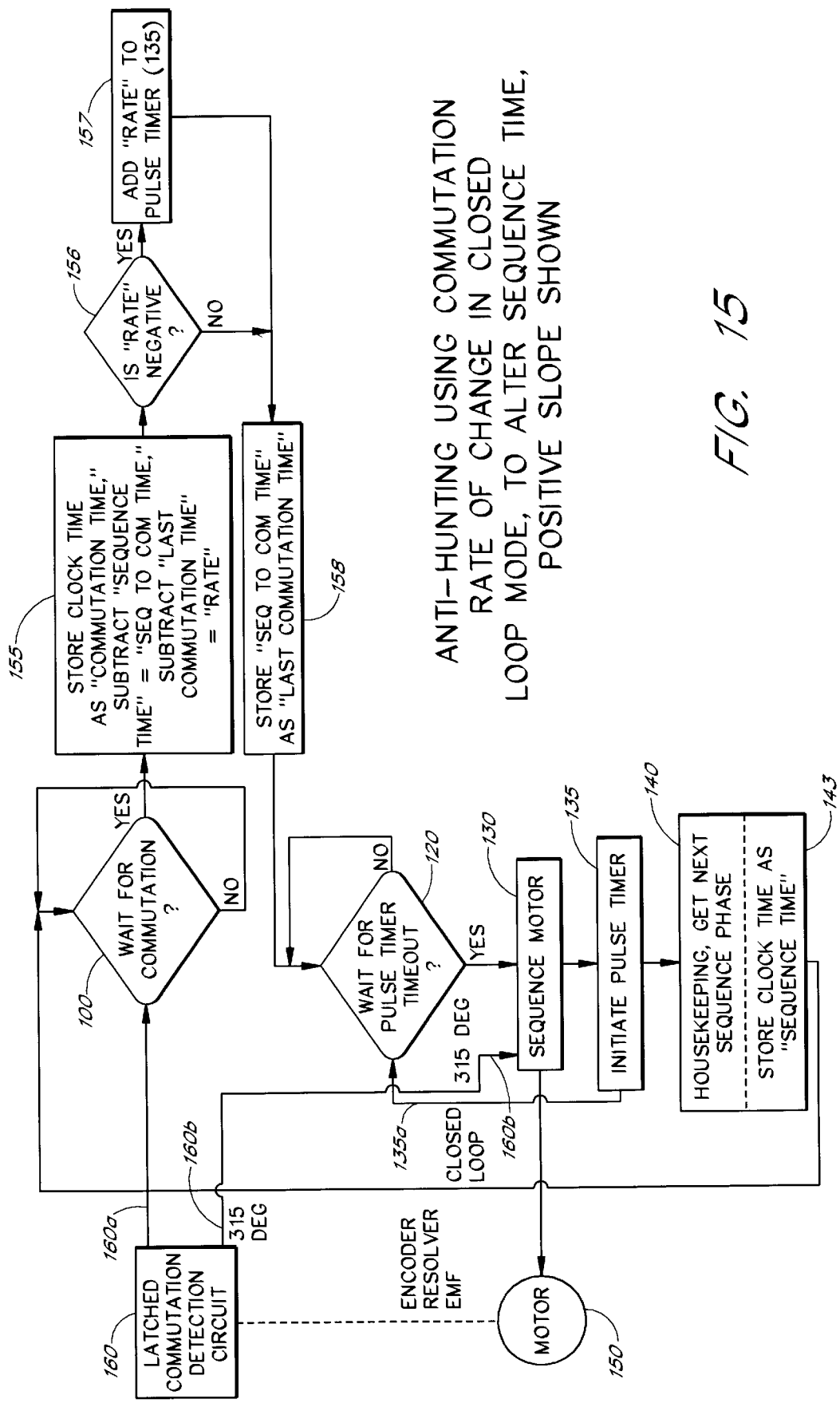
FIG. 15 illustrates a process of altering timing of a pulse timer or delay timer to provide a motor with anti-hunting.

FIG. 15 illustrates a process of altering timing of a pulse timer or delay timer to provide a motor with anti-hunting. The corrective control is an alteration to the sequence pulse timing or delay timing made during a closed-loop mode. In this process, on the arrival of each commutation signal, the clock time is stored in "commutation time," and the last "sequence time" is subtracted from the "commutation time" leaving the "sequence to commutation time." The "last commutation time" is subtracted from the "sequence to commutation time" resulting in a time representing "rate." A negative "rate" value indicates that the motor 150 is accelerating, and so the "rate" value is added to the pulse timer 135 time to alter its timing. If the "rate" value is positive, no action is taken.

Whether the "rate" value is positive or negative, the "sequence to commutation time" is stored in "last commutation time" and used for the next sequence cycle. After waiting for the altered pulse timer's time-out, the motor 150 is sequenced. After sequencing, the next sequence phase is obtained, and the sequence time is stored in "sequence time." The process can repeat continuously. The process is illustrated with a negative "rate" value, and the corrective action is applied on an accelerating motor velocity slope. However, it will be understood by one of ordinary skill in the art that in another embodiment, the process can easily be configured to respond to a positive "rate" value and a correspondingly decelerating velocity slope. In another embodiment, with proper safeguards to prevent interaction, both the acceleration and deceleration rate can be used to alter the pulse or delay times.

After the motor 150 is sequenced in the motor sequencing step 130, the pulse timer is started in the pulse timer step 135. The process advances to the housekeeping step 140 to obtain the next sequence phase. The process stores the time of the sequence in a "sequence time" variable in the step 143. When the first commutation signal 160a from the commutation detection circuit 160 is received by the decision block 100, the clock time associated with the first commutation signal 160a is measured and stored in a "commutation time" variable in a step 155. Also in the step 155, the "sequence time" from the step 143 is subtracted from the "commutation time," and the result is stored in a "seq to com time" variable. Further in the step 155, the "last commutation time" variable is subtracted from the "seq to corn time" variable to generate a time representing a "rate" of change of the commutation signal time from sequence to sequence. The process advances from the step 155 to a decision block 156.

In the decision block 156, the process evaluates the sign, i.e., positive or negative, of the value of the "rate" variable from the step 155. The process proceeds from the decision block 156 to a step 157 when the value of the "rate" variable is negative. The process proceeds from the decision block 156 to a step 158 when the value of the "rate" variable is positive.

In the step 157, the value of the "rate" variable is negative, which indicates an accelerating rotor. In the step 157, the value of the "rate" variable is added to the pulse timer step 135. The process advances from the step 157 to the step 158.

In the step 158, the "seq to corn time" variable is stored in a "last commutation time" variable for use in the next cycle or iteration of the process. Upon detection of the pulse timer time-out in the pulse timer wait step 120, the motor sequencing step 130 sequences the motor 150, and the process repeats. The process can repeat indefinitely. If the motor's sequence rate is controlled in the delay timer step 101 as described earlier in connection with FIG. 3, the value of the "rate" variable is added to the rate timer in the delay timer step 101, and the pulse timer wait step 120 waits for the time-out of the delay timer in the delay timer step 101. The deceleration "rate" can also be used by looking for a positive "rate" time in the decision block 156. In one embodiment, the step 155, the decision block 156, and the step 157 are executed after the commutation signal is detected by the pulse timer wait step 120. In another embodiment, the step 155, the decision block 156, and the step 157 are executed after the housekeeping step 140, which can beneficially provide more computing time to perform the corresponding math operations in the step 155, the decision block, and the step 157.

Figure 16:
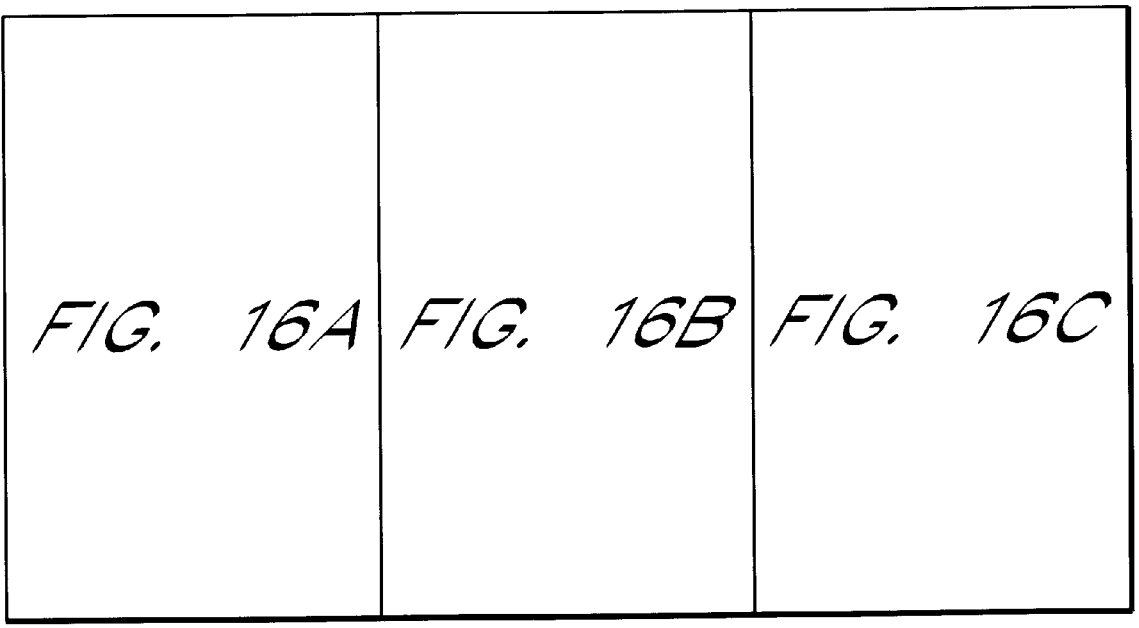
FIG. 16 consists of FIGS. 16A, 16B, and 16C and illustrates a process of controlling motor power with a timer or varying the current provided to motor windings to suppress hunting.
Figure 16A:
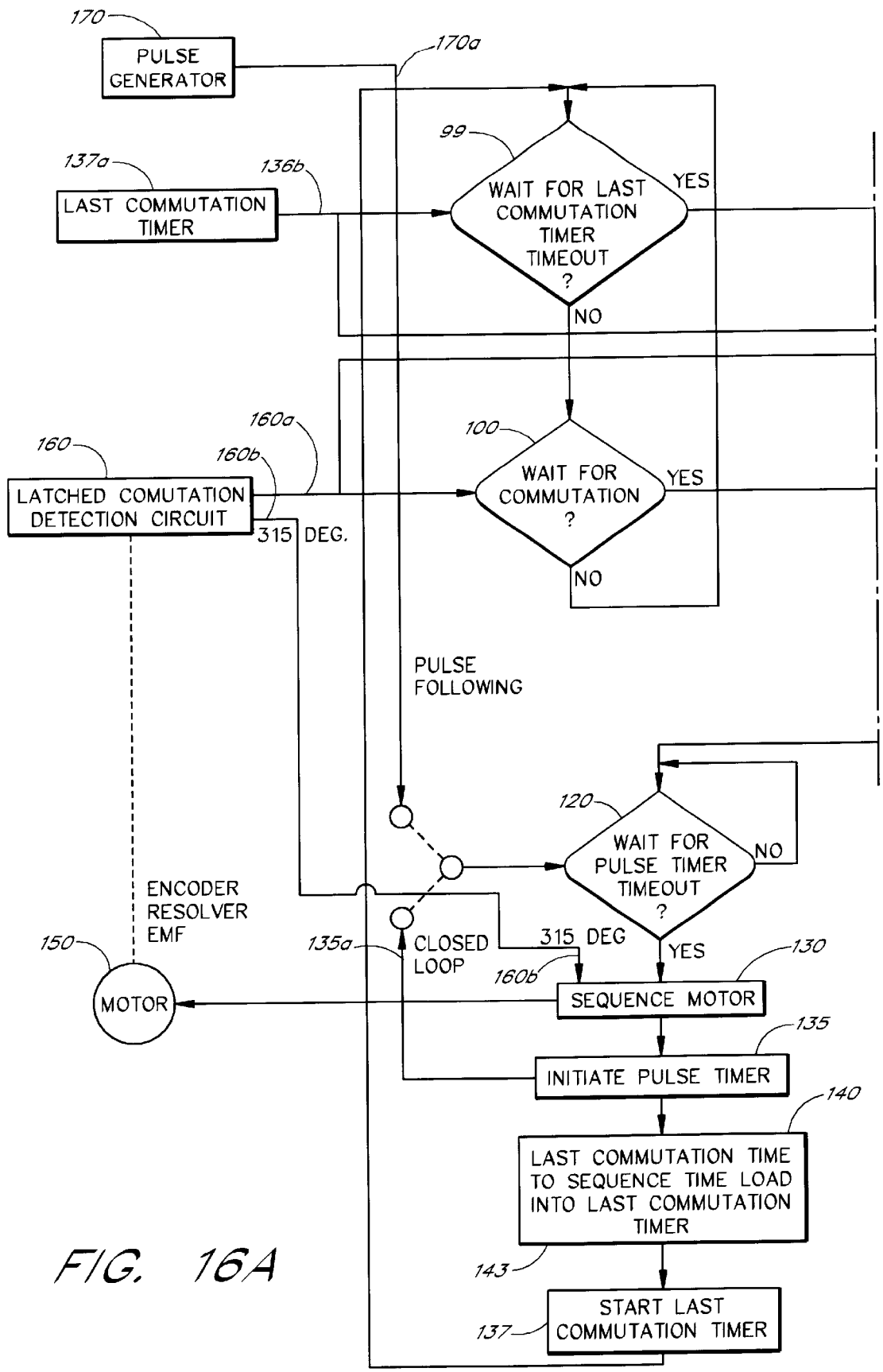
Figure 16B:
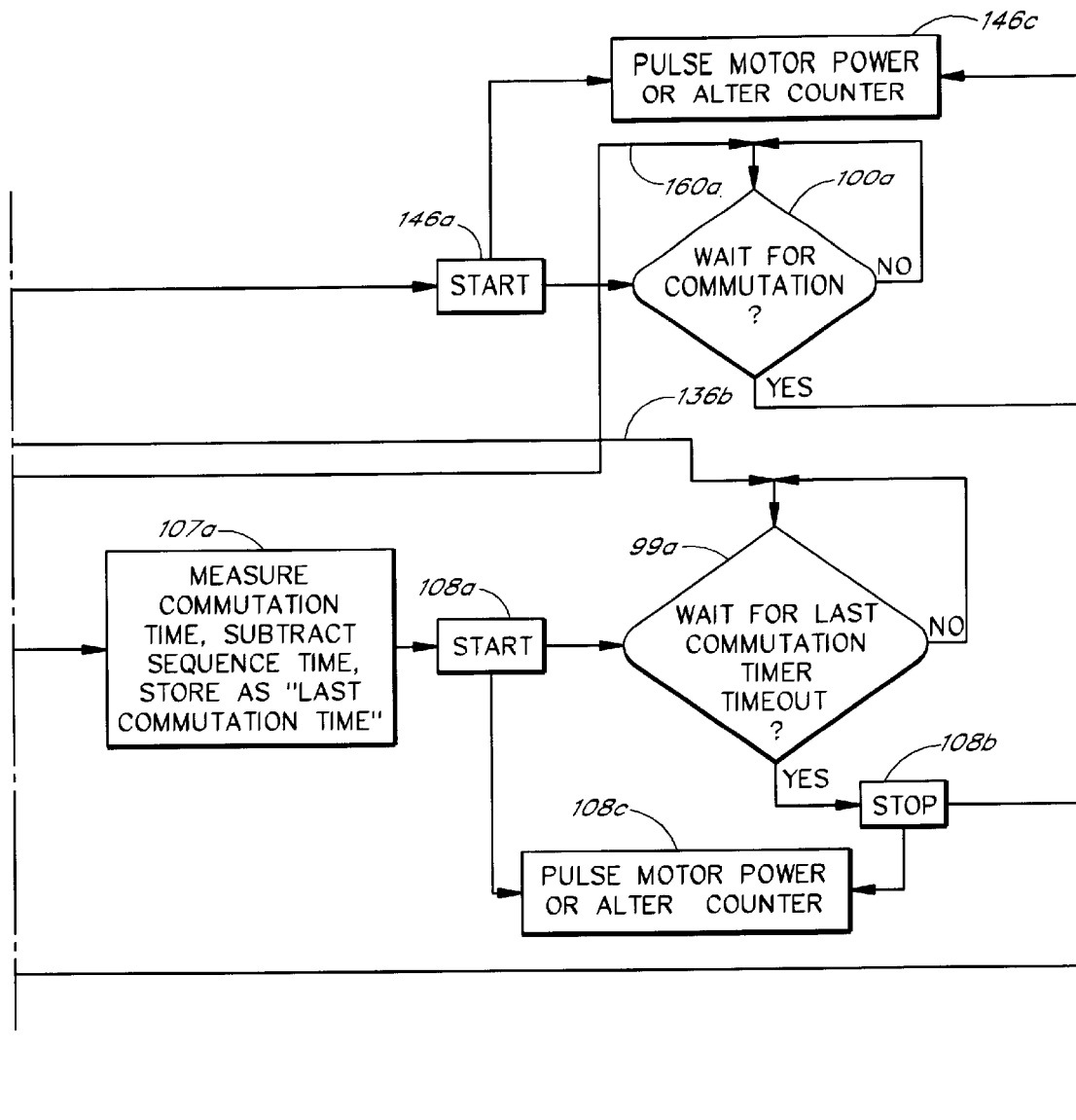
Figure 16C:
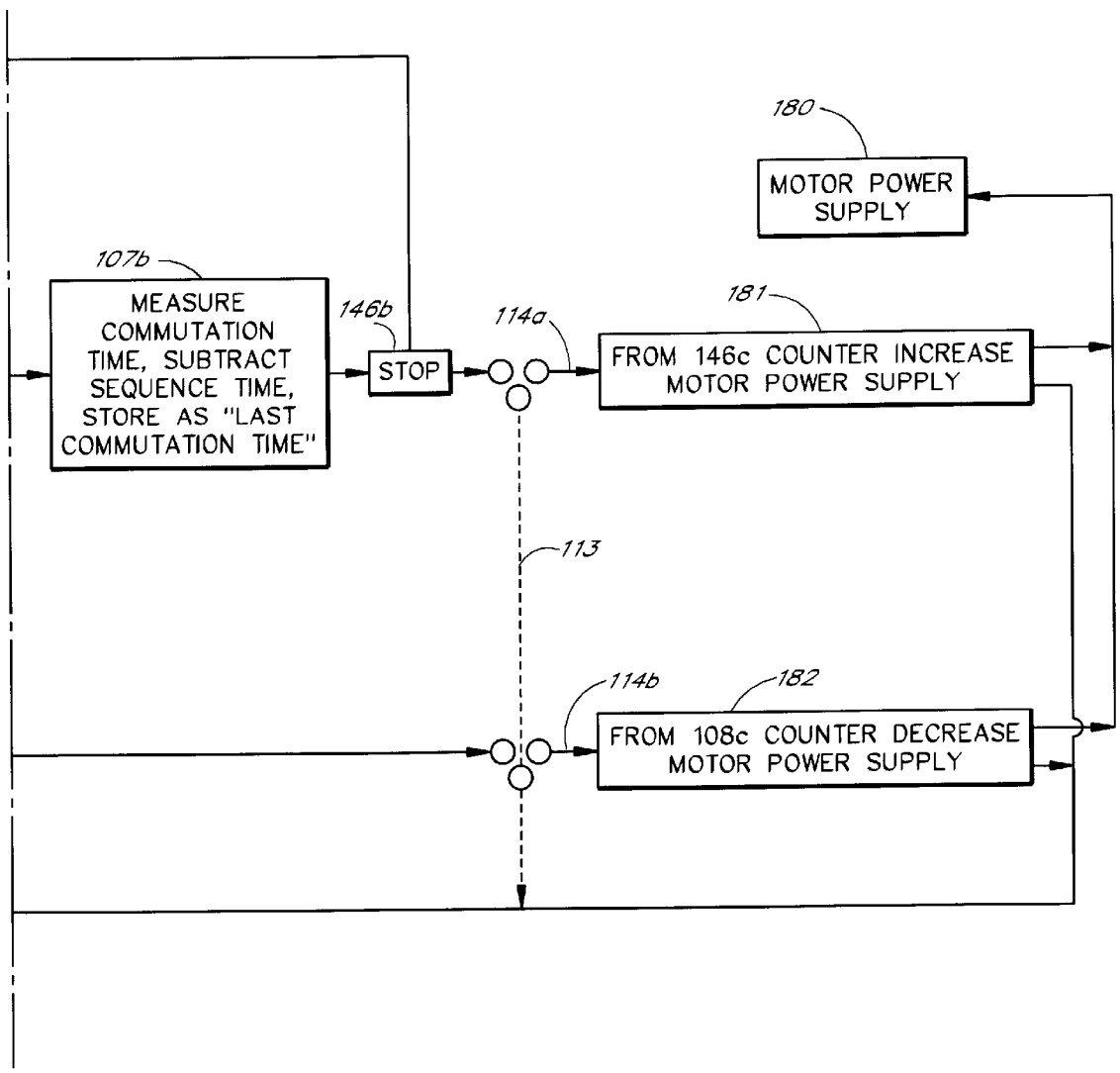

FIG. 16 illustrates a process of controlling motor power with a timer or varying the current provided to motor windings to suppress hunting. In one embodiment, the process illustrated in FIG. 16 is similar to the process described in connection with FIG. 12. However, the process described in connection with FIG. 12 detects the time location of the commutation signal with respect to the sequencing. By contrast, the process described in connection with FIG. 16 detects the rate of change of the sequence to commutation time from sequence to sequence. In the illustrated process, the process uses timers to obtain the time difference between the old "sequence to commutation time" and the new "sequence to commutation time."

In one embodiment, corrective action to suppress hunting is taken immediately during the time between the old and the new commutations or is held until after the last commutation signal or time-out indication arrives. Such corrective action to suppress hunting can include pulsing or changing to higher or lower power, turning power off, adding or subtracting time to the pulse or delay timers, back stepping, controlling the turn-on of selected motor windings, and the like.

In the illustrated process, anti-hunting signals are derived both from the acceleration and deceleration velocity slopes. In an alternate embodiment, only one of the acceleration or deceleration velocity slopes is used.

In the motor sequencing step 130, the motor 150 is sequenced after the detection of either the input pulse 170a from the pulse generator 170 in a pulse following mode or a time-out signal 135a from the pulse timer in a closed-loop mode. The pulse timer is started in the pulse timer step 135. The process advances to the housekeeping step 140 to obtain the next sequence phase. The process advances from the housekeeping step 140 to the step 143. In the step 143, the sequence time is determined and the desired commutation time calculated by adding the "last commutation time" to the sequence time. The result is loaded into a last commutation timer 137, and the timer is started. Depending on the detection time of the first commutation signal 160a at the decision block 100 or the last commutation time-out 137b at the wait for last commutation timer time-out step 99, one or both of the timers or actions 146, 108 will be started in the step 146a or the step 108a.

After the first commutation signal 160a is detected in the decision block 100, the commutation time is measured, and the sequence time is subtracted from the commutation time. The result is stored in a "last commutation time" variable in a step 107a. The process advances from the step 107a to a start timer step 108a, where the timer is started to suppress hunting. The process advances from the start timer step 108a to a step 108c and a decision block 99a.

In the step 108c, the process can prepare to pulse the motor power higher or with lower power, can prepare to open or to short the motor windings, can prepare to change the motor phase, can prepare to change the counting, and the like. In the decision block 99a, the process waits for the last commutation timer time-out. When the process has not received the last commutation timer time-out, the process loops from the decision block 99a back to the decision block 99a. When the process receives the last commutation timer time-out, the process proceeds from the decision block 99a to a stop timer step 108b, which stops the timer. The process advances from the stop timer step 108b to the step 108c and possibly to the step 181, the step 182, or returns to the pulse timer wait step 120. Where the process in the step 108c has changed the motor power setting, the process advances to the step 181 to increase the motor power supply setting or to the step 182 to decrease the motor power supply setting.

When the last commutation timer has timed out prior to the detection of the activation of the first commutation signal 160a, the process proceeds from the decision block 99 to the start timer step 146a. In the start timer step 146a, a timer is started to suppress hunting. The process advances from the start timer step 146a to a step 146c and to a decision block 100a.

In the step 146c, the process can prepare to pulse the motor with higher or with lower power, can prepare to open or to short the motor windings, can prepare to change the motor phase, can prepare to change the counting, and the like. In the decision block 100a, the process waits for the last commutation timer time-out. When the process has not received the last commutation timer time-out, the process loops from the decision block 100a back to the decision block 100a. When the process receives the last commutation timer time-out, the process proceeds from the decision block 100a to a stop timer step 146b, which stops the timer. The process advances from the stop timer step 146b to the step 146c and possibly to the step 181, the step 182, or returns to the pulse timer wait step 120 via the path 113. Where the process in the step 146c has changed the motor power setting, the process advances to the step 181 to increase the motor power supply setting or to the step 182 to decrease the motor power supply setting.

As an alternative embodiment, the count maintained by the counters in the steps 146c, 108c directly controls the adjustable motor power supply in the adjustment step 180 via a step 181 or a step 182. The earlier of the timer paths 146, 108 determines the polarity of the power adjustment. The count determines the amplitude or duration of the adjustment. Once the corrective action is taken, the process waits for the output 135a of the pulse timer step 135 in the closed-loop mode or the input pulses 170a from the pulse generator 170a in the open-loop mode. The process can repeat indefinitely.

Figure 17:
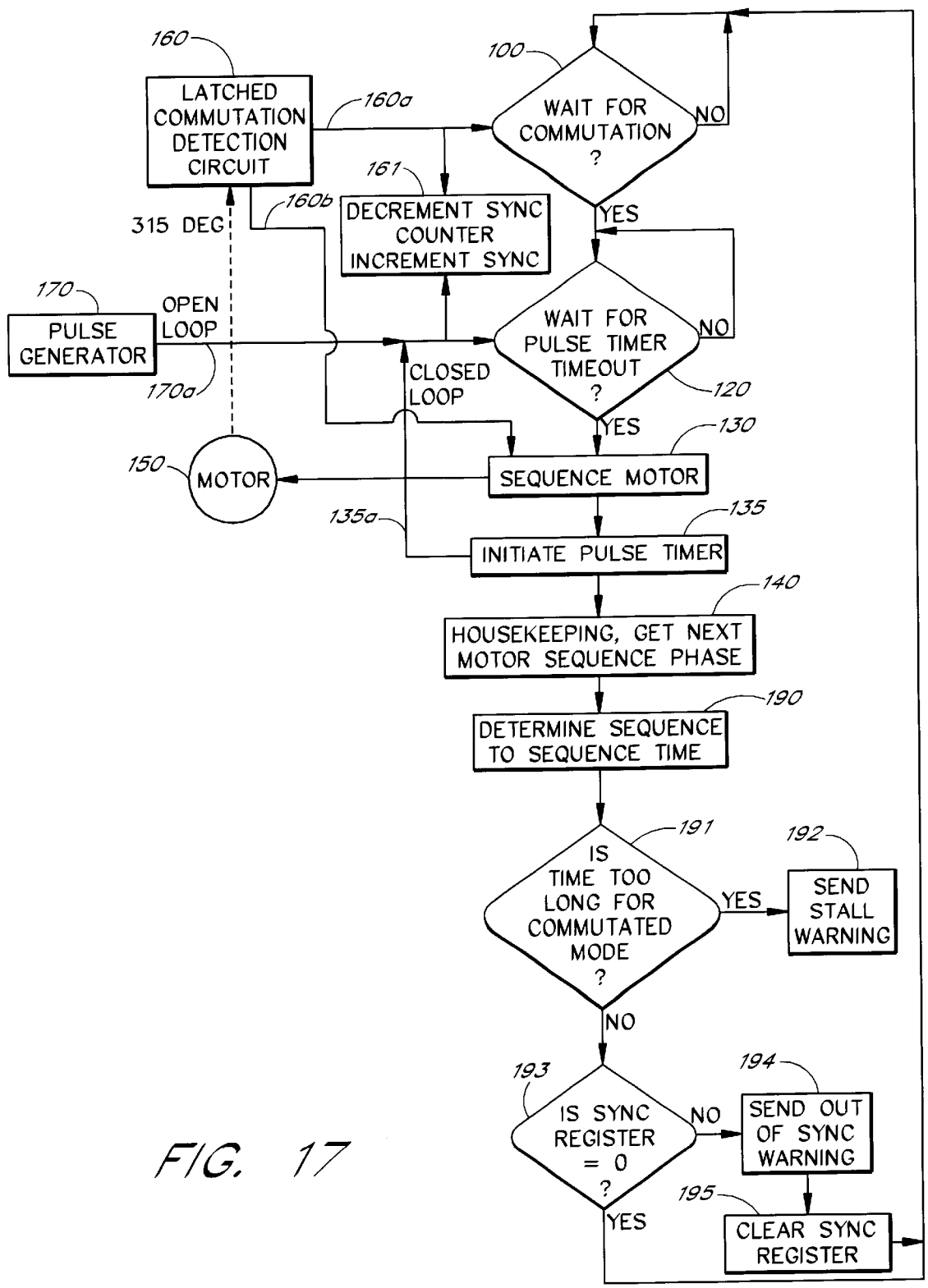
FIG. 17 illustrates a process of detecting an out-of-synchronization condition or a motor stall.

FIG. 17 illustrates a process of detecting an out-of-synchronization condition or a motor stall. In a commutated pulse following mode, a motor remains in synchronization with input pulses provided that the motor 150 is capable of achieving the speeds that correspond to the input pulse rate. The motor switches when both the input pulse signal and the commutation signal are present. If the motor 150 does not keep up with the input pulse signal, there will be more input pulses than sequences, and the process sequences the motor 150 based on the commutation signal.

In a pulse following mode according to an embodiment of the invention, a counter increments in response to an activation of the input pulse signal, and the counter decrements in response to an activation of a commutation signal. The contents of the counter advantageously detect out of synchronization conditions. After sequencing the motor, the process inspects the contents of the counter. The process generates an out-of-sync warning in response to a nonzero condition of the counter. In an alternate embodiment, the process sequences the motor 150 at an appropriate time to zero the counter.

The timing between sequences can be used for torque control in a closed-loop mode. Where a torque versus speed relationship of a motor is known, the motor's torque can be estimated using the sequencing time. For example, a piston driven by a motor in a dispenser can travel at a relatively high rate of speed until the piston encounters its load. After the piston is loaded, the piston slows down. The slowing of the piston can be detected and used to alert an operator or is provided as an input to a controller to initiate tasks associated with the contact with the load. In another example with power wrenches, drills, screwdrivers, and the like, a motor's slowing due to an applied load can be used to indicate an overload condition or to indicate that a predetermined amount of torque has been reached. In addition, the timing between sequences is also effective to set up a stall condition.

In the illustrated process, the pulse generator 170 provides the input pulse 170a to an input of a sync counter 161, and then provides the input pulse 170a to an input of the pulse timer wait step 120. In response to an activation of the first commutation signal 160a from the commutation detection circuit 160, the sync counter 161 decrements. Normally, the first commutation signal 160a and the input pulse 170a are sensed by the decision block 100 and the pulse timer wait step 120.

Where both the first commutation signal 160a and the input pulse 170a are present, the process sequences the motor 150 in the motor sequencing step 130. The process advances from the motor sequencing step 130 to the housekeeping step 140, where the process determines which windings to activate for the next sequence. The process advances from the housekeeping step 140 to a step 190, where the process calculates the time from the prior sequence to the present sequence. The process advances from the step 190 to a decision block 191.

In the decision block 191, the process compares the time calculated in the step 190 to a predetermined value or reference. Where the time exceeds the predetermined value, the process proceeds from the decision block 191 to a step 192, where the process activates a stall warning or alarm. Where the time is less than the predetermined value, the process proceeds from the decision block 191 to a decision block 193, where the process inspects the count maintained by the sync counter 161. When the process detects that the count stored in the sync counter 161 is zero, the process returns from the decision block 193 to the decision block 100. When the process detects that the count stored in the sync counter 161 is nonzero, the process proceeds from the decision block 193 to a synchronization warning step 194.

In the synchronization warning step 194, the process can, for example, alert an user of the lack of synchronization between the motor and the controller. The process advances from the synchronization warning step 194 to a clear sync register step 195, where the process clears the sync counter 161. The process returns from the clear sync register step 195 to the decision block 100. The process can loop indefinitely.

Figure 18:
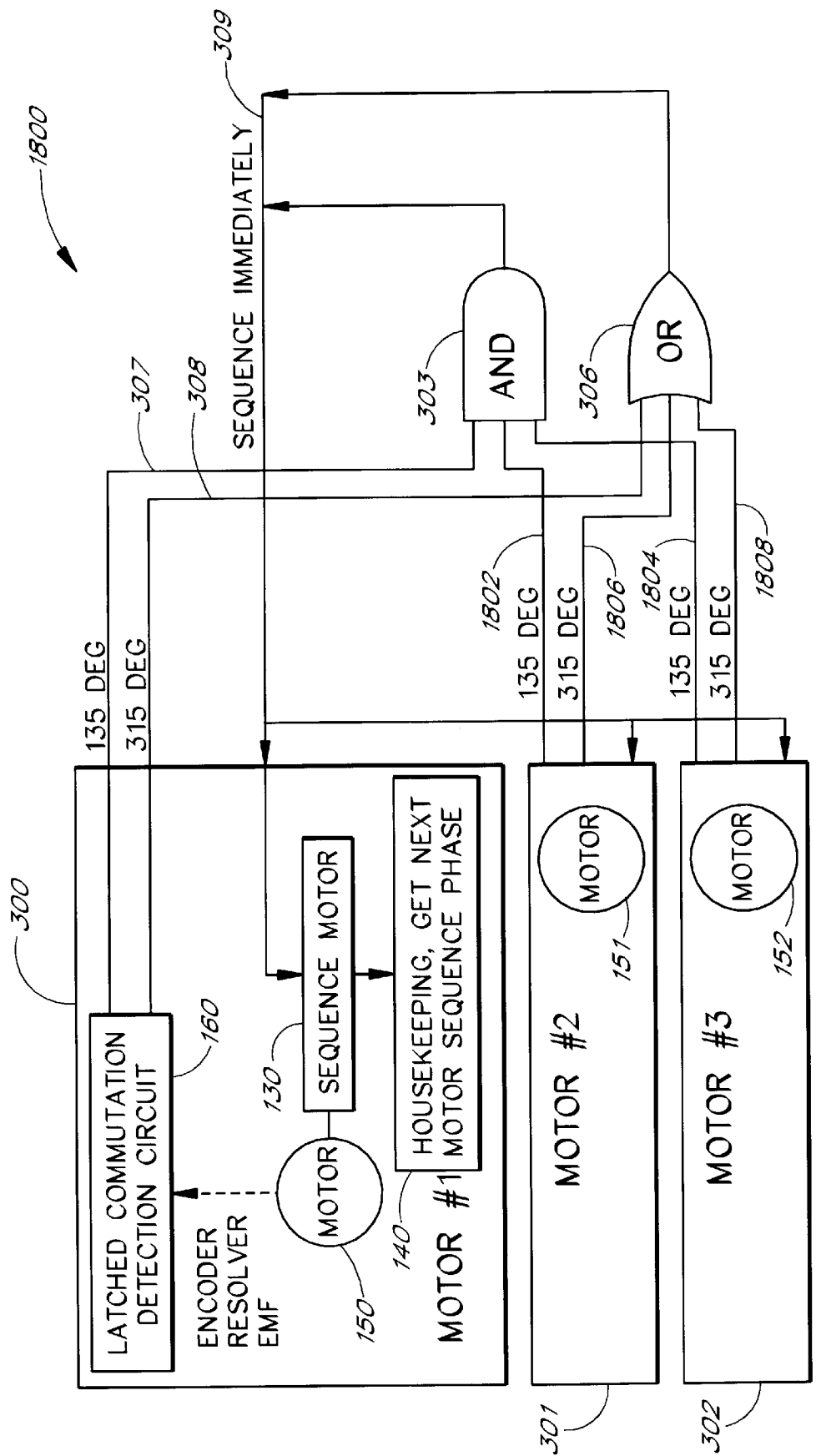
FIG. 18 illustrates one embodiment of synchronization with multiple motors.

FIG. 18 illustrates one embodiment of a synchronization circuit 1800 that synchronizes with multiple motors. In one embodiment, the synchronized motors are synchronized to the slowest motor in the group of synchronized motors.

Synchronization of two or more motors is often desirable where mechanical coupling is neither practical nor desirable. In one example, mechanical coupling is not desirable where it is necessary to vary the mechanical phase angle between the synchronized motors. The motors can be synchronized in accordance with several processes, which synchronize the motors to an input pulse from a computer or some other pulse generating source. The received input pulse acts as a motor signal or master controller. Advantageously, a motor in the group of synchronized motors can be temporarily disconnected from the synchronizing control to change the relative mechanical phase angle or speed of the motor with respect to the remaining motors in the group of synchronized motors.

In one embodiment, the process waits for an activation of a 135-degree commutation signal to arrive from all of the motors in the group of synchronized motors before sequencing the motors. Thus, the slowest motor, i.e., the motor that is the last in time to activate the 135-degree commutation signal, sets the speed of all the motors in the group of motors. This allows the process to synchronize both the speed and the relative phase angle of the motors. The motors are synchronized so that each motor activates its 135-degree commutation signal relatively close in time, i.e., within the time from a sequence to another sequence. In one embodiment, if a motor strays too far out of synchronization with respect to the other motors, the motor is taken offline.

It will be understood by one of ordinary skill in the art that the motor that controls the speed of the other motors can be arbitrarily selected, provided that the selected motor's speed is slower than that of the other motors. In addition, the AND gate 303 can have an additional synchronized input from a timer or other computer logic to control the speed of the motors.

To allow synchronization among a relatively diverse group of motors and loads, one embodiment according to the invention controls a motor separately with respect to the motor's speed, step count and phase to synchronize that motor to a master motor or master signal. This allows a motor to obtain its desired relationship to the master independently, without affecting the other motors.

With reference to FIG. 18, the illustrated embodiment of the synchronization circuit 1800 includes a first motor driver/controller 300, a second motor driver/controller 301, and a third motor driver/controller 302. The first motor driver/controller 300 includes a first motor 150. The second motor driver/controller 301 includes a second motor 151. The third motor driver/controller 302 includes a third motor 152. Of course, the number of motors and motor driver/controllers in the synchronization circuit 1800 can vary arbitrarily depending on the application.

The first motor driver/controller 300 generates a first 135-degree commutation signal 307 and a first 315-degree commutation signal 308. The second motor driver/controller 301 generates a second 135-degree EMF commutation signal 1802 and a second 315-degree EMF commutation signal 1806. The third motor driver/controller 302 generates a third 135-degree commutation signal 1804 and a third 315-degree commutation signal 1808. In one embodiment, the first motor driver/controller 300, the second motor driver/controller 301, and the third motor driver/controller 302 latch the first 135-degree commutation signal 307, the second 135-degree commutation signal 1802, and the third 135-degree commutation signal 1804, respectively, to a high logical state in response to a detection of commutation.

In one embodiment, the first 135-degree commutation signal 307, the second 135-degree commutation signal 1802, and the third 135-degree commutation signal 1804 are provided as inputs to an AND gate 303. The state of an output of the AND gate 303 is provided as a "sequence immediately" signal to the first motor driver/controller 300, the second motor driver/controller 301, and the third motor driver/controller 302 to sequence the motor in the motor sequencing step 130 in response to a combination of an activation of the output of the AND gate 303. It will be understood by one of ordinary skill in the art that in certain embodiments, the motor which is designated as the master and the motor or motors designated as the slaves can be arbitrarily selected. In one embodiment, a microprocessor simulates the slowest motor that is used as the master. It will also be understood by one of ordinary skill in the art that at least a portion of the circuitry illustrated herein can also be implemented in firmware. For example, the AND gate 303 and an OR gate 306 can be implemented in firmware as lines of code.

In one embodiment, the first 315-degree EMF commutation signal 308, the second 315-degree EMF commutation signal 1806, and the third 315-degree EMF commutation signal 1808 are combined by the OR gate 306. In response to an activation of the 315-degree EMF commutation signal from any of the motor/driver controllers, the OR gate 306 activates to allow the synchronization circuit 1800 to relatively rapidly sequence the first motor 150, the second motor 151, and the third motor 152.

Figure 19:
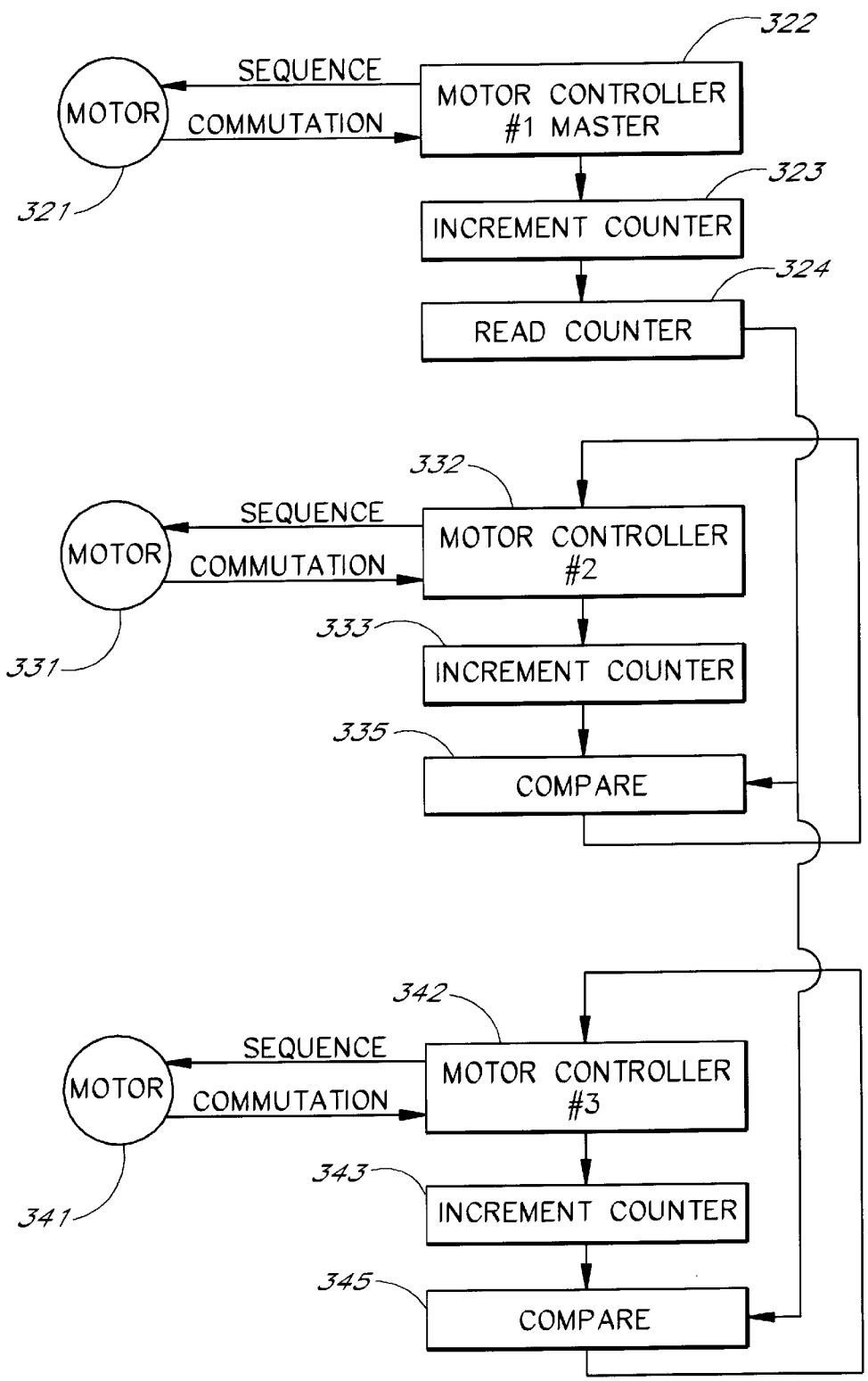
FIG. 19 illustrates a process of relative multiple-motor control.

The relative-phase process shown in FIG. 19 is illustrated with a master motor 321, a first slave motor 331, and a second slave motor 341. The master motor 321, the first slave motor 331, and the second slave motor 341 are controlled by a first motor controller 322, a second motor controller 332, and a third motor controller 342, respectively. In the illustrated embodiment of the relative-phase process, the first motor controller 322 corresponds to the master controller.

In the first motor controller 322, the process sequences the master motor 321. The process sequences the master motor 321 in the first motor controller 322 without regard to the state of the first slave motor 331 or the second slave motor 341. The process advances from the first motor controller 322 to a first increment counter step 323. In the first increment counter step 323, the process increments a counter that is used by the first slave motor 331 and the second slave motor 341 to synchronize to the master motor 321. The process advances from the first increment counter step 323 to a read counter step 324.

In the read counter step 324, the process reads a first count stored in the counter and provides the first count as an input to a first compare step 335 and a second compare step 345.

In the first compare step 335, the process reads a second count stored in a second counter by a second increment counter step 333 and compares the second count to the first count. The process provides the difference between the second count and the first count as an input to the second motor controller 332. The second motor controller 332 increases or decreases the stepping rate or the rotation speed of the first slave motor 331 in response to the difference between the second count and the first count to maintain a desired difference. When the process sequences the first slave motor 331 in the second motor controller 332, the process advances to the second increment counter step 333 to update the second counter.

Similarly, in the second compare step 345, the process reads a third count stored in a third counter by a third increment counter step 343 and compares the third count to the first count. The process provides the difference between the third count and the first count as an input to the third motor controller 342. The third motor controller 342 increases or decreases the stepping rate or the rotation speed of the second slave motor 341 in response to the difference between the third count and the first count to maintain a desired difference. When the process sequences the second slave motor 341 in the third motor controller 342, the process advances to the third increment counter step 343 to update the third counter. It will be understood by one of ordinary skill in the art that the motor that controls the speed of the other motors can be arbitrarily selected. In addition, the AND gate 303 can have an additional synchronized input from a timer or other computer logic to control the speed of the motors.

Figure 20:
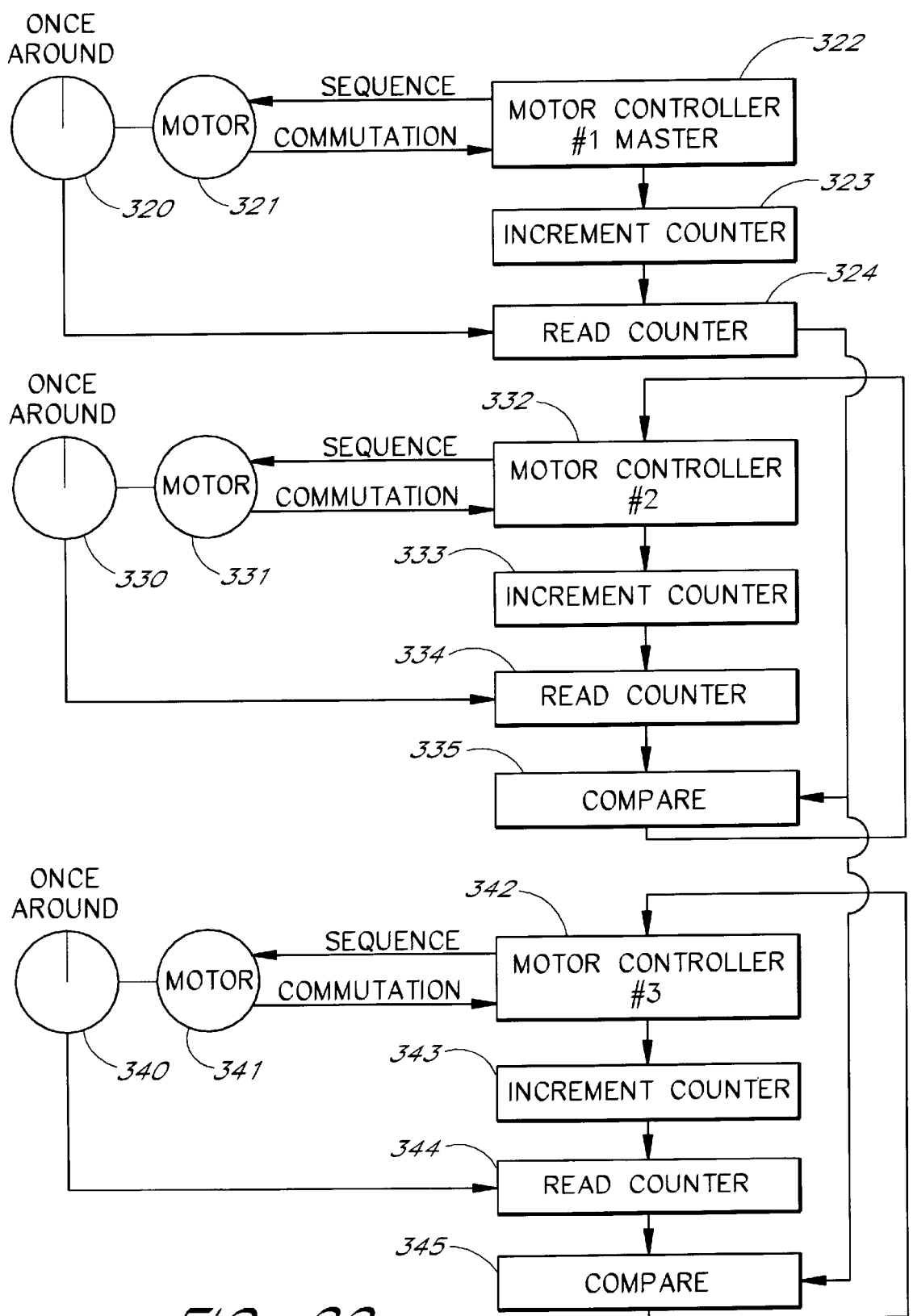
FIG. 20 illustrates a process of absolute multiple-motor control.

FIG. 20 illustrates one embodiment of the absolute-phase process of multiple-motor control. With reference to FIG. 20, the illustrated absolute-phase process is shown with a first motor 321, a second motor 331, and a third motor 341. The absolute-phase process includes a first once-around sensor 320, a second once-around sensor 330, and a third once-around sensor 340. The first once-around sensor 320 generates a first once-around signal, which is provided as an input to the first read counter step 324. The first once-around signal indicates when a rotor of the first motor 321 has completed a revolution. The once-around signal can be used to selectively change the speed of a motor, when the motor has drifted out of synchronization. Similarly, the second once-around sensor 330 and the third once-around sensor 340 provide a second once-around signal and a third once-around signal to a second read counter step 334 and a third read counter step 344, respectively. The second once-around signal indicates when a rotor of the second motor 331 has completed a revolution. The third once-around signal indicates when a rotor of the third motor 341 has completed a revolution.

The first motor controller 322 sequences the first motor 321 independently of the second motor controller 332 and the third motor controller 342. When the first motor controller 322 sequences the first motor 321, the process increments the first counter in the first increment counter step 323.

In the first read counter step 324, the second read counter step 334, and the third read counter step 344, the process latches and stores a first sequence count stored by the first increment counter step 323, a second sequence count stored by the second increment counter step 333, and a third sequence count stored by the third increment counter step 343, respectively. In the first read counter step 324, the process provides the first sequence count as an input to the first compare step 335 and a second compare step 345.

In the first compare step 335, the process computes a first difference between the second sequence count from the second read counter step 334 and the first sequence count from the first read counter step 324. The first difference is provided as an input to the second motor controller 332. The second motor controller 332 sequences the second motor 331 to maintain a specified count difference between the second sequence count and the first sequence count. This allows the speed, the position count, and the absolute motor phase of the second motor 331 to be slaved to the first motor 321, which corresponds to the master.

In the second compare step 345, the process computes a second difference between the third sequence count from the third read counter step 344 and the first sequence count from the first read counter step 324. The second difference is provided as an input to the third motor controller 342. The third motor controller 342 sequences the third motor 341 to maintain a specified count difference between the third sequence count and the first sequence count. This allows the speed, the position count, and the absolute motor phase of the third motor 341 to be slaved to the first motor 321, which corresponds to the master. The process allows the first motor 321, the second motor 331, and the third motor 341 to act alone and to allow a controllable variation between the first motor 321, the second motor 331, the third motor 341, and their respective loads. It will be understood by one of ordinary skill in the art that the motor that controls the speed of the other motors can be arbitrarily selected.

FIG. 19 and FIG. 20 illustrate multiple-motor control processes according to a master-slave approach. A relative-phase process described in connection with FIG. 19 synchronizes the motors according to a relative-phase relationship. An absolute-phase process described in connection with FIG. 20 synchronizes the motors according to an absolute-phase relationship.

Regardless of the type of rotor position sensor used for commutation, reliable starting and stopping of the motor to maintain count necessitates known procedures and knowledge of the load.

For example, a relatively high inertia load driven by a long belt requires a different starting procedure than a standalone motor without a load. Starting a motor that derives commutation from an optical encoder or resolver, which does not depend on rotational speed, simplifies a relatively high acceleration starting procedure. Starting a motor that uses commutation detection by EMF sensing can be more complicated. EMF sensing of commutation does not work until a motor is up to speed, and getting the motor up to speed may require relatively high-acceleration starting procedures.

In addition, some applications require stopping a motor at a desired detent position. A technique of detecting the rotor detent location while using PWM control is very important in the detection of a good or a bad stop and in the detection of ringing after a stop.

One embodiment of a process includes detection of the EMF at relatively low sequence rates. A PWM commutation signal actually measures the result of the EMF and rotor displacement within the detent position. The process also detects how many detent positions have been traversed during a bad stop. In response to a detection and measurement of a bad stop, the process can take corrective action.

Figure 21:
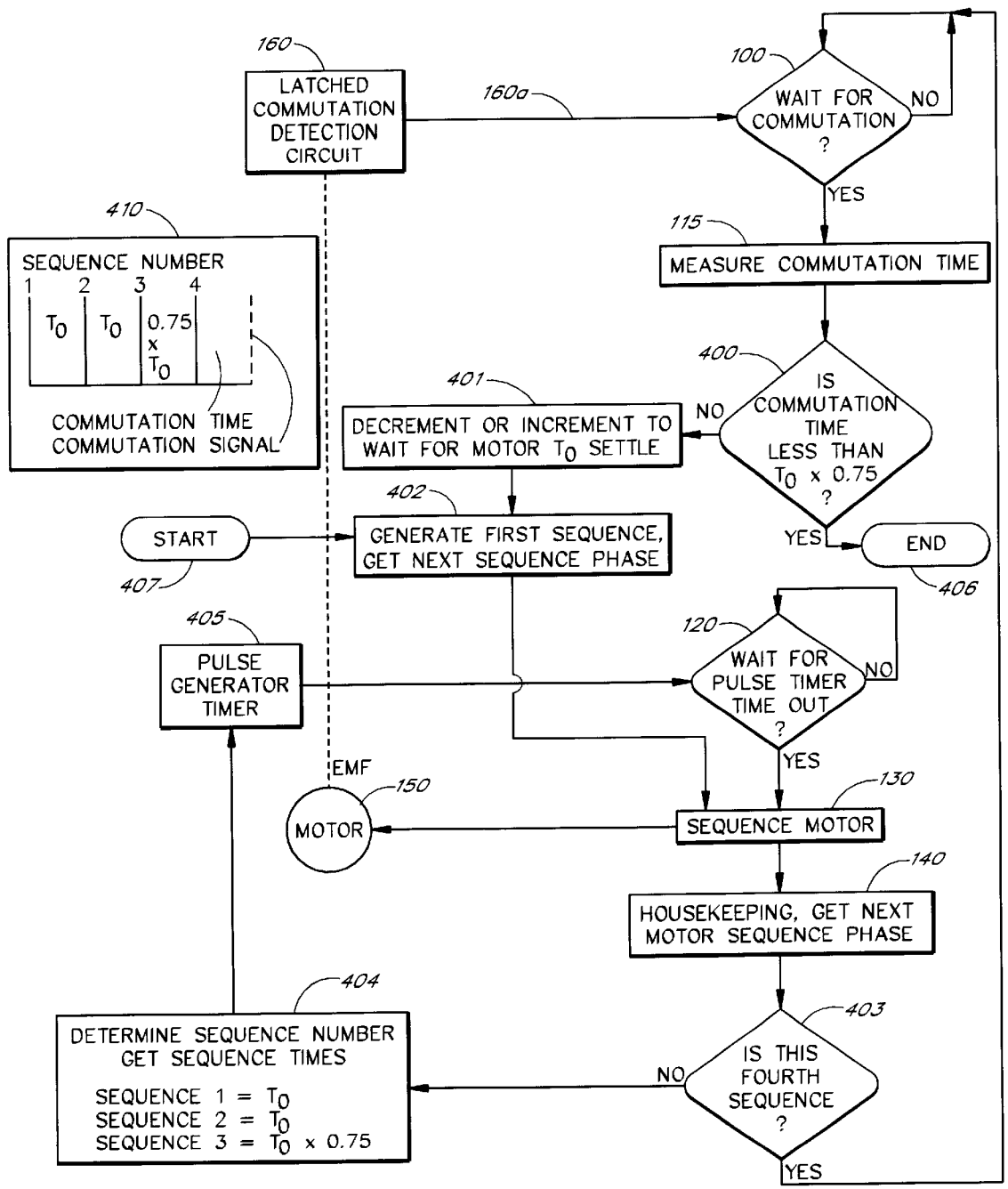
FIG. 21 illustrates a process of starting a motor by automatically determining timing for an initial starting sequence.

FIG. 21 illustrates a process of starting a motor by automatically determining timing for an initial starting sequence. The process is capable of an automatic start in closed-loop operation and automatic deceleration and stop. The process can operate with and without PWM commutation.

As shown in FIG. 21, the process for determining the starting sequences for EMF commutation takes the first 3 to 4 steps at a specified ratio, i.e., the first to the second sequencing time equal to the second to third sequencing time, the third to the fourth time being approximately 75% to 80% of the initial sequencing time. After the first four sequences are taken, the process holds the sequence phase of the fourth sequence. The process measures the EMF commutation signal's time of transition. For a good start, the commutation signal transition after the 4th sequence is less than the third to the fourth sequence time. The process is repeated with incrementally longer or shorter first, second, third, and fourth sequence times and with continued monitoring of commutation transitions. With a best fit determined, the process ends.

The process can include automated deceleration and stopping. This depends on the reliable sensing of the stopping conditions. In one embodiment according to the invention, the reliable sensing of the stopping conditions is advantageously provided by a PWM commutation signal without an encoder.

The full step stopped detent position is a multiple of the encoder counts per sequence. In one embodiment, the next detent is four times the encoder count per sequence when, upon stopping, the motor traverses the desired detent position, i.e., passes the desired detent position. If the motor 150 is holding the detent position, then the ringing is represented by the changing count around the desired detent count of a multiple of the encoder counts per sequence.

It is not necessary for an EMF sensing transformer to have a relatively good low EMF frequency response. The EMF sensing transformer is intended to operate at or above the rate of the inverse of the motor winding time constant. The detection of a good or a bad stop becomes difficult and is greatly influenced by the rate that the motor stops. A good stop is generally indicated by relatively little or no activity from the commutation signal after a stop. A bad stop, i.e., when the rotor traverses detent positions, is indicated by many transitions from the commutation signal after a stop.

The EMF detection circuit normally operates by taking the difference of the currents of the two windings that are "on," i.e., are conducting current. As the motor is sequenced, the two "on" windings are continuously changed with each sequence. On a stop condition, the windings are not sequenced, but the "on" windings are chopped by the PWM control. In one embodiment, both "on" windings are turned on and off at substantially the same time. A comparator output just prior to turning the windings off detects which winding charged to a higher current level, and indicates the winding an output of the comparator or the commutation signal. In a stepper motor, the inductance of the motor winding varies with the displacement within the detent position.

The two "on" windings have about equal inductance at the detent-zero position. The EMF detection circuit's output now represents the location inside the detent position. During a bad stop, i.e., where the motor traverses a desired detent position, the process detects each traverse past the desired detent position and also detects the ringing within a detent position. The process can take corrective action not only to the stop on a desired detent position and to reduce ringing, but also to compensate for deviations in the detent position due to friction.

The process will now be described with reference to FIG. 21. The process starts at a start state 407 and proceeds to a generate step 402. In the generate step 402, the process generates the first sequence that will be applied to the windings of the motor 150. The first sequence is provided by the housekeeping step 140. The process advances from the generate step 402 to the motor sequencing step 130, where the process sequences the motor 150. The process advances to the housekeeping step 140, where the process obtains the next sequence. The process advances from the housekeeping step 140 to a decision block 403.

In the first iteration through the process and the decision block 403, the first sequence applied to the motor 150 is not the fourth sequence, and the process accordingly proceeds from the decision block 403 to a step 404. In the step 404, the process determines the sequence number and accordingly computes a sequence time from T0, the initial sequence time, which is provided as an input to a pulse generator timer 405. The process returns to the pulse timer wait step 120, where the process waits for the pulse generator timer 405 to time out and to generate a pulse.

In response to a receipt of the pulse from the pulse generator timer 405, the process advances from the pulse timer wait step 120 to the motor sequencing step 130, which sequences the motor 150. The process advances to the housekeeping step 140 to obtain the next sequence phase. The process advances from the housekeeping step 140 to the decision block 403.

In the second iteration through the process, the decision block 403 directs logic flow again to the step 404, where T0 is again chosen and provided as an input to the pulse generator timer 405. The process returns to the pulse timer wait step 120. The process detects the time-out of the pulse generator timer 405 in the pulse timer wait step 120, and the process proceeds to sequence the motor in the motor sequencing step 130. The process advances from the motor sequencing step 130 to the housekeeping step 140. The process obtains the next sequence phase in the housekeeping step 140. The process advances from the housekeeping step 140 to the decision block 403.

In the third iteration through the process, the decision block 403 again directs logic flow to the step 404, where a time of 75% of T0 is calculated and applied as an input to the pulse generator timer 405. The process returns to the pulse timer wait step 120. Upon the time-out of the pulse generator timer 405, as detected by the pulse timer wait step 120, the process proceeds to the motor sequencing step 130 to sequence the motor 150. The process advances to the housekeeping step 140 to obtain the next sequencing phase.

In the fourth iteration through the process, the decision block 403 directs logic flow to the decision block 100, where the process loops or waits for an interrupt. In response to an activation of the first commutation signal 160a from the commutation detection circuit 160, the process advances from the decision block 100 to the measure step 115. In the measure step 115, the process measures the time from the sequencing of the motor 150 in the motor sequencing step 130 to the activation of the first commutation signal 160a. The process advances from the measure step 115 to a decision block 400.

In the decision block 400, the process compares the time measured in the measure step 115 to a value equal to 75% of T0. The motor 150 has been successfully started and the process ends by proceeding from the decision block 400 to the end state 406 if the time is less than the 75% value. The process proceeds from the decision block 400 to an adjust step 401 to generate a new T0 when the time is not less than 75% of the value of T0.

In the adjust step 401, the process increments the value T0 in the adjust step 401. In addition, the adjust step 401 includes a relatively short wait state such as 500 milliseconds to allow the motor 150 to settle before re-initiating the process. The process advances from the adjust step 401 to the generate step 402, where the process again generates the new first sequence time T0 with which to sequence the motor 150. Iterations 1 through 4 are repeated as necessary until the decision block 400 determines that the commutation time from the measure step 115 is less than 75% of the new sequence time T0. The process continues until it ends at the end state 406. As the process ends, the value T0 is obtained from the adjust step 401 and assigned to the first two starting times. The process assigns a value of 75% of T0 as the third starting time. Where needed, the process assigns the commutation time measured in the measure step 115 to the fourth starting time.

An insert 410 to FIG. 21 illustrates a relationship among the first four starting steps. In operation, the initial starting times are used by the motor sequencing step 130 to sequence the motor 150 without the need to receive an activation of the first commutation signal 160a. After the process uses the last starting time to sequence the motor 150 with the motor sequencing step 130, the process proceeds to sequence the motor 150 at least partially in response to an activation of the first commutation signal 160a. In one embodiment, the results of the starting sequence process is checked by verifying that the interval between sequences during the starting process progressively shrinks, which represents relatively smooth acceleration.

FIG. 22 illustrates waveforms of deceleration of a motor under a variety of conditions. To stop a motor, one embodiment of the process uses the starting step times obtained from starting the motor in reverse order as three open-loop sequencing times.

With reference to FIG. 22, when the motor stops in the correct detent position for the stopped motor phase, the motor hunts within this detent. The interval for the first commutation signal 160a is from about 3 times to about 6 times the last stopping step time. If the desired detent position cannot be held, the motor steps into a subsequent stable detent location. In doing so, the intervals between activations of the first commutation signal 160a will be close to and increasing in time from that of the last open-loop stopping step time. During the calibration step, a long move is made by the motor 150 with a known deceleration slope.

The last sequence phase is held, and the commutation transition times are measured after the move and after the last three open-loop sequences are made. The deceleration slope is shortened if the initial commutation transition is significantly longer than the last open-loop sequence time. This process continues to run until the commutation transition time after the open-loop sequence is close to the last open-loop stopping sequence time.

In one embodiment, the process treats the motor 150 as though the motor 150 has rotated beyond the desired detent position into either the detent position next to the desired detent position or to other subsequent detent positions. A number of transitions is related to the number of detent positions traversed. The deceleration slope is then lengthened. The process runs again to ensure that the transition time is longer, by a factor of 3 or more, than the last open-loop sequence time.

FIG. 22A illustrates the waveforms generated by a PWM commutation sensing circuit after the last open-loop stopping step is taken, and where the motor is holding position. FIG. 22B illustrates the waveforms generated by a PWM commutation sensing circuit after the last open-loop stopping step is taken, and where the motor is not holding position.

After a motor is decelerated and stopped, the two "on" windings' fall-step position is maintained with enough power to hold the motor in the detent position. If the motor is not sequenced and the motor uses PWM for holding, the PWM commutation signal 235a is no longer an EMF signal 160a, but rather a signal representing the rotor position within the detent position PWM commutation.

The inductances of the motor windings vary with the position of the rotor relative to the stator due to the flux gap variation as the rotor rotates. Typically, the inductances in the two windings are about equal when the rotor is in the center of a detent position formed by the two windings. As the motor's rotor is rotated away from a detent position, one winding increases in inductance, and the other winding decreases in inductance.

The inductances are related to current if the current applied to both windings is chopped on and off at about the same time. The EMF sensing transformer 24 and the comparator 28 described in connection with FIG. 7, FIG. 9 and FIG. 10, and the process described in connection FIG. 8, will output the PWM commutation signal 235a representative of the displacement of the rotor from the zero detent position developed from the two "on" windings. The difference in current between the two windings, just prior to turning off both windings, is represented by the output of the comparator 28 as shown in FIG. 7, FIG. 9, and FIG. 10.

FIG. 22A and FIG. 22B illustrate the waveforms generated by a PWM commutation detection circuit, as illustrated by FIG. 7 or by FIG. 9, after the last open-loop sequence is taken in a stopping process where PWM is used for holding current. A horizontal axis 413a in FIG. 22A and a horizontal axis 413b in FIG. 22B indicate time, with increasing time to the right. A waveform 411 indicates a velocity of the motor in FIG. 22A. A waveform 419b indicates a velocity of the motor in FIG. 22B. The waveform 411 and the waveform 419b illustrate a motor slowing to zero velocity and oscillating around zero velocity as shown by the zero crossings. A respective zero velocity line 412a, 412b in each figure also represents displacement from the detent center when PWM chopping 437 is initiated at time 414. Further details of FIG. 22A and of FIG. 22B are described later in connection with FIG. 22E and with FIG. 22F.

Figure 22C:
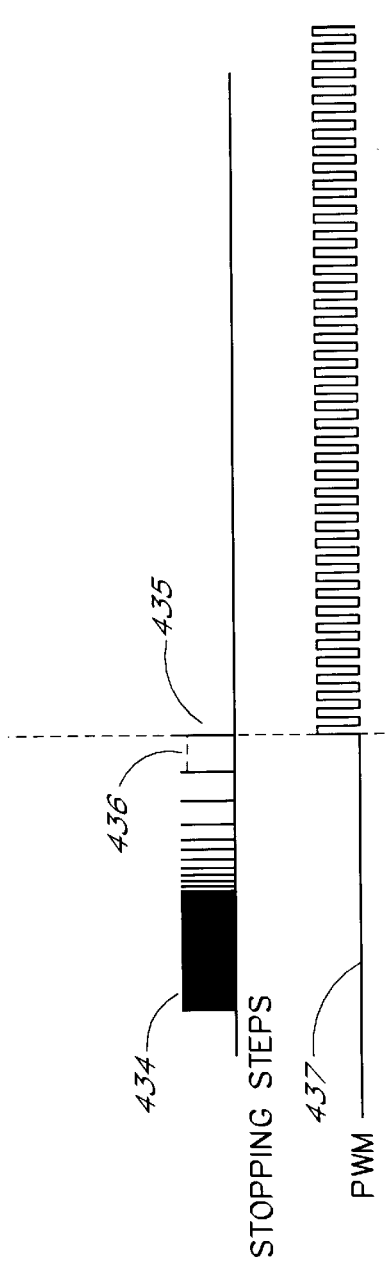
FIG. 22C illustrates the waveforms comparing the timing of the sequencing and the PWM signal.

A waveform 415b in FIG. 22B illustrates the PWM commutation signal 235a, as described in connection with FIG. 8, when the motor does not hold in a detent position. A transition time from an edge 422 to an edge 423 as shown in FIG. 22B is near in duration to the last open-loop stopping sequence time 436 shown in FIG. 22C. After the motor skips several detent positions as shown by the edge 423 to an edge 424, the edge 424 to an edge 425, and the like, the motor eventually slows down enough to hold in a detent position 426. The number of transitions shown in FIG. 22B is related to the number of detent positions traversed.

FIG. 22C illustrates the waveforms comparing the timing of the sequencing and the PWM signal. A waveform 434 illustrates sequencing prior to stopping. After a last sequence 435, the PWM commutation signal 235a, as described in connection with FIG. 8, is illustrated by a waveform 415a, as shown in FIG. 22A. If the motor holds in the desired detent position, the transition time intervals shown in FIG. 22A by an edge 416 to an edge 417, the edge 417 to an edge 418, and the edge 418 to an edge 419, are much greater than the last open-loop stopping sequence time interval 436, as shown in FIG. 22C.

Figure 22D:
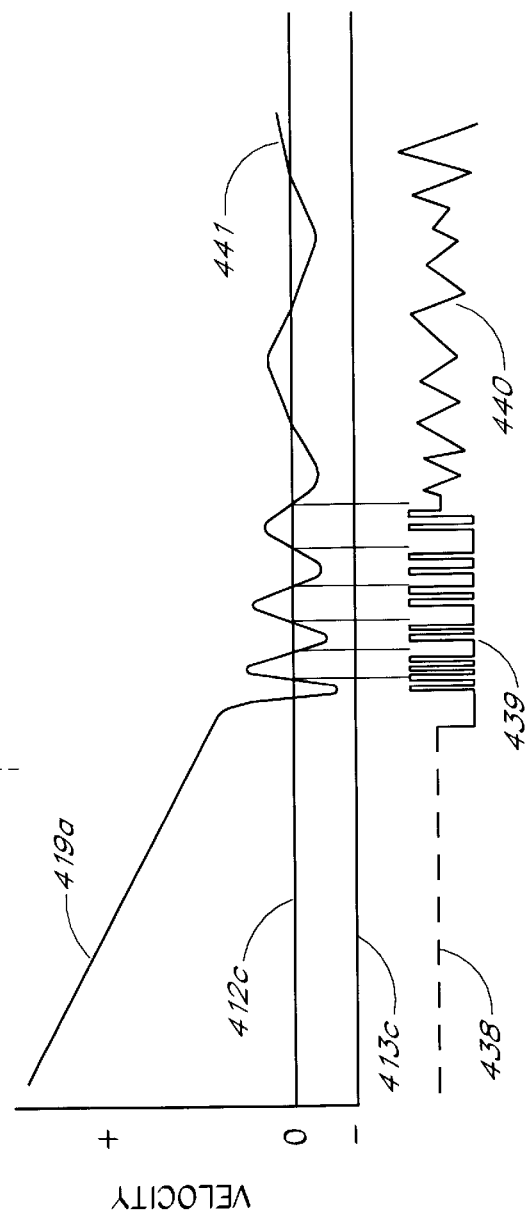
FIG. 22D illustrates the waveforms generated by an EMF commutation sensing circuit after the last open-loop stopping step is taken, and where the motor is not holding position.
Figure 22E:
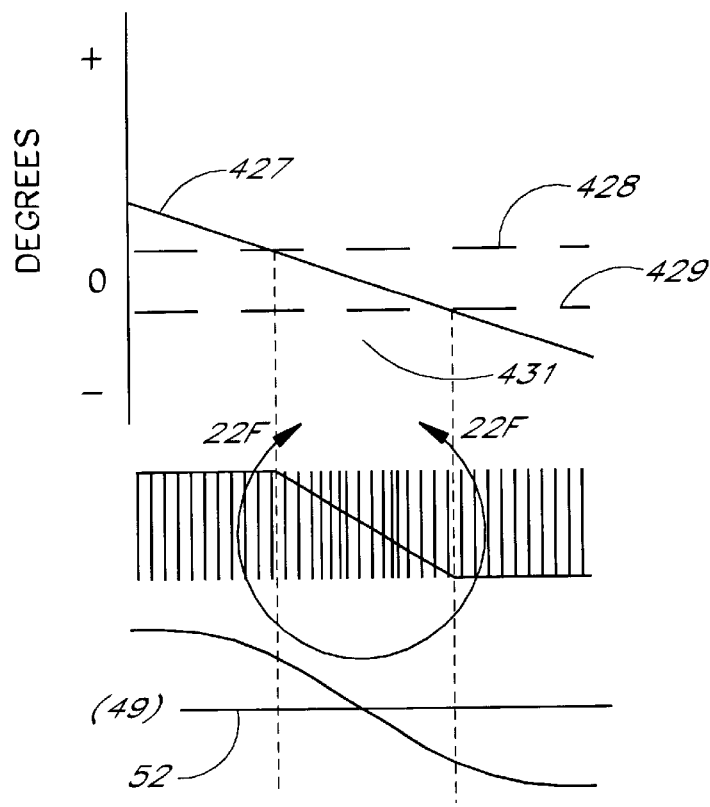
FIG. 22E illustrates a section of the waveforms in FIG. 22A and FIG. 22B in greater detail.
Figure 22F:
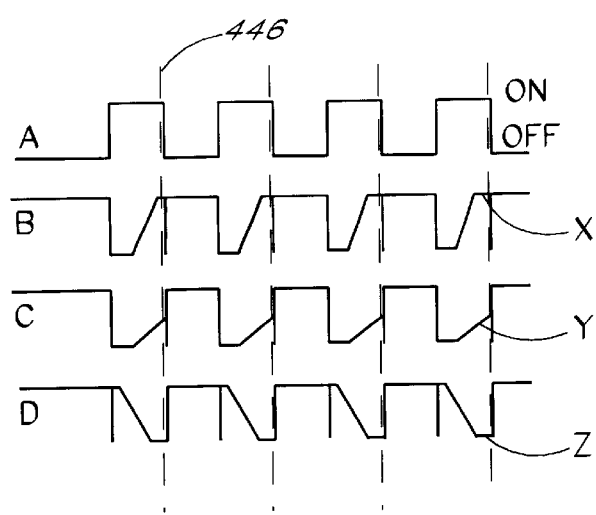
FIG. 22F illustrates waveforms of PWM commutation detection.

FIG. 22D illustrates the waveforms generated by an EMF commutation sensing circuit after the last open-loop stopping step is taken, and where the motor is not holding position. For the waveforms described in connection with FIG. 22D, no PWM chopping is used to hold after a stop. A horizontal line 413c indicates time with time increasing to the right.

A line 441 indicates a velocity of the rotor of the motor. The EMF signal 160a, 28a is shown as a waveform 419a immediately after a bad stop, i.e., when the rotor has traversed the desired detent position. As the motor's rotor traverses several detent positions, the EMF commutation signal 160a, 28a pulses one to three times upon a traversing of the detent position. As the motor 150 slows down as shown by the line 441, the EMF signal decreases in signal to noise ratio as shown by a noisy portion of a waveform 440.

FIG. 22E illustrates a section of the waveforms in FIG. 22A and FIG. 22B in greater detail. FIG. 22E is an enlarged view of the crossover as carried by the EMF commutation signal 28a, which is detected by the comparator 28 described in connection with FIG. 7 and with FIG. 9. A signal 427 represents the rotor displacement within a detent position. A first dashed line 428 and a second dashed line 429 represent the linear crossover range of the comparator 28 as described in connection with FIGS. 7, 9, and 10. The output 28a of the comparator is shown from saturation to saturation, and the signal is the PWM switching, the rotor displacement, the EMF signal, or combinations of the three.

FIG. 22F includes a first waveform A, a second waveform B, a third waveform C and a fourth waveform D, which correspond to PWM commutation detection. At normal speeds and as the EMF becomes smaller with decreased sequence rate, the output becomes proportional to the rotor offset from the zero detent position. This is defined as the PWM commutation signal used for low sequence rate commutation and power control. This signal is also used to detect a failure to hold a desired detent position, to hold the rotor in its zero offset position and to detect a stall condition during full-stepping, half-stepping or micro-stepping operations.

The first waveform A corresponds to the PWM signal. The second waveform B corresponds to the PWM commutation signal 28a with the rotor shifted in the plus direction from the zero detent position. The third waveform C corresponds to the PWM commutation signal 28a with the rotor at the zero detent position. The fourth waveform D corresponds to the PWM commutation signal 28a with the rotor shifted in the negative direction from the zero detent position.

The PWM signal corresponding to the first waveform A is provided as an input to the input port of the microprocessor 10 as described in connection with FIG. 7 and with FIG. 9. In one embodiment, the input port has a threshold level of around 2.5 volts. The microprocessor checks the signal level of the PWM commutation signal 28a just before the PWM signal corresponding to the first waveform A is turned off as shown by a vertical line 446. This is shown as the second waveform B at time X, the third waveform C at time Y and the fourth waveform D at time Z.

The microprocessor 10 determines corrective action based on the motor phase if the PWM commutation signal is above or below the threshold level. If the motor 150 is running, the microprocessor 10 determines corrective action based on the motor direction. This same signal is used for low sequence rates as the PWM commutation signal 235a, as described in connection with FIG. 8, to determine if the next sequence is ready. The generated signal, which is the EMF commutation signal 28a, can be filtered to a filtered signal 49 by the first resistor 47 and the capacitor 48 described in connection with FIG. 7 and with FIG. 9. The filtered signal 49 is illustrated by a waveform 420a and a waveform 420b, in FIG. 22A and FIG. 22B, respectively. The filtered signal 49 is proportional to displacement and not to rate, and the filtered signal 49 is centered around the bias provided by the reference voltage source 52 as described in connection with FIG. 7 and FIG. 9. A line 421a and a line 421b represent the safe limits of ringing, where the motor's rotor will not jump a detent position. The second resistor 50 and a third resistor 51 form a feedback network that stabilizes and broadens the linear region of the comparator 28. A portion of a waveform 411 and a portion of a waveform 419a correspond again to motor velocity.

Figure 23:
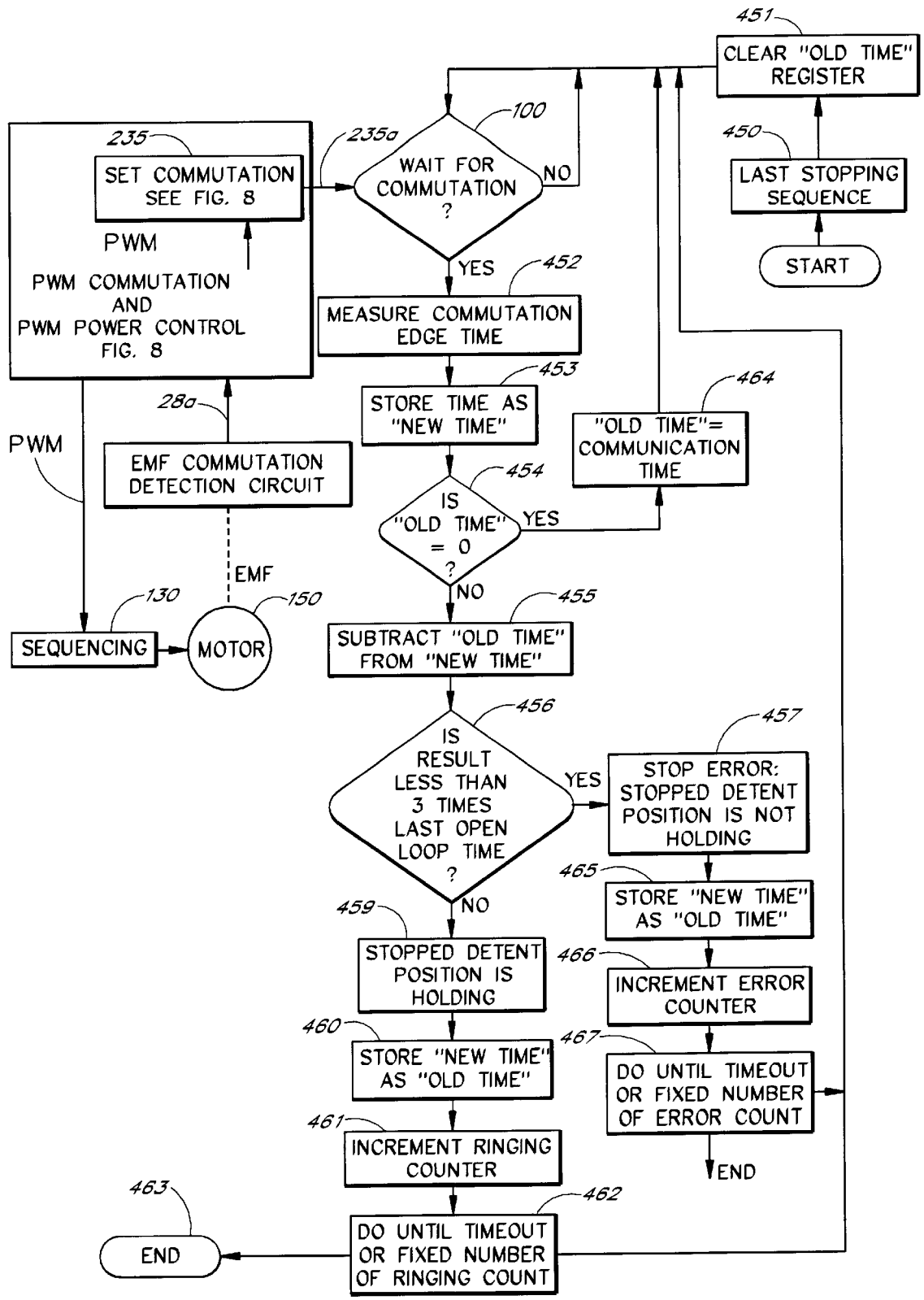
FIG. 23 illustrates a process of detecting a stopping error in real time.

FIG. 23 illustrates a process of detecting a stopping error in real time. After determining the deceleration slope, one embodiment according to the invention alters the last sequence time to obtain a relatively small number of commutation signal transitions. In one embodiment, the relatively small number of commutation signal transitions is the minimum number of commutation signal transitions. This represents a relatively small amount of ringing, as the motor 150 holds its detent position. After the best stopping sequence times are determined, real time corrections to the ringing, the displacement, or both the ringing and the displacement within the detent position can be made with the detected EMF signal now representing displacement.

One embodiment of the process to detect stopping errors will now be described with reference to FIG. 23, FIG. 22A, and FIG. 22B. The process starts by advancing to a step 450 that detects that the last stopping step has been taken. The process advances to a step 451, where the "old time" register is cleared and the logic flow stops until the PWM commutation signal 235a from the PWM commutation logic described in connection with FIG. 8 is detected by the decision block 100. The process proceeds from the decision block 100 to a step 452 in response to the detection of the PWM commutation signal 235a.

In the step 452, the process measures the commutation time. The process advances from the step 452 to a step 453. In the step 453, the process stores the commutation time in a "new time" register. The process advances from the step 453 to a decision block 454. If this is the first transition, the process has cleared the contents of the "old time" register in the step 451, and the process proceeds from the decision block 454 to a step 464, where the commutation time measured in the step 452 is stored in the "old time" register. The process returns from the step 464 to the decision block 100. The process proceeds from the decision block 454 to a step 455 for subsequent transitions.

In the step 455, the process calculates the time difference between the "old time" first commutation and "new time" second transition. In another embodiment, the PWM commutation transition times from the step 455 are stored and processed at a different time. The process advances from the step 455 to a decision block 456. In the decision block 456, the time difference is compared with three times the last open-loop stopping time. It will be understood by one of ordinary skill in the art that the time differences can be computed from any reference time. The process proceeds from the decision block 456 to a step 457 when the time difference is less than about three times the last open-loop stopping time. The process proceeds from the decision block 456 to a step 459 when the time difference is more than about three times the last open-loop stopping time.

In the step 457, the process generates an error to indicate that the detent position has been traversed. In one embodiment, the PWM commutation signal 235a is continuously monitored to obtain the number of detent positions traversed. The process advances to a step 465. In the step 465, the process stores the contents of the "new time" register in the "old time" register. The process advances from the step 465 to a step 466. In the step 466, the process increments an error counter to monitor the number of detent positions traversed. The process advances from the step 466 to a decision block 467. In the decision block 467, the process determines whether there is a time-out or whether the commutation signal is no longer usable. If either is true, the process terminates. Otherwise, the process returns from the decision block 467 to the decision block 100.

In the step 459, the process provides an indication that the motor 150 is holding the desired detent position. The process advances from the step 459 to a step 460. In the step 460, the process stores the contents of the "new time" register in the "old time" register to track the amount of ringing or count the number of oscillations. The process advances from the step 460 to a step 461. In the step 461, the process increments a ringing counter. The process advances from the step 461 to a decision block 462. In the decision block 462, the process determines whether there is a time-out or whether the commutation signal is no longer usable. If either is true, the process terminates by proceeding to an end state 463. Otherwise, the process returns from the decision block 462 to the decision block 100.

Figure 24:
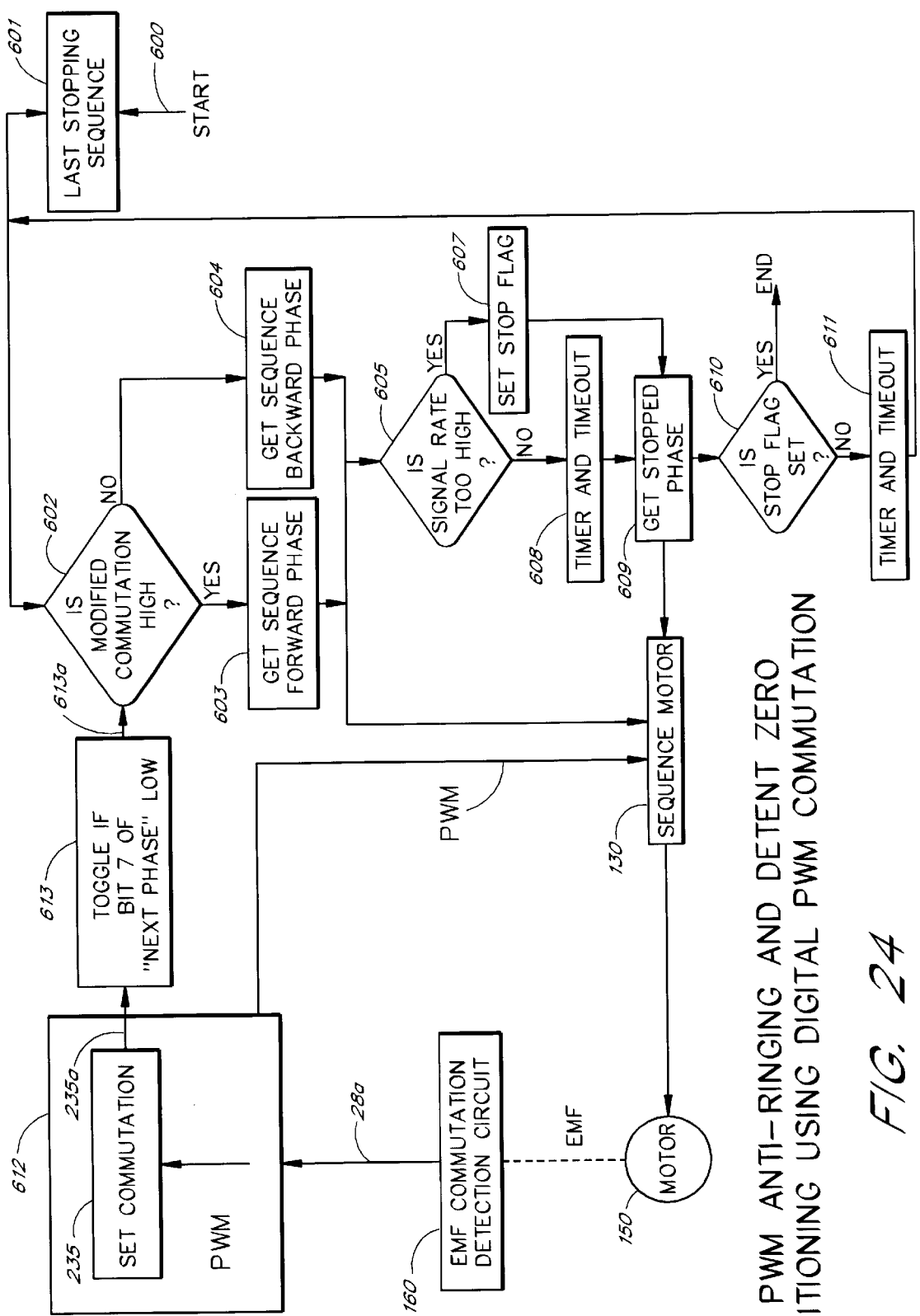
FIG. 24 illustrates a process of compensating for ringing and for positioning the motor around a detent-zero position.

FIG. 24 illustrates a process of compensating for ringing and for positioning the motor 150 around a detent-zero position. The commutation signal 28a now represents rotor displacement, and the commutation signal 28a is monitored immediately after the last open-loop sequence. Depending on the EMF level, the motor stopped phase, and the direction, the motor 150 is either forward or back sequenced, full-stepped or micro-stepped, for a relatively short time. The stop sequence phase is then restored, and the commutation signal 28a level checked. The control now depends on the commutation signal 28a, which represents the displacement within the detent position. Depending on the EMF comparator's gain, the EMF commutation signal 28a is either high or low while the motor 150 is ringing. Then, as the motor 150 settles in its zero detent position, the signal 28a becomes increasingly noisy. This noise can be filtered to detect a true zero and a rate of change. The noise can also be monitored by the microprocessor, with the high frequency representing a near zero detent position.

The process starts at a start state 600. In the start state, the motor 150 is holding its detent position. The process advances to a step 601 on the generation of the last stopping step. The process advances from the step 601 to a decision block 602. In the decision block 602, the process checks a signal 613a from a step 613a. In the step 613a, the process inverts the PWM commutation signal 235a from the circuit described in connection with FIG. 8 depending on the phase of bit 7 of the "next phase" as described later in connection with step 730 of FIG. 26.

Where the signal is high, the process proceeds from the decision block 602 to a step 603. Otherwise, the process proceeds to a step 604. In the step 603, the process obtains the next sequence phase to apply a forward rotation to the motor. The process advances from the step 603 to the motor sequencing step 130 and to a decision block 605. In the motor sequencing step 130, the motor 150 is sequenced. In the step 604, the process obtains the next sequence phase to apply a reverse rotation to the motor. The process advances from the step 604 to the motor sequencing step 130 to sequence the motor 150 and to the decision block 605.

In the decision block 605, the process determines whether the signal rate is too high, which indicates noise. If the signal rate is too high, the process proceeds from the decision block 605 to a step 607. Otherwise, the process proceeds from the decision block 605 to a step 608. In the step 607, the process sets a stop flag to indicate noise. The process advances from the step 607 to a step 609. In the step 608, the process starts a timer and upon the timer's time-out, the process advances from the step 608 to the step 609. In the step 609, the process obtains the stopped phase. The process advances from the step 609 to the motor sequencing step 130 to sequence the motor 150 to the stopped phase, and advances to a decision block 610.

In the decision block 610, the process checks the stop flag to see if it had been set by the step 607. If the stop flag has been set, the process ends 614. Otherwise, the process advances to a step 611, where another timer is initiated and upon its time-out, the process returns to the decision block 602.

The current to the motor 150 is continuously chopped by the PWM 612. Further details of PWM were described earlier in connection with FIG. 8. The PWM commutation signal 28a can be filtered to obtain a DC signal representing the displacement of the rotor from the detent-zero position. Further details of the filtered signal 49 were described earlier in connection with FIG. 7, FIG. 9, FIG. 10 and FIG. 22.

Similar logic to FIG. 23 and FIG. 24 is used to analyze the stopping condition when the holding current is not chopped PWM. One difference is that the process measures the EMF commutation signal 160a from the commutation detection circuit 160. The timing of the EMF signal waveform is dependent on motor rate and flux changes as the motor 150 traverses a detent position.

Figure 25:
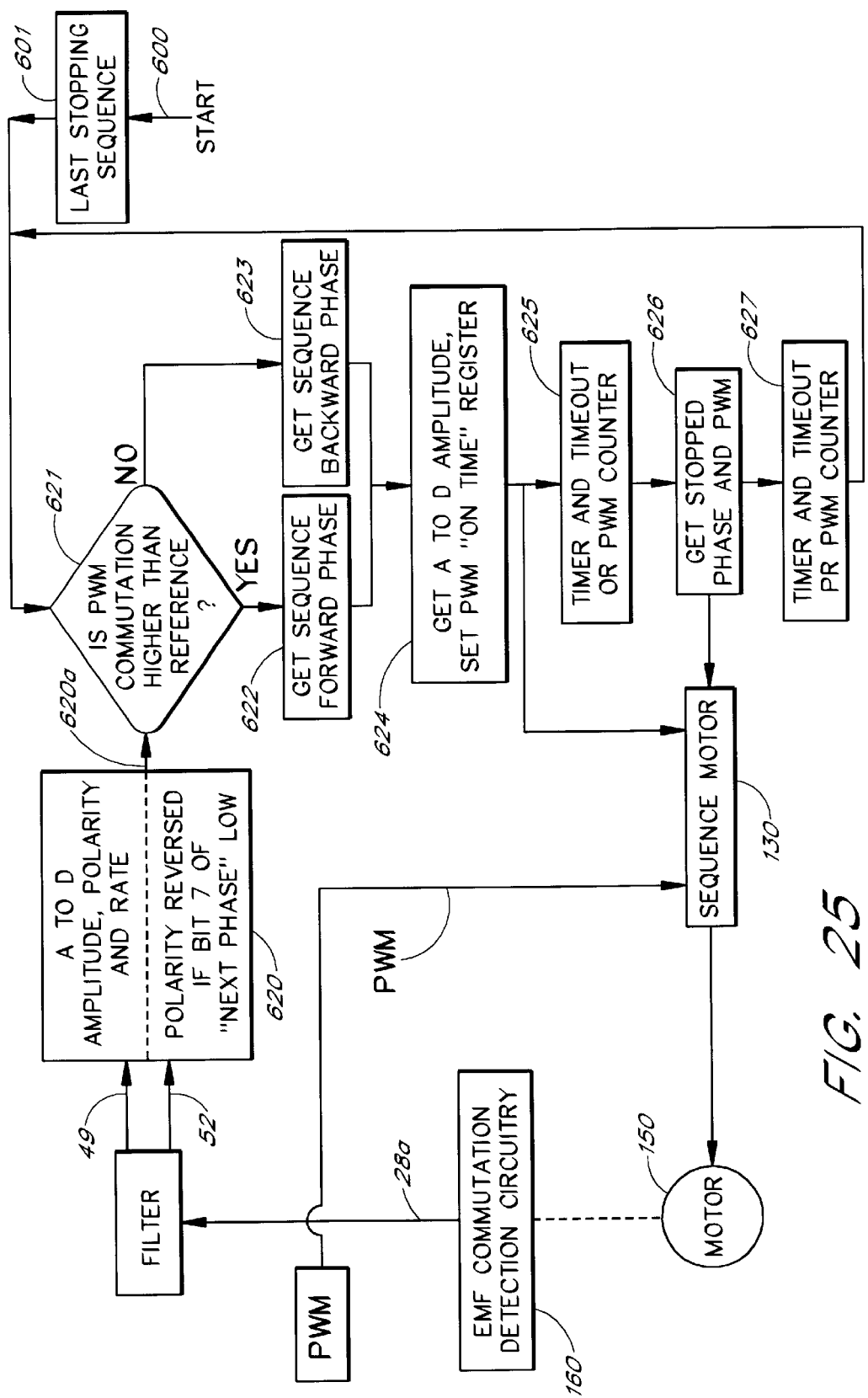
FIG. 25 illustrates a process of using a filtered PWM commutation signal to provide anti-ringing and detent-zero positioning.

FIG. 25 illustrates a process of using a filtered PWM commutation signal to provide anti-ringing and detent-zero positioning. In one embodiment, the filtered PWM commutation signal is the filtered signal 49 described in connection with FIG. 7, FIG. 9, FIG. 10 and FIG. 22.

The filtered signal 49, which represents displacement from the zero detent position, is provided as an input to an analog-to-digital converter 620. The reference voltage source 52 also provides a bias as an input to the analog-to-digital converter 620. The analog-to-digital converter 620 compares the filtered signal 49 to the bias from the reference voltage source 52 as described in connection with FIG. 7, with FIG. 9 and with FIG. 10. The polarity, amplitude, rate of change and bit 7 of a phase table, as described in connection with FIG. 26, are combined to develop a digital control signal 620a.

The digital control signal 620a is provided as an input to a decision block 621. In the decision block 621, the process compares the digital control signal 620a to a reference level. The process proceeds from the decision block 621 to a step 622 when the digital control signal 620a is higher than the reference level. Otherwise, the process proceeds from the decision block 621 to a step 623. In the step 622, the process obtains the next sequence phase to apply a forward phase correction to the motor 150. The process advances from the from the step 622 to a step 624. In the step 623, the process obtains the next sequence phase to apply a reverse phase correction to the motor 150. The process advances from the step 623 to the step 624.

In the step 624, the process reads the amplitude and the rate of change of the filtered signal 49. The process determines the amplitude of the corrective action taken by setting the "on time" register 628 in the PWM logic described in connection with FIG. 8. The process advances from the step 624 to the motor sequencing step 130 to sequence the motor 150 and to a step 625. In the step 625, the process sets the time of the correction in a timer or PWM counter. The process advances from the step 625 to a step 626. In the step 626, the process sets the stop phase and the PWM duty cycle. The process advances from the step 626 to a step 627.

The process remains at the step 627 for a predetermined interval by starting a timer for a time-out period or by counting clock cycles of the PWM frequency. During the interval, the process monitors the filtered signal 49 through the analog-to-digital converter 620. The process alternates from sampling the filtered signal 49 for errors and taking corrective action in the step 622, the step 623, and the step 624. The process can run continuously or can be stopped when the zero detent position is reached. In this process, the amplitude of the filtered signal 49 can be used to determine if the ringing causes jumping of detent positions, and also to determine from the ringing whether the rotor is close to jumping detent positions.

Determination of power levels necessary to run a motor in the pulse following mode can be made by setting the motor input pulse rate to a rate anticipated by the user. The power level is increased until the motor 150 rotates. Similarly, the voltage or current is held constant and the pulse rate is decreased until the motor rotates. Motor rotation is determined by monitoring the output of the synchronization error signal generated in the block 194 in FIG. 17.

FIG. 26 illustrates a process of housekeeping to retrieve a next sequence. The housekeeping process can be used for the housekeeping step 140 described earlier. This process obtains the next sequence phase from memory based on 1) full-step or half step-mode, and 2) direction. The process determines which edge, positive or negative, the commutation detection circuit will look for when using EMF commutation.

As shown in FIG. 26, the motor 150 is sequenced and the process starts in a first decision block 701. In the first decision block 701, the process determines whether the motor 150 is operating in a half-step mode or is operating in a fall-step mode. The process proceeds from the first decision block 701 to a step 702 when the motor 150 is in the half-step mode. The process proceeds from the first decision block 701 to a step 703 when the motor 150 is in the full-step mode.

In the step 702, the process sets a content of a delta register to one. The process advances from the step 702 to a decision block 704. In the step 703, the process sets the content of the delta register to two. The process advances from the step 703 to the decision block 704.

In the decision block 704, the process determines the direction of the motor 150, and proceeds to a step 705 for a positive direction and to a step 706 for a negative direction. In the step 705, the process adds the contents of the delta register to a phase pointer register. The process advances from the step 705 to a step 707. In the step 706, the process subtracts the contents of the delta register from the phase pointer register. The process advances from the from step 706 to the step 707.

In the step 707, the process performs a logical AND of the contents of the phase pointer register with 7, i.e., with 0111 in binary. This limits the value of the contents of the phase pointer register to numbers between 0 and 7. The process proceeds from the step 707 to a step 708. In the step 708, the process adds the contents of the phase pointer register to an address of the phase table. In one embodiment, the phase table is stored in a memory device. The process advances from the step 708 to a step 709.

In the step 709, retrieves data from the phase table. The data retrieved is at the memory address of the phase table plus the offset from the phase pointer register. The data retrieved corresponds to the "next phase" sequence, and the process proceeds to provide the retrieved data as an input to the next phase 710. In one embodiment, the process provides the data by applying the data to an I/O port that controls the motor. In this example, only the low nibble (i.e., the least significant 4 bits) is provided as an input to the motor control port. The process also advances to a decision block 711.

In the decision block 711, the process examines bit 7 of the contents of the "next phase" register used with EMF commutation sensing to determine the polarity of the edge of the commutation signal to be detected. This edge polarity will be reversed with direction. The process proceeds to a step 712 if the direction is negative. Otherwise, the process proceeds to a decision block 713. In the step 712, the process toggles bit 7 of the "next phase" register. The process proceeds to the decision block 713.

In the decision block 713, the process determines whether bit 7 of the "next phase" register is set or reset. The process proceeds from the decision block 713 to a step 714 when the bit is reset. The process proceeds from the decision block 713 to a step 715 when the bit is set. In the step 714, the process prepares to respond to a positive edge of the commutation signal as the 135-degree EMF angle and to a negative edge of the commutation signal as the 315-degree EMF angle. In the step 715, the process prepares to respond to a negative edge of the commutation signal as the 135-degree EMF angle and to a positive edge of the commutation signal as the 315-degree EMF angle.

The illustrated process is able to acquire the next motor phase such that in the next motor sequence operation, the motor 150 can maintain direction and torque. The process can be used in the half-stepped mode and in the fall-stepped mode. The process jumps through the phase table in counts of two when the motor 150 is operated in a full-stepped mode. When the motor 150 is operated in a half-step mode, the process steps through each phase table entry. In this example, the lower nibble of the output port 39 controls the motor 150 as described in connection with FIG. 7 and with FIG. 9.

FIG. 27 is a timing diagram that illustrates a relationship between a Phase Pointer and data in a Phase Table. An upper portion 726 of the timing diagram illustrates the contents of the table for half-step operation. A lower portion 727 of the timing diagram illustrates the contents of the table for full-step operation. A "high" level in the timing diagram indicates an "on" state. A first row 716 corresponds to values of the "phase pointer" register. A second row 717 corresponds to a value stored in the phase table.

The upper portion 726 includes a first waveform 718, a second waveform 719, a third waveform 720, and a fourth waveform 721. The first waveform 718, the second waveform 719, the third waveform 720, and the fourth waveform 721 correspond to an input drive signal phase A, an input drive signal phase B, an input drive signal phase C, and an input drive signal phase D, respectively. For example, the input drive signal phase A, the input drive signal phase B, the input drive signal phase C, and the input drive signal phase D can correspond to outputs of a driver such as an IR2101 from International Rectifier, Inc. In one embodiment, four such drivers are used to drive the inputs of eight transistors as illustrated by the first transistor 93, the second transistor 96, the third transistor 92, the fourth transistor 97, the fifth transistor 91, the sixth transistor 94, the seventh transistor 90, and the eighth transistor 95 described in connection with FIG. 10.

Similarly, a fifth waveform 722, a sixth waveform 723, a seventh waveform 724, and an eighth waveform 725 also correspond to the input drive signal phase A, the input drive signal phase B, the input drive signal phase C, and the input drive signal phase D, respectively, when the motor 150 is operated in a full-step mode.

Table I illustrates the relationship between the "phase pointer" value [0–7] and the phase table data. Table I illustrates one example of the activation of the motor windings when the low nibble is provided as an input to the motor control port.

TABLE I

| Phase Pointer | | Phase Pointer | All unspecified motor |
|---|---|---|---|
| Pointer | Hex | Binary ("1" is "on") | windings are off |
| 0 | 8A | 1000 1010 | Motor windings D and C on |
| 1 | 2 | 0000 0010 | Motor winding C on |
| 2 | 6 | 0000 0110 | Motor windings C and B on |
| 3 | 4 | 0000 0100 | Motor winding B on |
| 4 | 85 | 1000 0101 | Motor windings B and A on |
| 5 | 1 | 0000 0001 | Motor winding A on |
| 6 | 9 | 0000 1001 | Motor windings A and D on |
| 7 | 8 | 0000 1000 | Motor winding D on |
| Bit | | 7654 3210 | |
| Motor winding | | DBCA | |

Bit 7 of the phase table data is used by the EMF commutation sensing routine to determine whether to detect a rising or a falling edge of the commutation signal. The sensed edge is toggled with direction.

Figure 28:
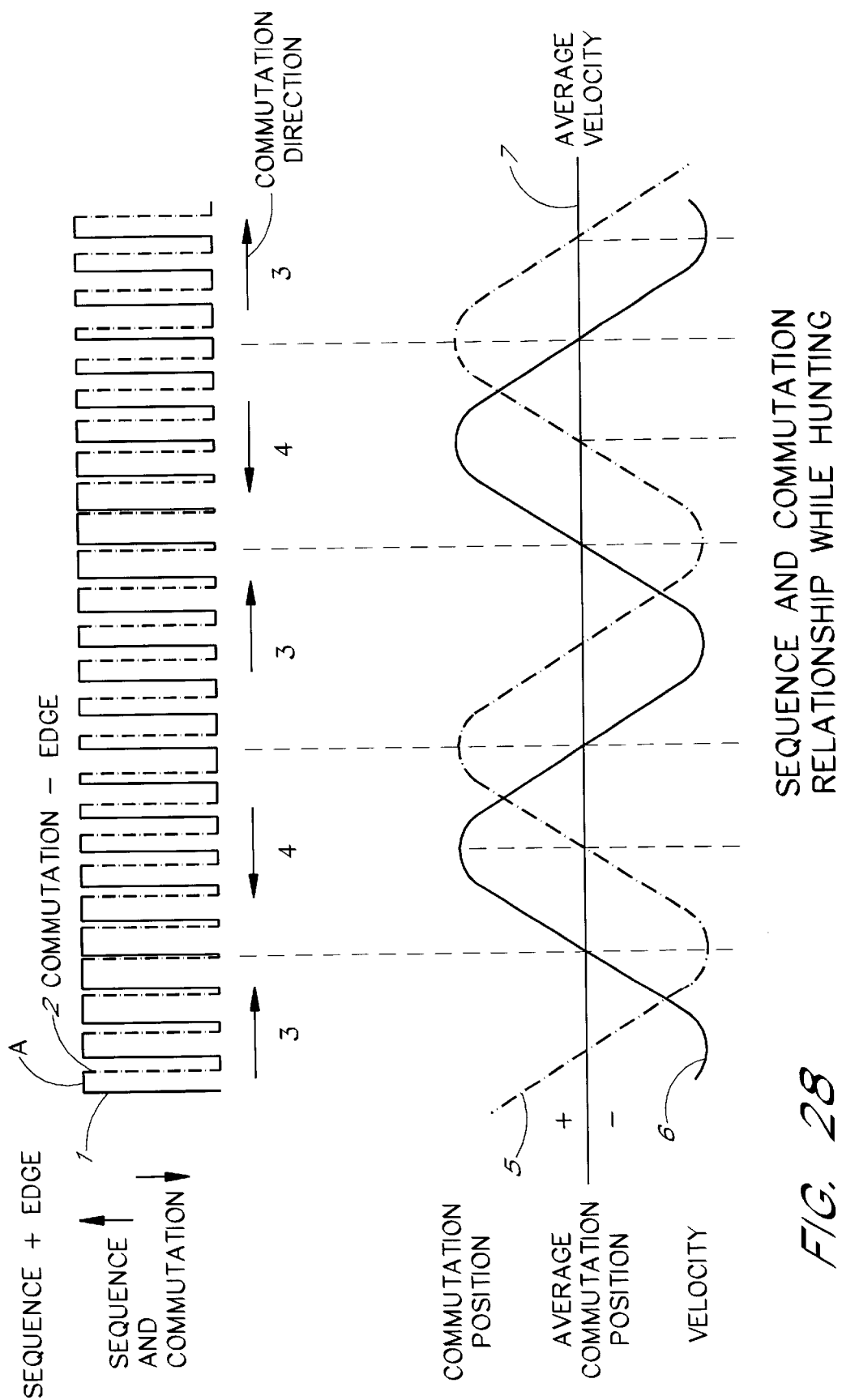
FIG. 28 includes waveforms that illustrate a relationship between sequencing and commutation while a motor is hunting.
Figure 29:
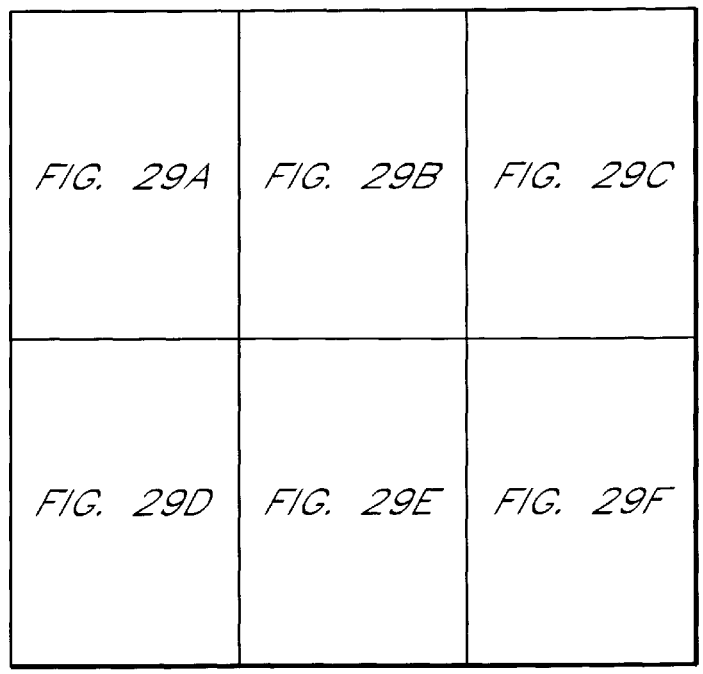
FIG. 29 consists of FIGS. 29A, 29B, 29C, 29D, 29E, and 29F and is a schematic of a motor controller.
Figure 29A:
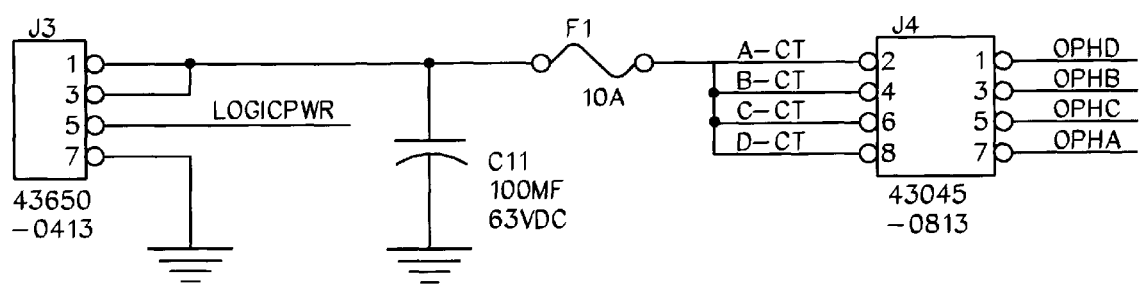
Figure 29B:
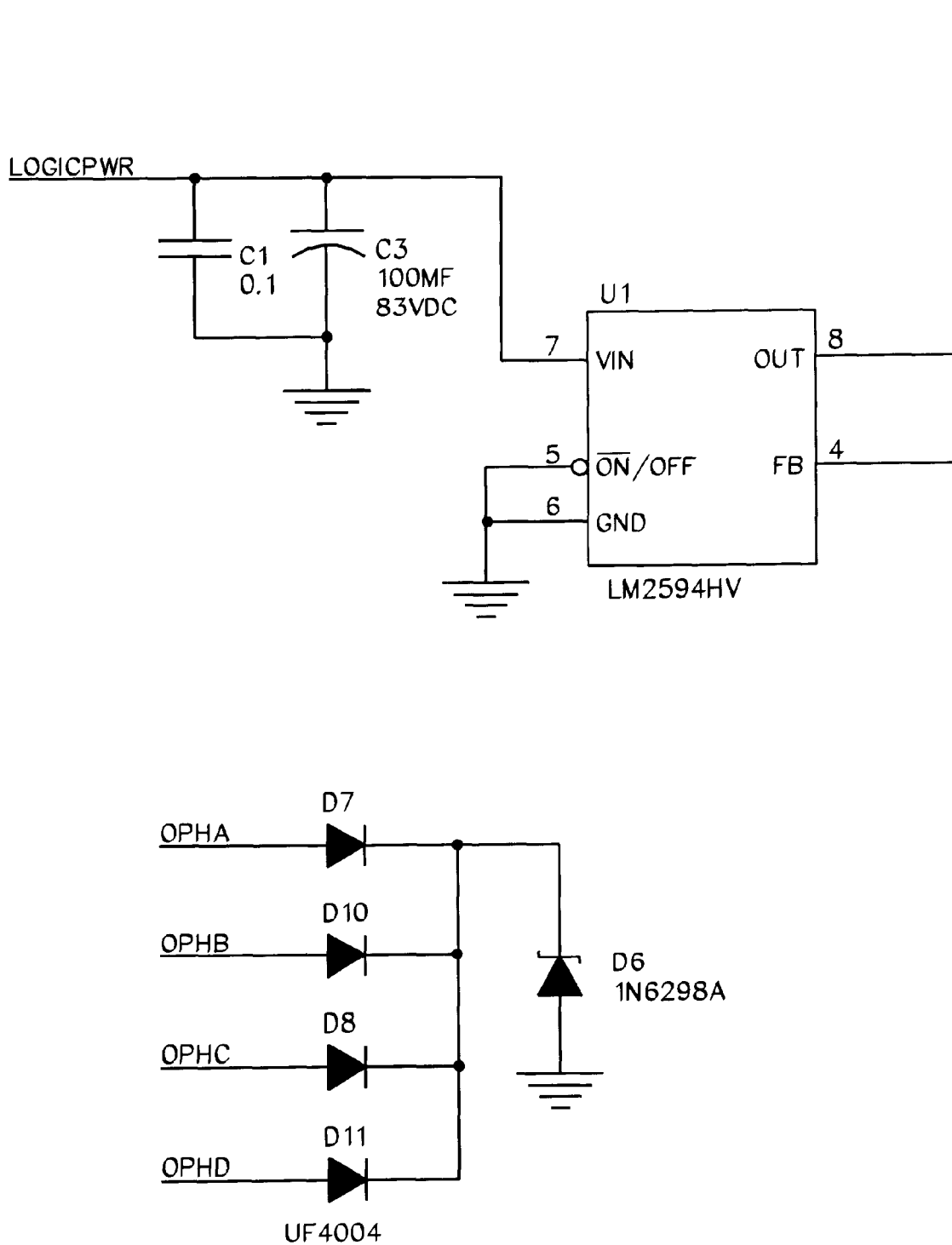
Figure 29C:
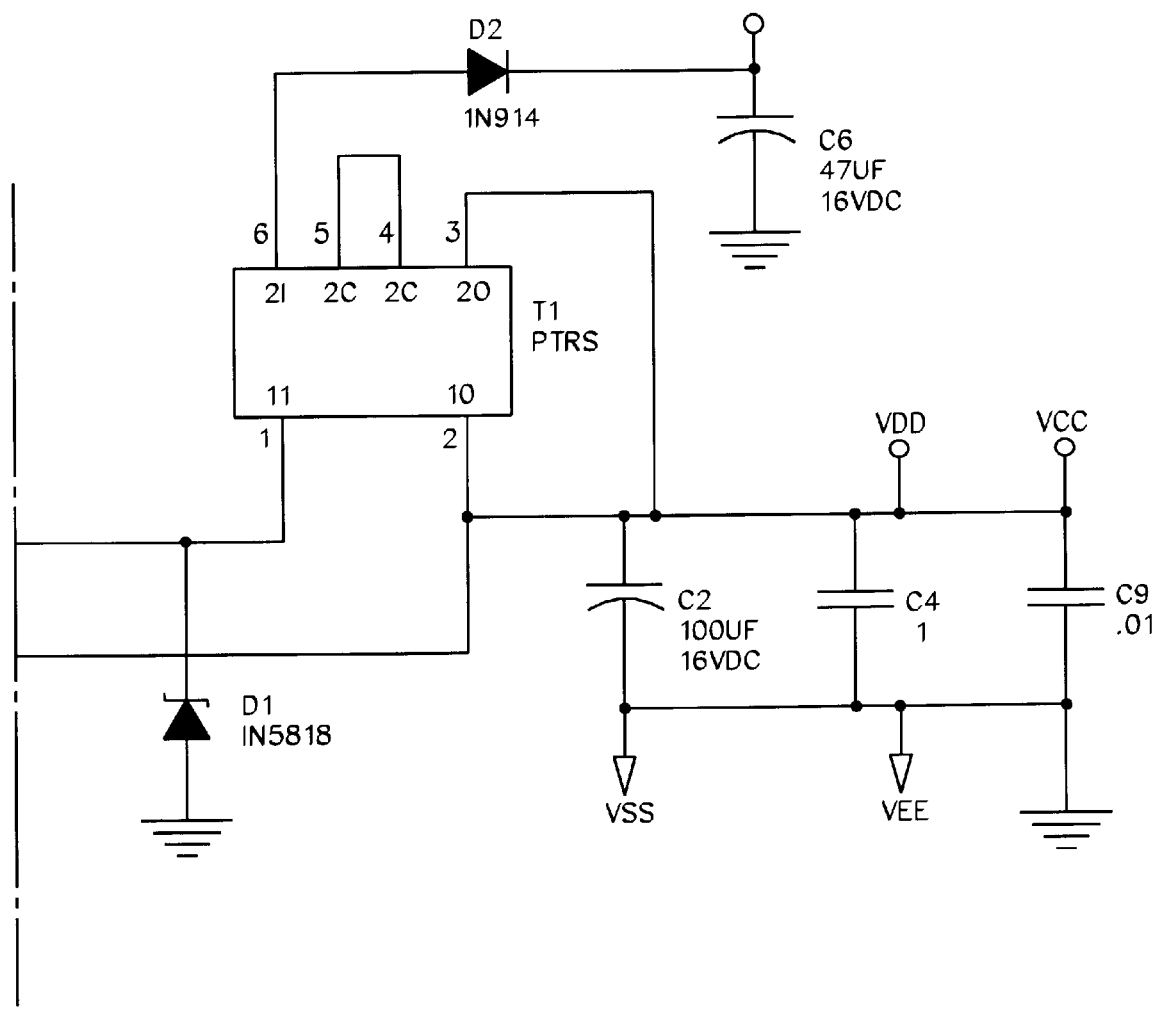
Figure 29D:
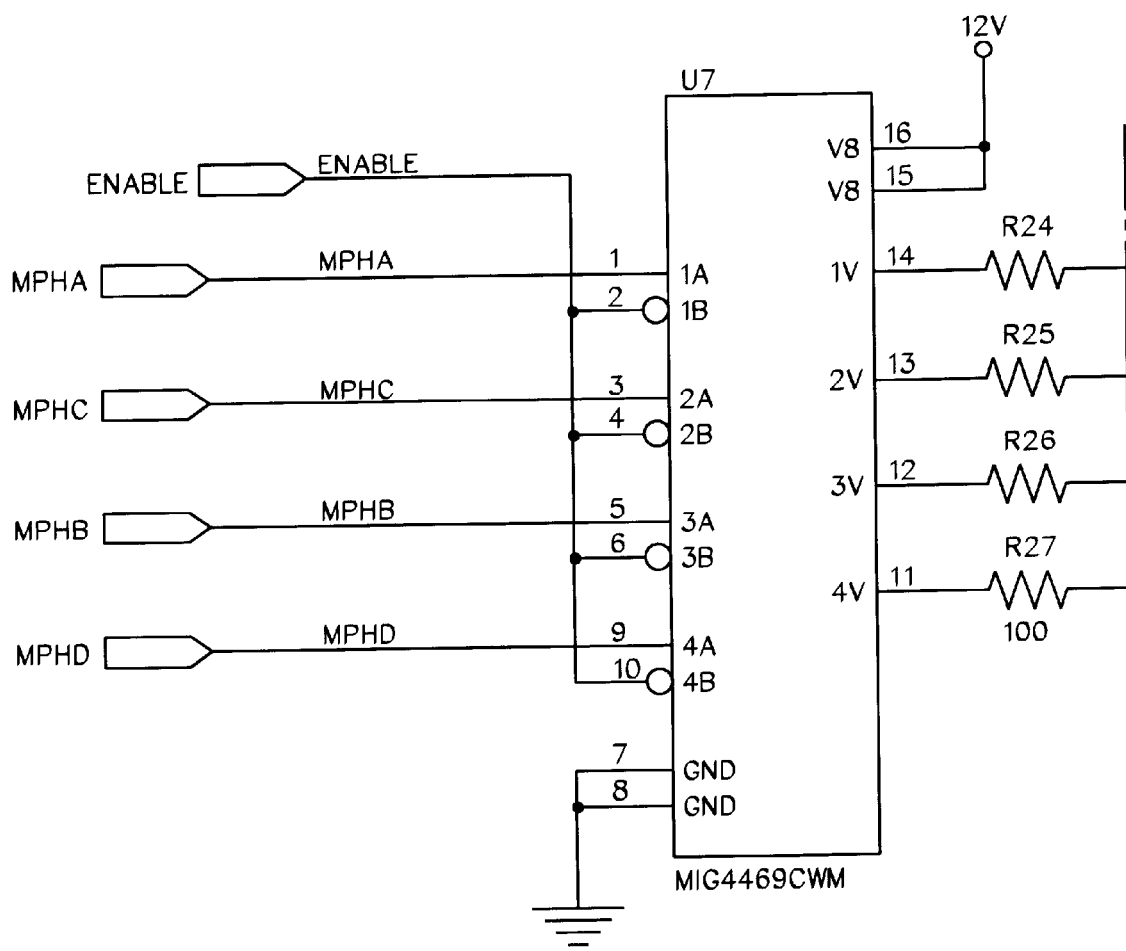
Figure 29E:
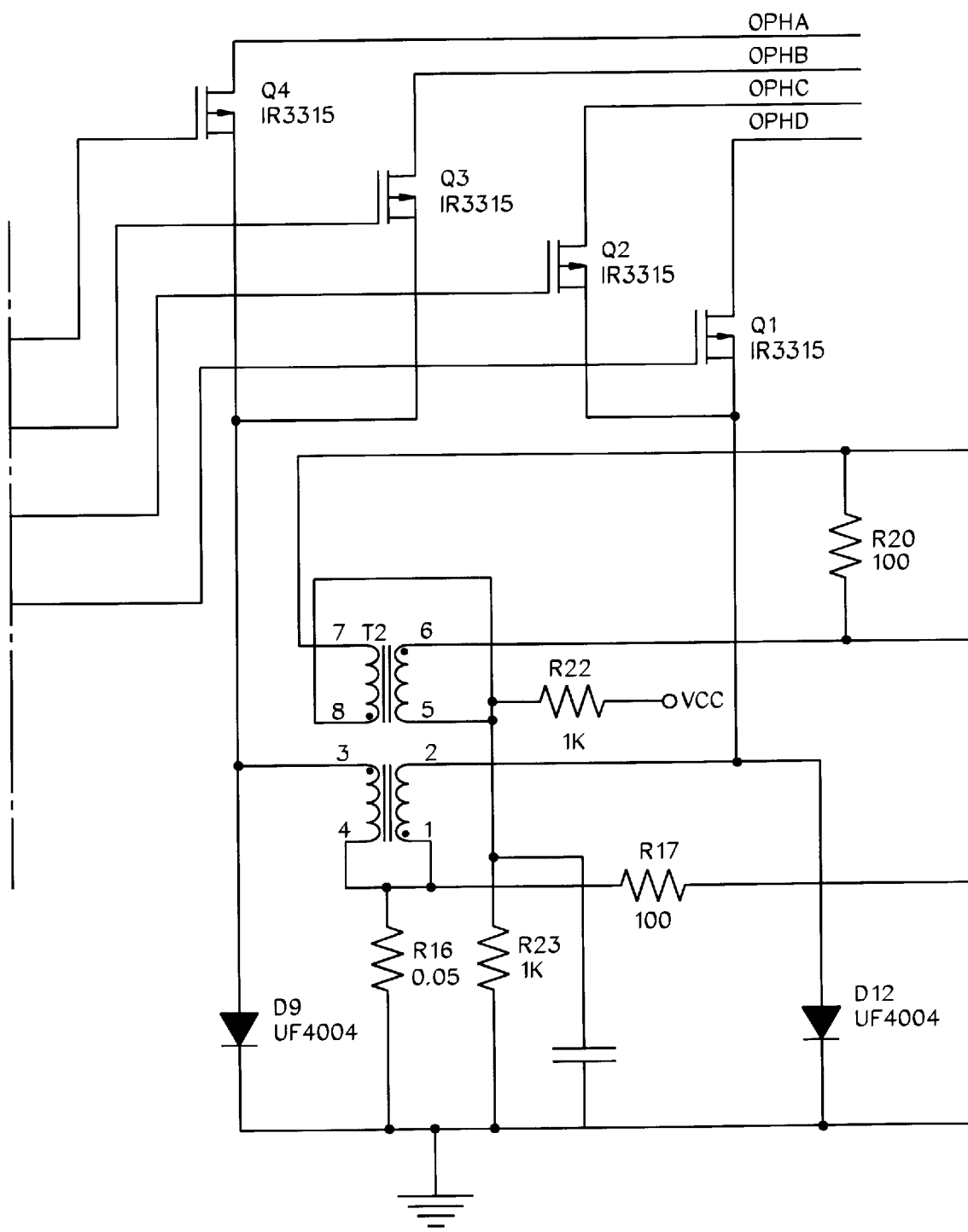
Figure 29F:
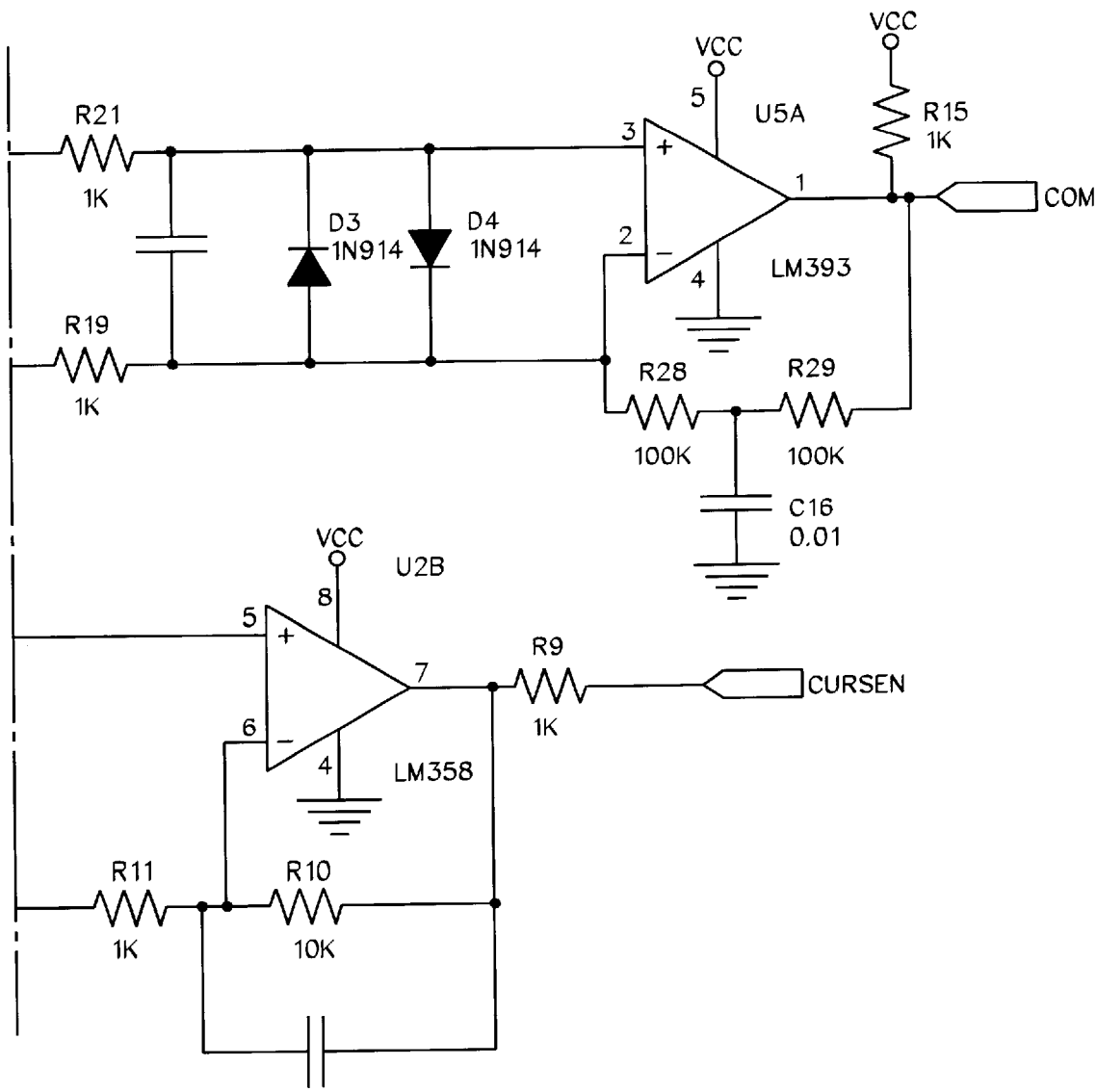
Figure 30:
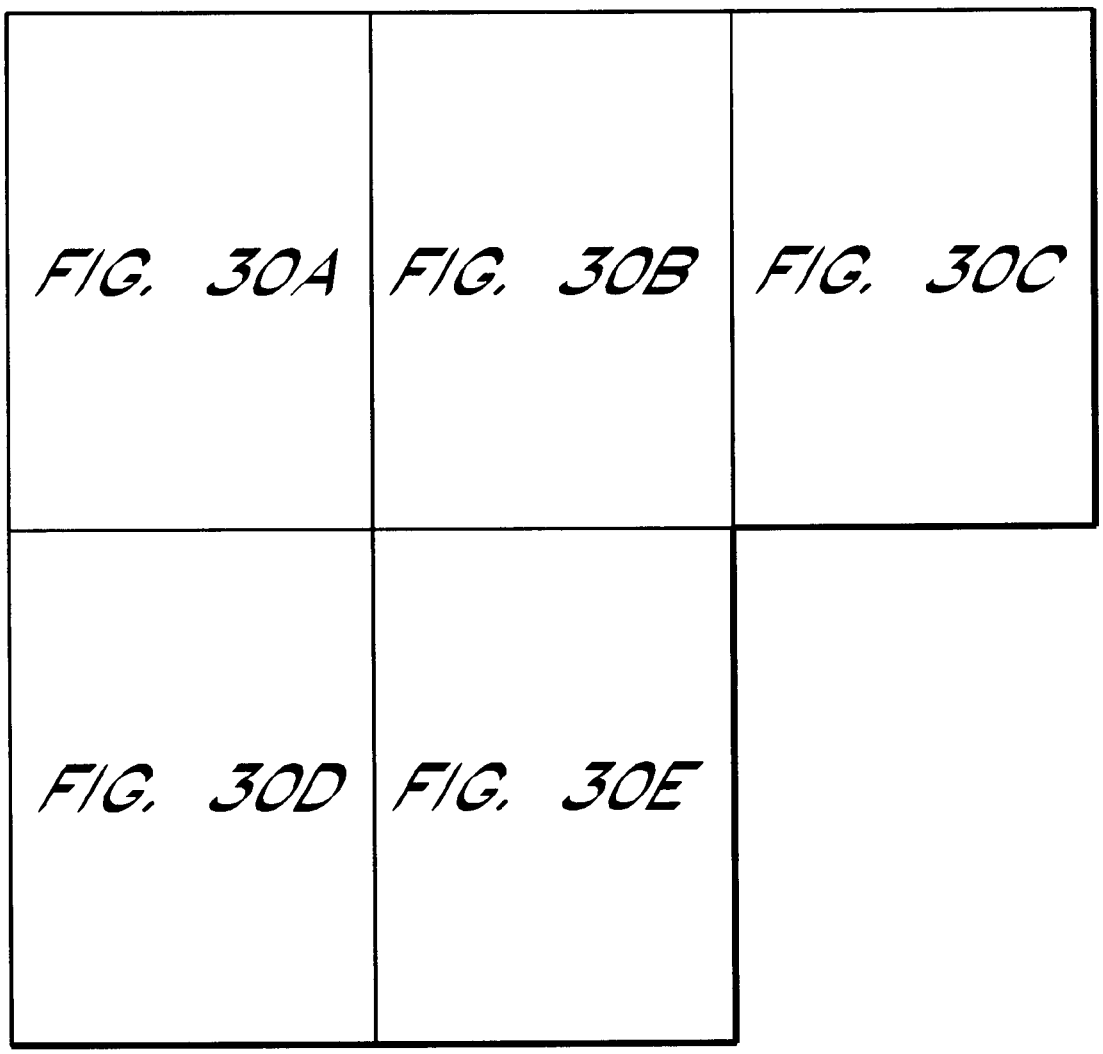
FIG. 30 consists of FIGS. 30A, 30B, 30C, 30D, and 30E and is a schematic of a motor controller logic.
Figure 30A:
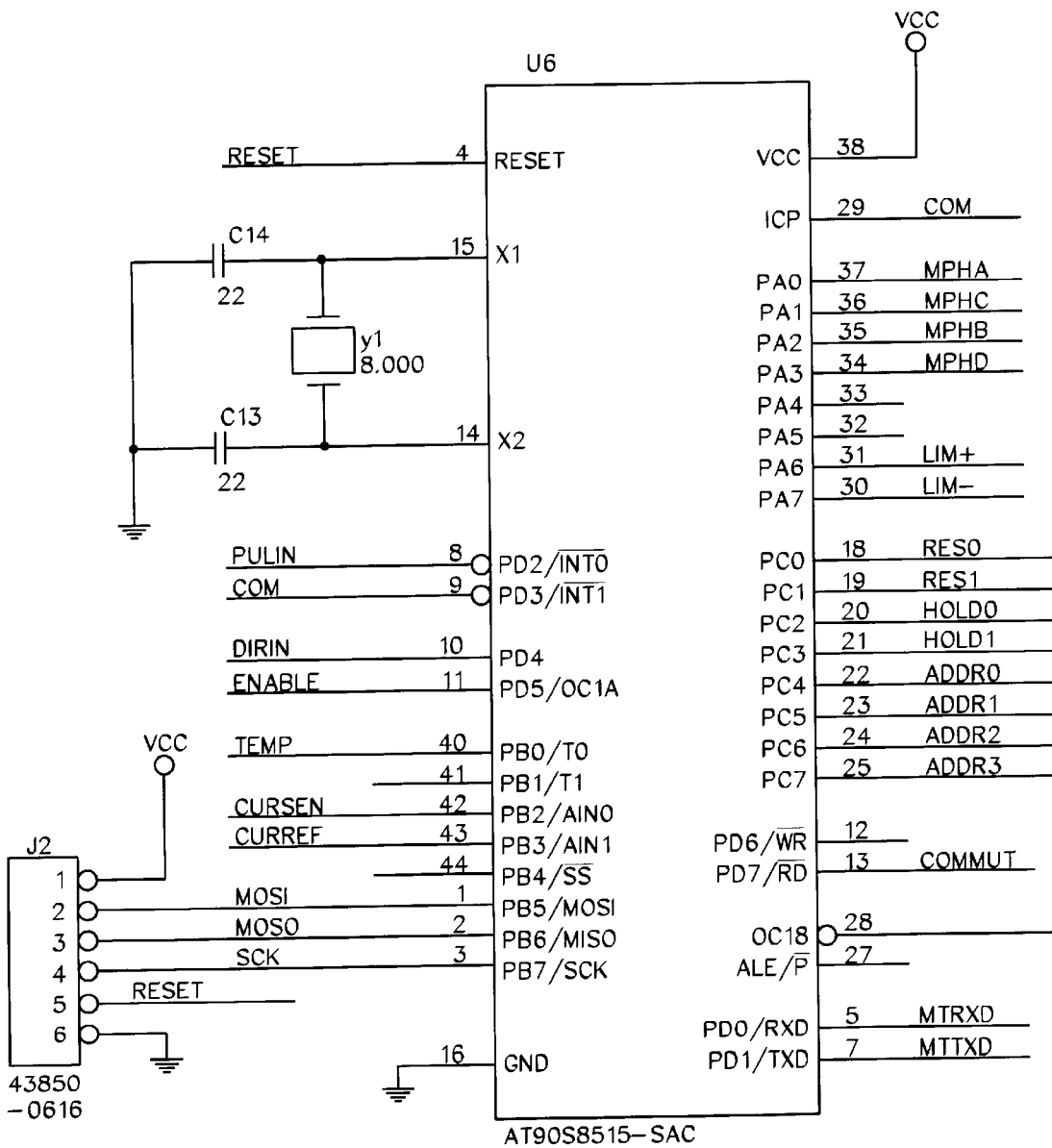
Figure 30B:
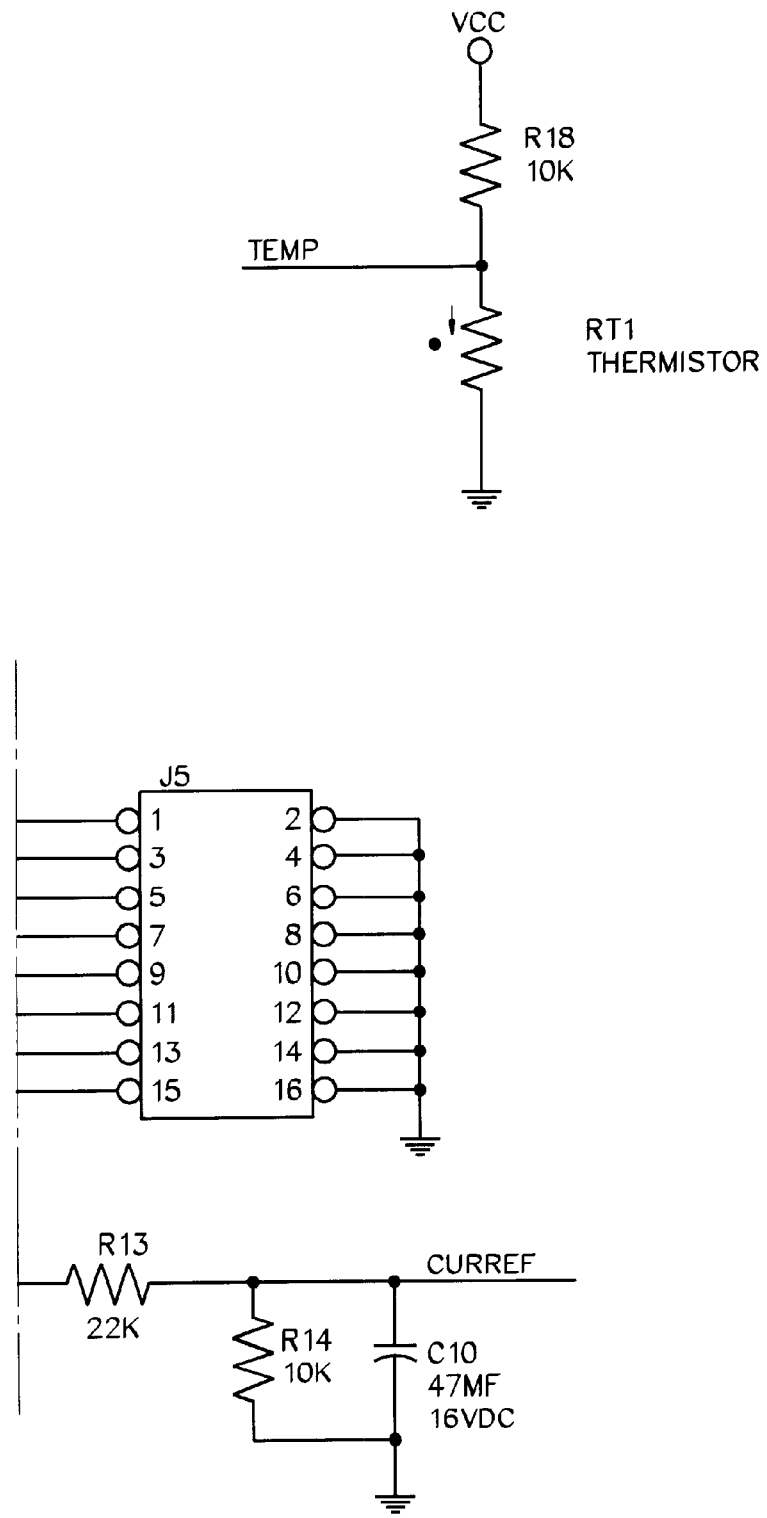
Figure 30C:
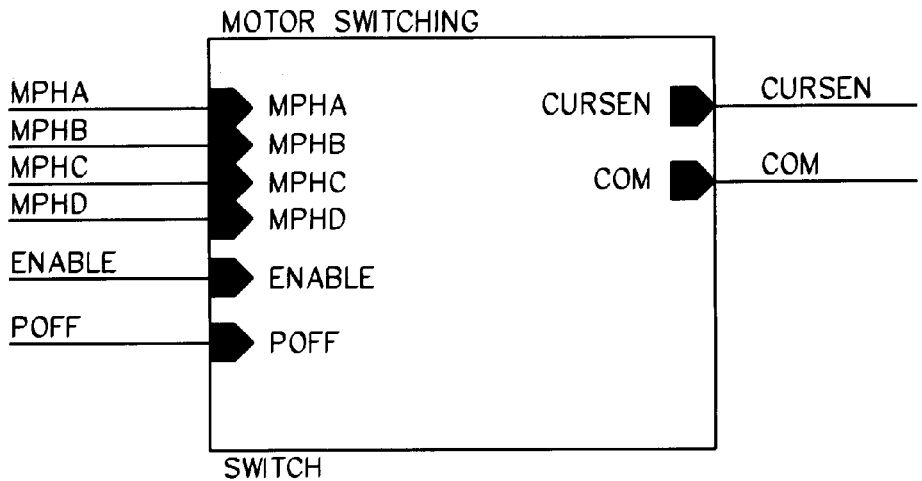
Figure 30C:
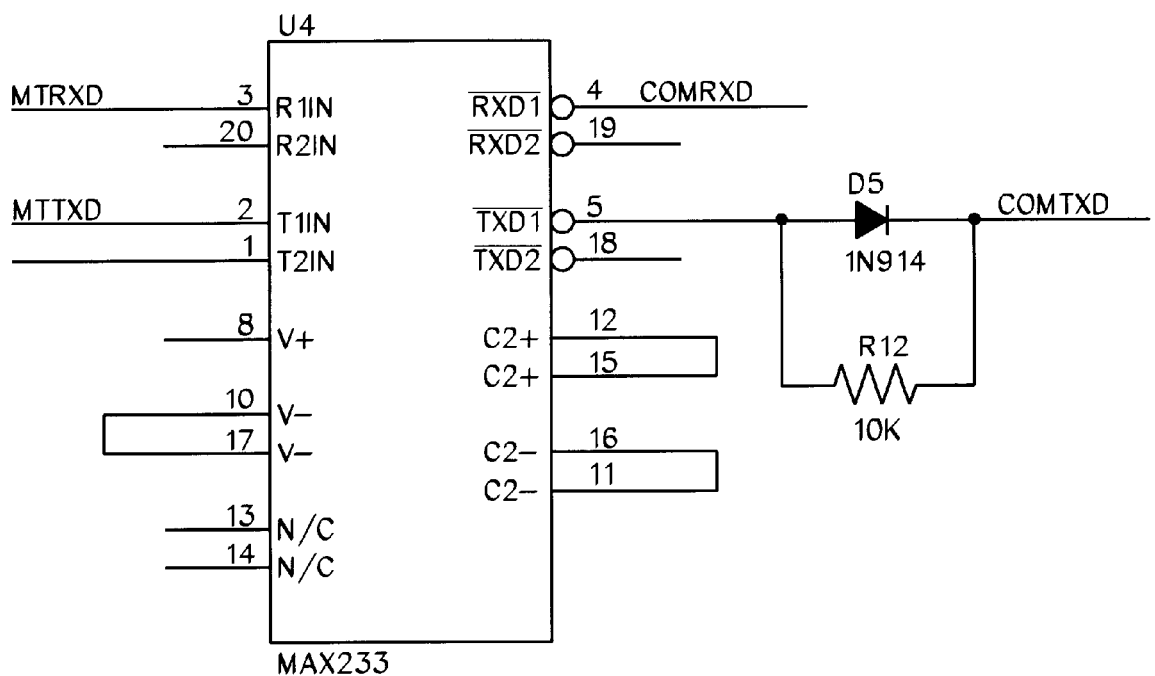
Figure 30D:
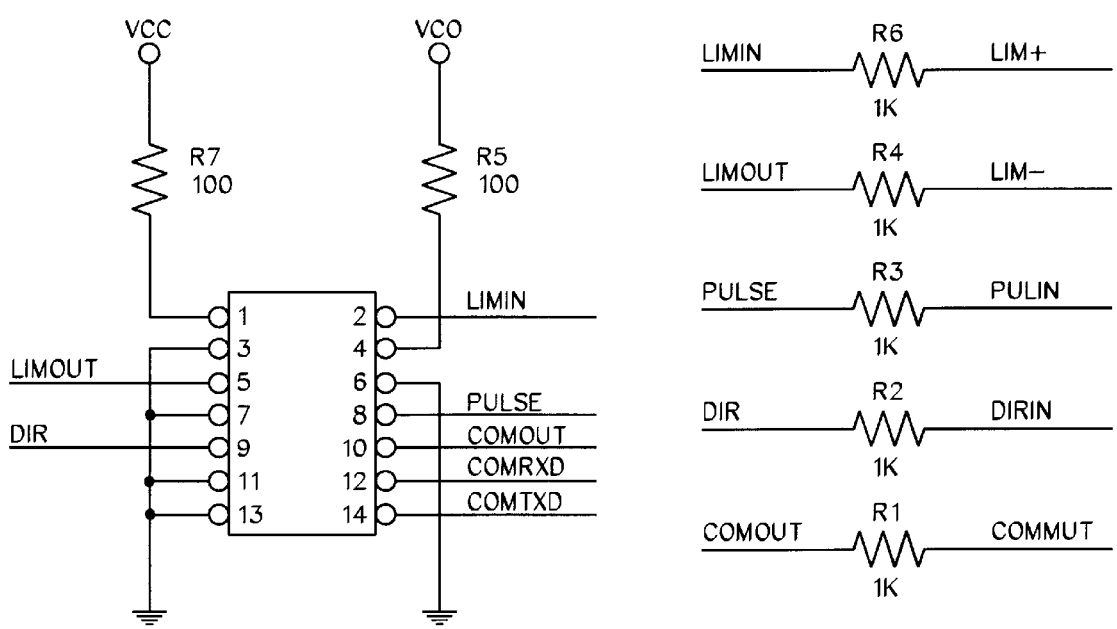
Figure 30E:
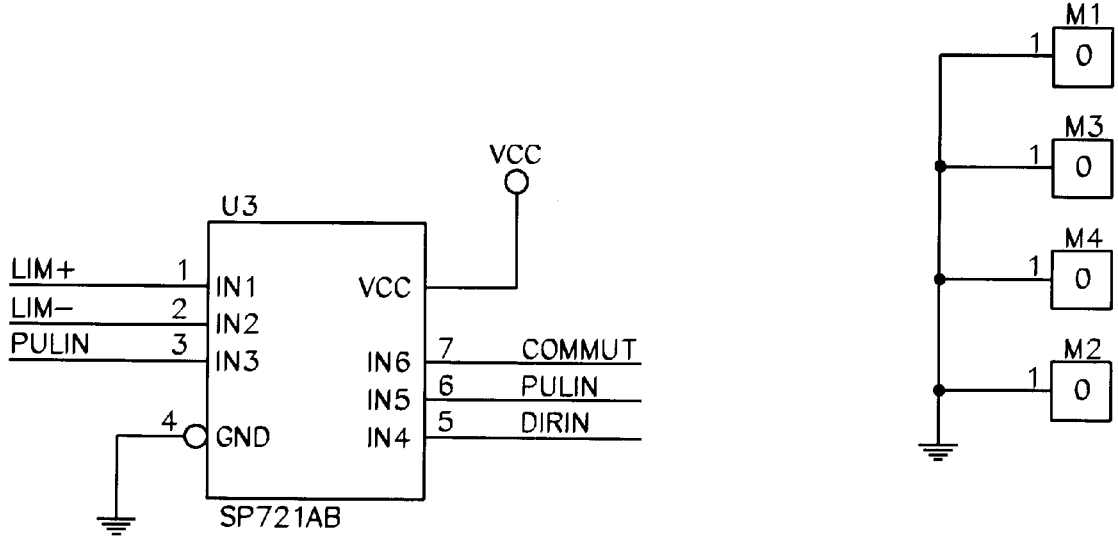
Figure 31:
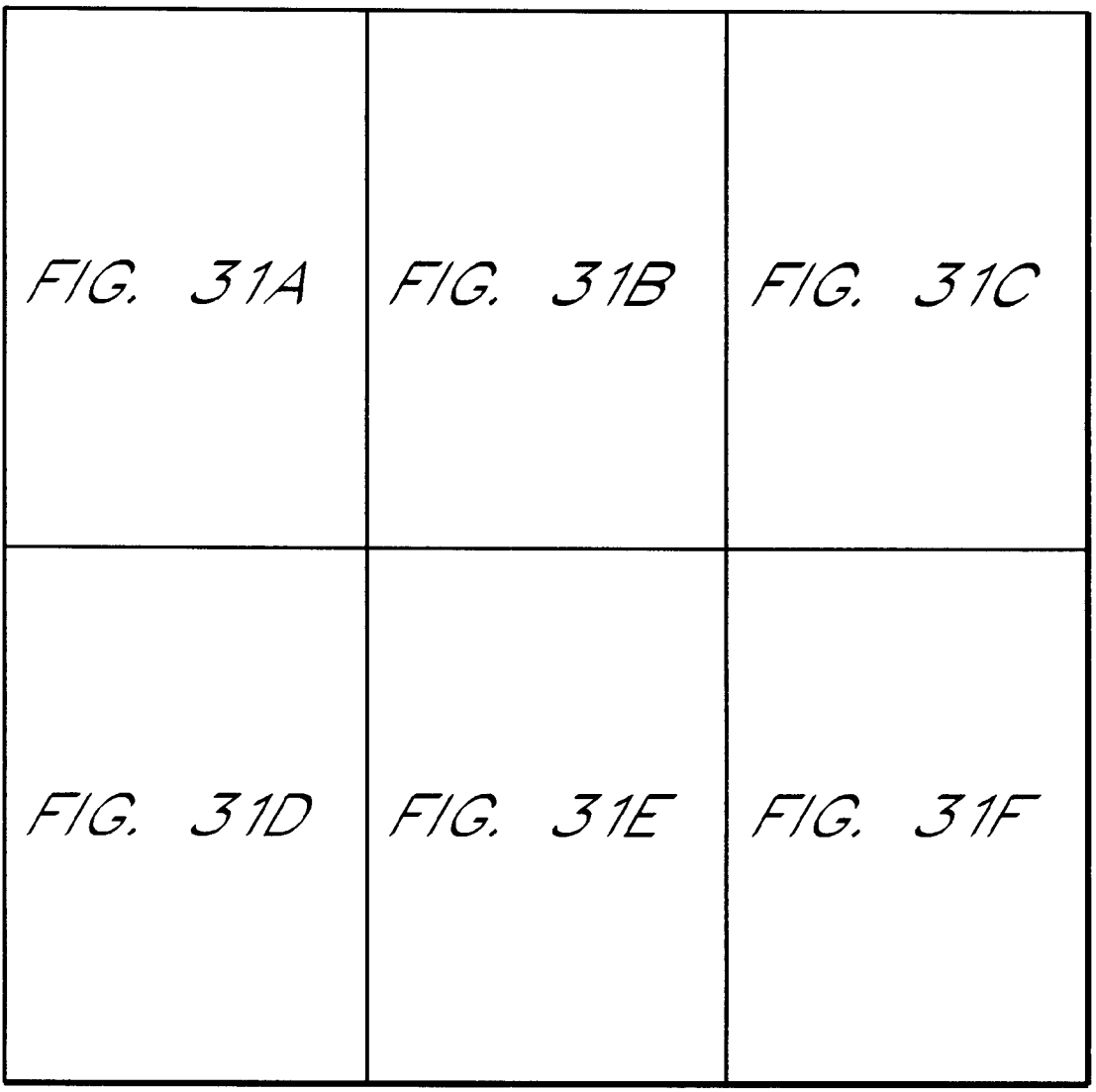
FIG. 31 consists of FIGS. 31A, 31B, 31C, 31D, 31E, and 31F and is a schematic of a motor controller logic.
Figure 31A:
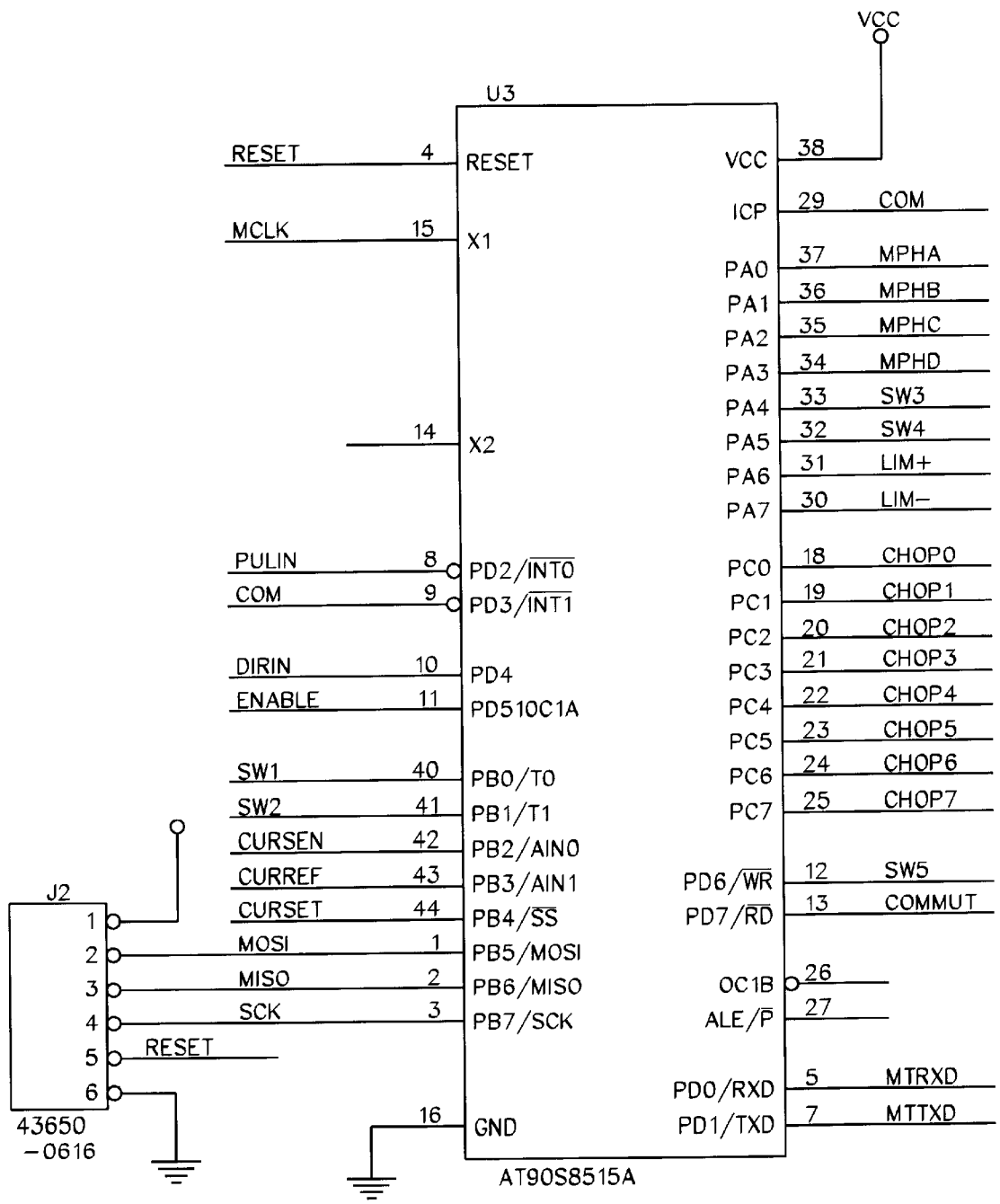
Figure 31B:
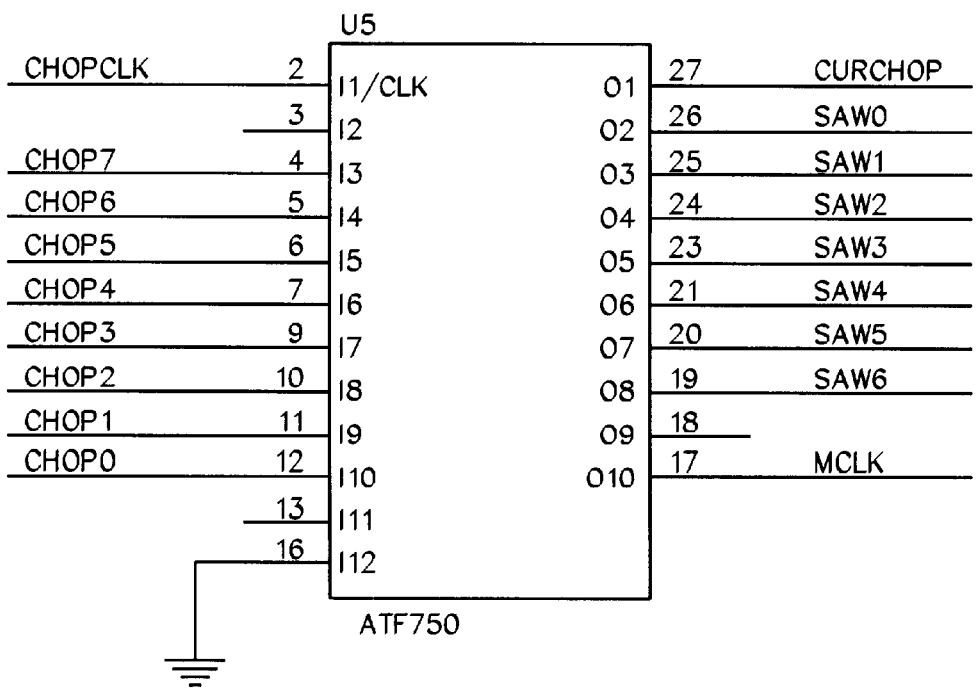
Figure 31B:
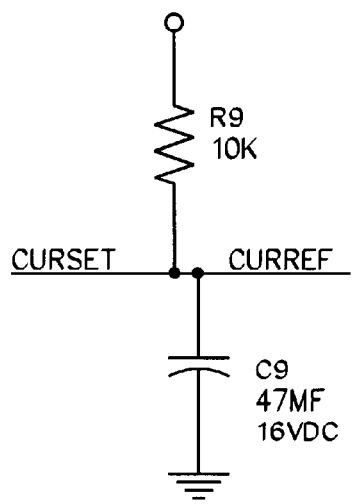
Figure 31C:
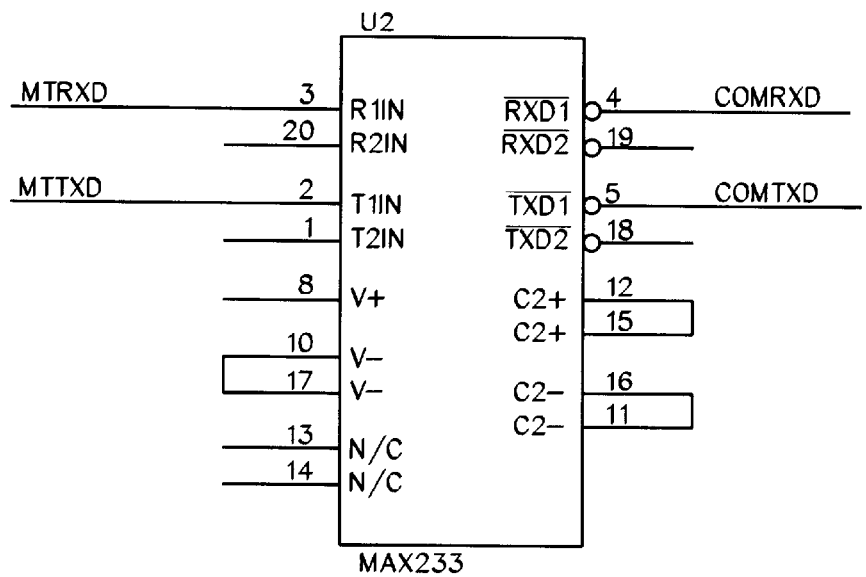
Figure 31C:
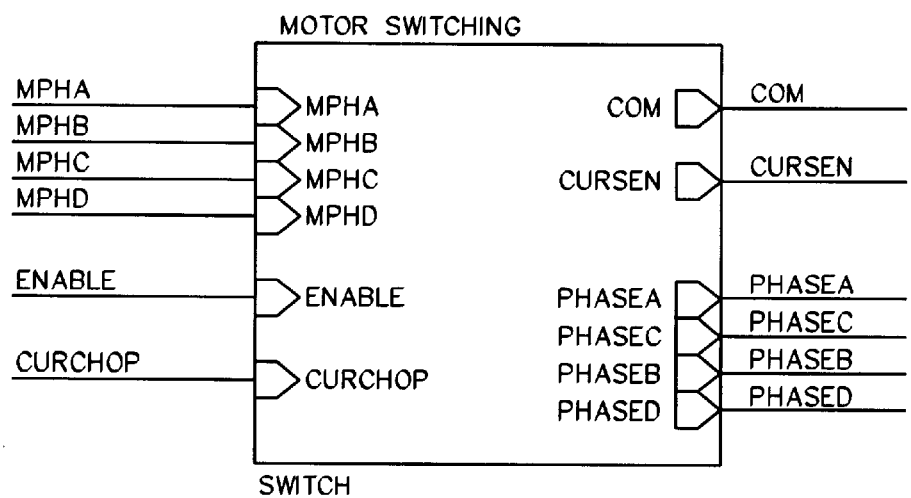
Figure 31C:
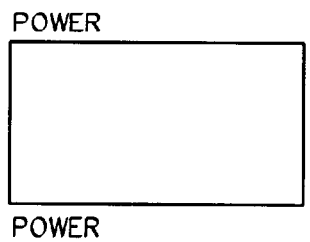
Figure 31D:
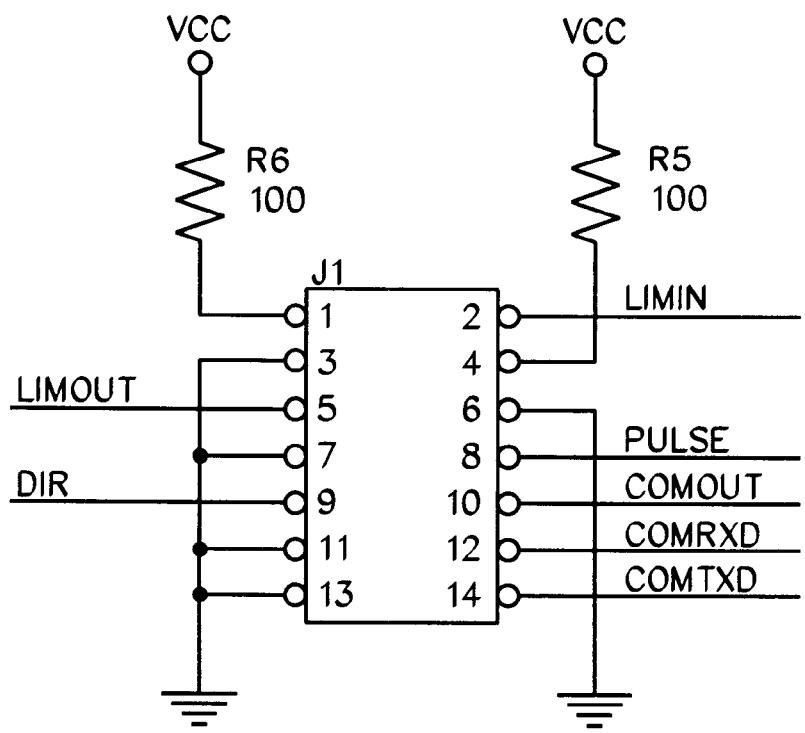
Figure 31D:
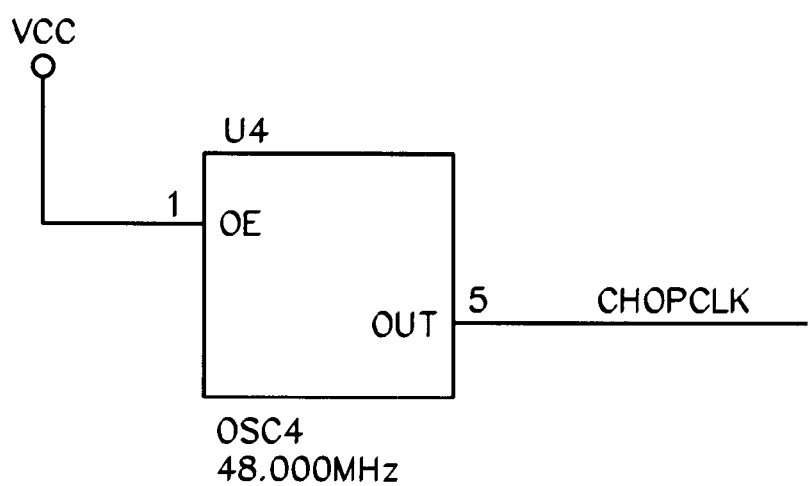
Figure 31E:
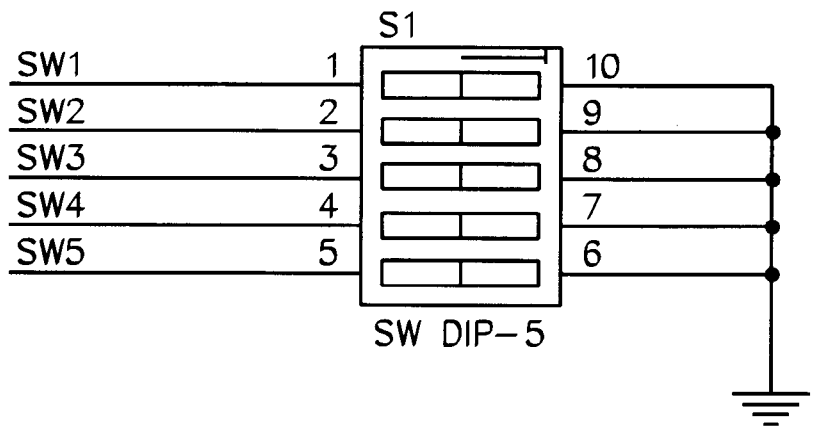
Figure 31E:
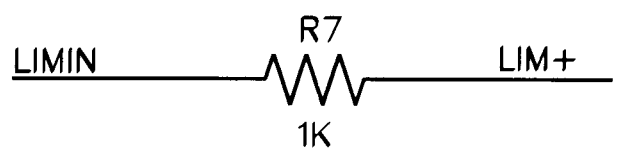
Figure 31E:
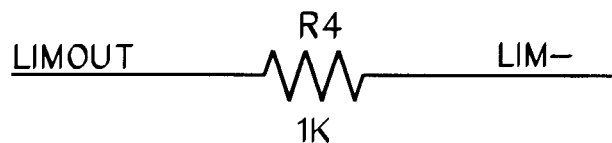
Figure 31E:
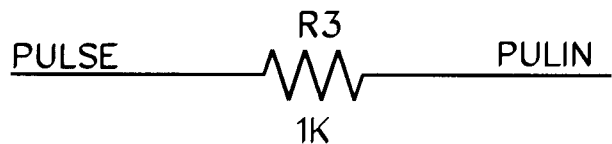
Figure 31E:
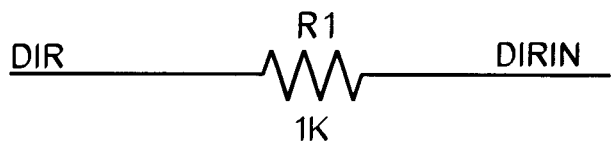
Figure 31E:
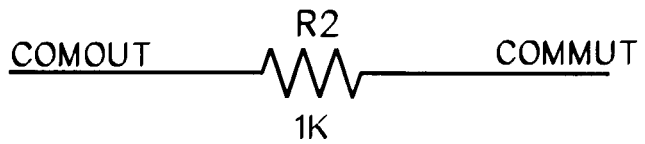
Figure 31F:
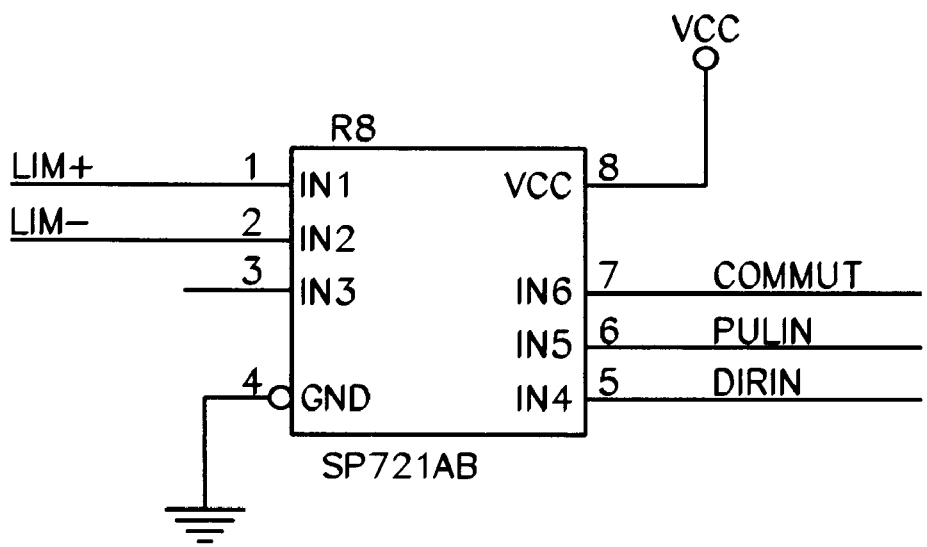
Figure 31F:
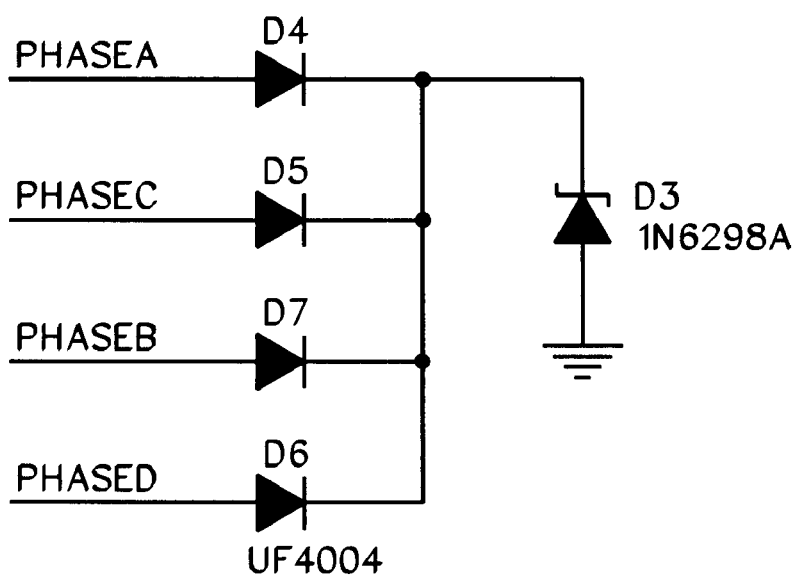
Figure 32:
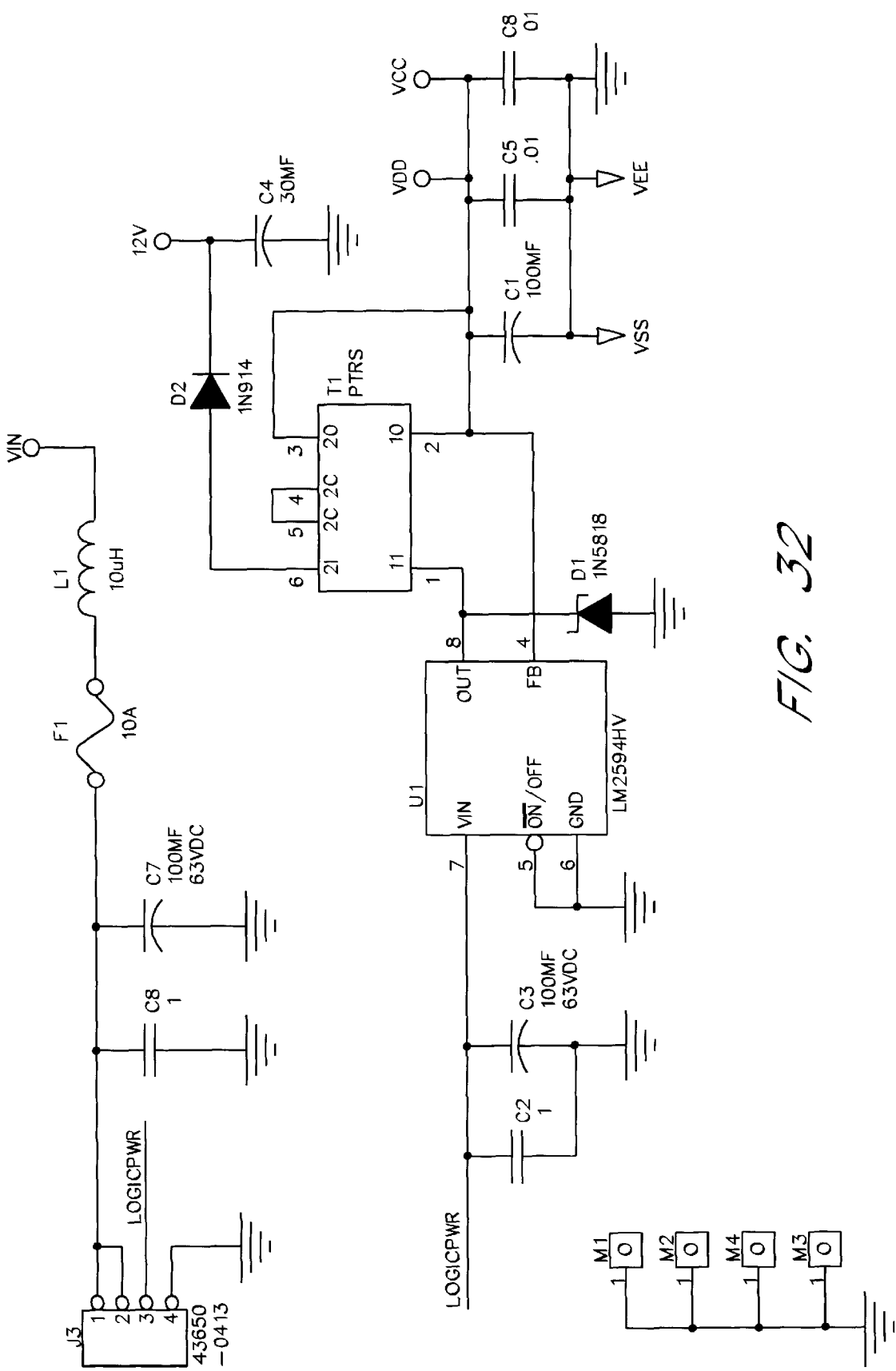
FIG. 32 is a schematic of a low voltage buck regulator circuit.

FIG. 28 includes waveforms that illustrate a relationship between sequencing and commutation while a motor is hunting. Motor sequencing is shown as a positive edge 1 of waveform A. Commutation is shown as a negative edge 2 of waveform A. Commutation time from sequencing is shown increasing as shown by interval 3 and decreasing as shown by interval 4. The motor velocity as provided by an external tachometer is shown in a waveform 6. The commutation position between sequences is shown as of a waveform 5. A line 7 corresponds to the average communication position and average velocity.

FIG. 29, FIG. 30, FIG. 31, FIG. 32, and FIG. 33 correspondingly illustrate other embodiments according to the invention of a motor controller, a motor controller logic, a motor controller logic, a low voltage buck regulator circuit, and a motor switching and sensing circuit, respectively.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

A goal of a point-to-point motor controller is to start a stepper motor from a stopped position, to accelerate the motor to a fixed sequence rate or to an uncontrolled sequence rate, and then to decelerate the motor back to a stopped position. Preferably, the motor stops precisely where it was intended to move. The elapsed time to make the move, the smoothness of the move, the cost of the system, and the power requirements of the system are all design considerations. In addition, starting a motor that uses EMF commutation generally requires accelerating the motor to a sequence rate that provides a reliable EMF signal. Depending on the motor, on the load, on the friction, on the inertia, and on the coupling stiffness, the initial timing of the sequences used to start a motor can be subject to a relatively wide range of variability.

Figure 34B:
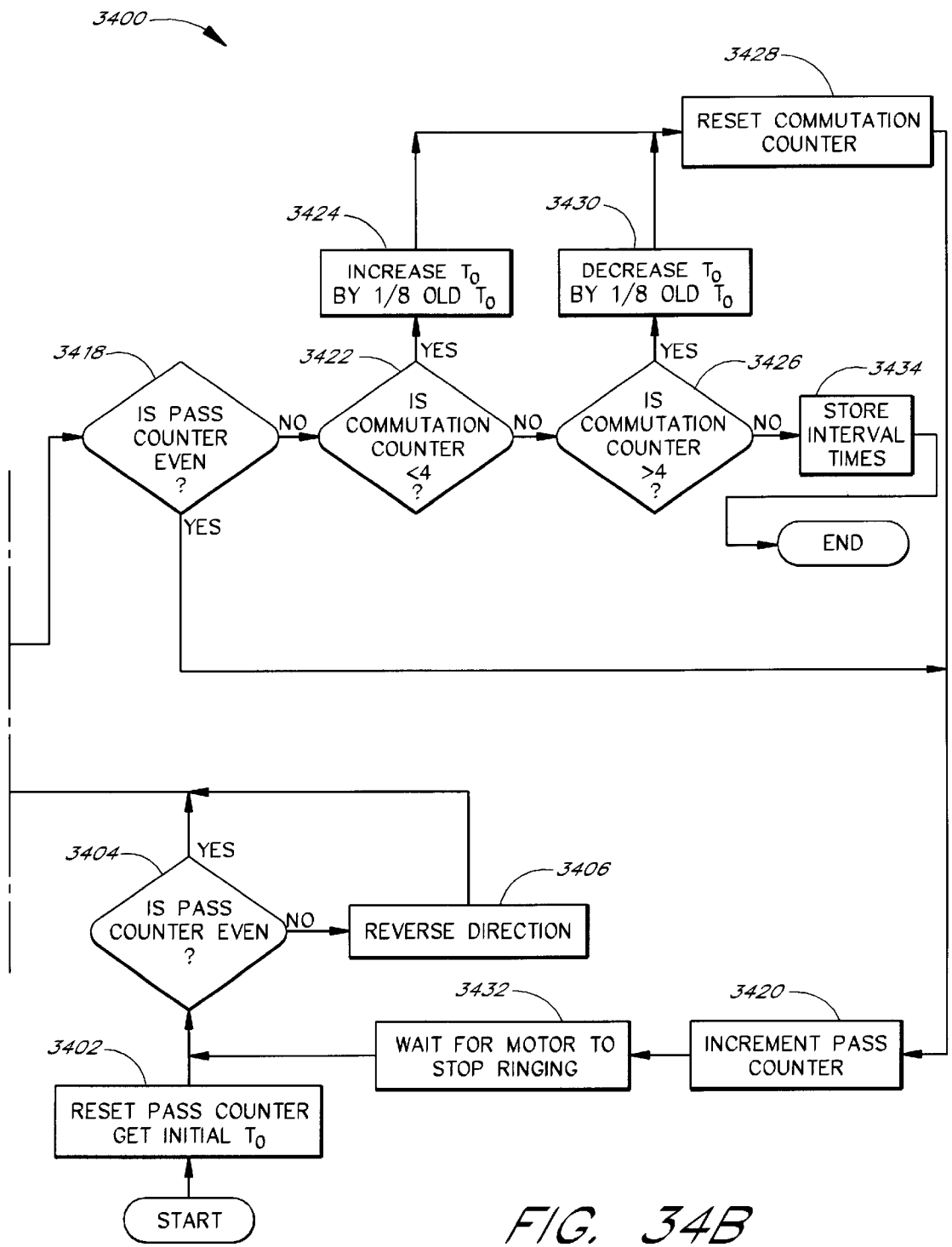
FIG. 34 consists of FIGS. 34A and 34B and illustrates an alternative embodiment of a process for efficiently determining an initial starting sequence timing for a motor.
Figure 35:
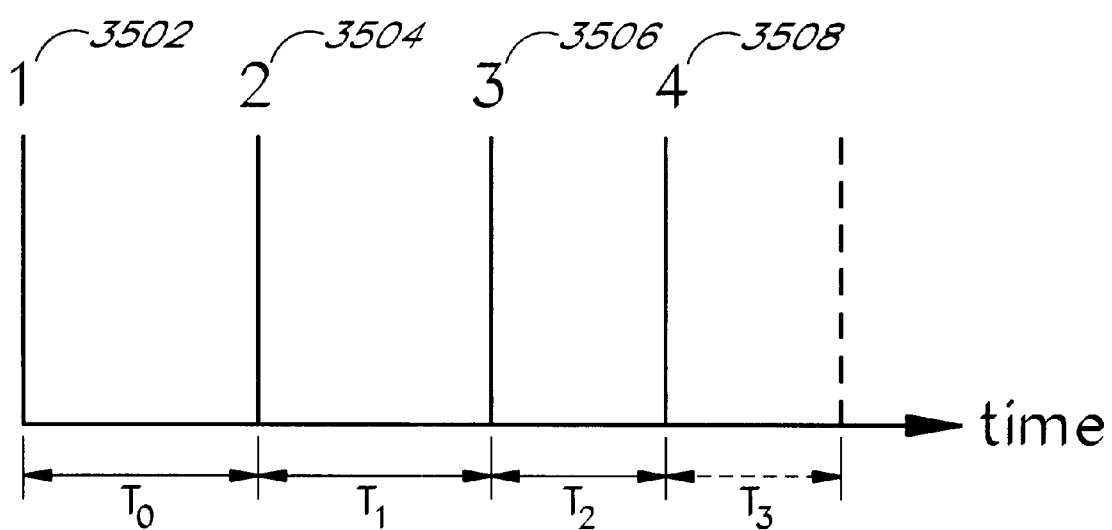
FIG. 35 illustrates the time intervals between sequencing of the motor.

FIG. 34 (comprising FIGS. 34A and 34B) illustrates an alternative embodiment of a process 3400 for efficiently determining an initial starting sequence timing for a motor 150. FIG. 35 is a timing diagram of start sequences. Determining starting sequence times for reliable starts with a given load and coupling stiffness has traditionally been difficult to resolve and subject to extensive trial and error experimentation, computer simulation, or both. The process described herein advantageously determines starting time sequences for a wide variety of motors and loads by testing and monitoring the response of a PWM commutation signal with respect to selected variations in timing.

The process generates an efficient timing pattern that can be used to start a stopped motor that is under closed-loop EMF commutation control. The illustrated process determines when to sequence the motor 150 during a start. FIG. 35 illustrates the time intervals between sequencing of the motor 150. A horizontal axis in FIG. 35 indicates time. A first sequencing 3502, a second sequencing 3504, a third sequencing 3506, and a fourth sequencing 3508 are indicated by vertical lines. Time intervals T0, T1, and T2 are indicated along the horizontal axis. A first time interval T0 corresponds to the elapsed time between the first sequencing 3502 of the motor 150 and the second sequencing 3504 (and similar) of the motor 150. A second time interval T1 corresponds to the elapsed time between the second sequencing 3504 of the motor 150 and the third sequencing 3506 of the motor 150. A third time interval T2 corresponds to the elapsed time between the third sequencing 3506 of the motor 150 and the fourth sequencing 3508 of the motor 150. It will be understood by one of ordinary skill in the art that the number of times that a motor is sequenced during a start sequence can vary in a broad range.

The process 3400 in FIG. 34 monitors the PWM commutation signal 235a described earlier in connection with FIG. 8 during the second time interval T1 and the third time interval T2. A commutation counter tracks how many times the PWM commutation signal 235a is activated within the second time interval T1 and within the third time interval T2. For example, the commutation counter can reach a count of 0, 1, 2 or more of the activations of the PWM commutation signal 235a within a time interval. After the motor 150 is started once in each direction, the process reads the contents of the commutation counter.

An indication of a relatively good timing pattern occurs when the contents of the commutation counter equals 4 or when there is one activation for the PWM commutation signal 235a in each time period for both directions. If the count stored in the commutation counter is less than 4, the sequence time intervals are increased by a predetermined amount, such as by a proportional increase of one-eighth (⅛). If the count stored in the commutation counter is greater than 4, the sequence times are reduced by a predetermined amount, such as by a proportional decrease of one-eighth (⅛). Of course, other values can also be used. After the process adjusts the starting time intervals T0, T1 and T2, the motor 150 is started again in both directions, and the process repeats the counting of activations of the PWM commutation signal 235a. When the count stored in commutation counter equals 4, the process stops. The starting time intervals T0, T1, and T2 are stored as the initial sequence time intervals and used for future starts of the motor 150.

The process 3400 starts at a step 3402, where the process receives the value of the first time interval T0 and initializes the contents of variables by, for example, resetting to zero. In one embodiment, the first value used for the first time interval T0 is predetermined. A pass counter counts each pass or loop through the process. The process advances from the step 3402 to a decision block 3404.

In the decision block 3404, the process evaluates whether the count stored in the pass counter is even or is odd. In the first pass through the process, the count is reset to zero, which is considered even. If the count is even, the process proceeds from the decision block 3404 to the step 130 to sequence the motor 150. If the count is odd, the process proceeds from the decision block 3404 to a step 3406, and the process subsequently proceeds to the step 130 to sequence the motor 150 in a direction opposite to the direction taken in the prior pass or loop through the process.

The process advances from the step 130 to the housekeeping step 140 described earlier in connection with FIG. 26. In the housekeeping step 140, the process obtains the next sequence phase. The process advances from the housekeeping step 140 to a step 3408. In the step 3408, the process computes the value of the second time interval T1 and the value of the third time interval T2 based on the value of the first time interval T0 used for the particular iteration of the process through the step 3408. The value of the first time interval T0 is adjusted later in the process. In one embodiment, the value of the second time interval T1 is equal to the value of the first time interval T0, the value of the third time interval T2 is set to about seventy-five percent (75%) of the value of the first time interval T0, and a value of a fourth time interval T3 is equal to the value of the third time interval T2. The process advances from the step 3408 to an initialize pulse timer step 135.

In the initialize pulse timer step 135, the process initializes a pulse timer with the appropriate time interval value from the step 3408. The process advances from the initialize pulse timer step 135 to a decision block 120, where the process waits until the pulse timer times out. If the process is waiting for the pulse timer to time out, the process advances from the decision block 120 to a decision block 3410. When the pulse timer times out, the output 135a of the pulse timer is activated, and the process proceeds from the decision block 120 to a decision block 3416.

In the decision block 3410, the process determines whether the interval that is being timed out by the pulse timer corresponds to the first time interval T0. If the interval is the first time interval T0, the process returns from the decision block 3410 to the decision block 120 and waits for the pulse timer to time out. The process proceeds from the decision block 3410 to the decision block 3412 if the interval is other than the first time interval T0.

In the decision block 3412, the process inspects the first commutation signal 160a of the commutation detection circuit 160 to determine whether the commutation detection circuit 160 has detected a 135 EMF phase angle from the motor 150. The process proceeds from the decision block 3412 to an increment commutation counter step 3414 if the first commutation signal 160a indicates that the 135 EMF phase angle has been reached. Otherwise, the process returns from the decision block 3412 to the decision block 120.

In the increment commutation counter step 3414, the process increments a counter that counts the number of detections of the 135 EMF phase angle. The process returns from the increment commutation counter step 3414 to the decision block 120.

In the decision block 3416, the process determines whether the interval that is being timed out by the pulse timer corresponds to the third time interval T2. If the interval is the third time interval T2, the process proceeds from the decision block 3416 to a decision block 3418. Otherwise, the process proceeds from the decision block 3416 to the step 130 to sequence the motor 150, and the process waits for the corresponding time interval for the next iteration.

In the decision block 3418, which is reached only after the third time interval T2, the process evaluates whether the count stored in the pass counter is even or is odd. If the count is even, the process has only tested the start time intervals in one direction. The process proceeds from the decision block 3418 to a step 3420 if the count is even. If the count is odd, the process has tested start time intervals in both directions and proceeds from the decision block 3418 to a decision block 3422.

In the step 3420, the process increments the count stored in the pass counter and advances to a wait step 3432. The incrementing of the count in the pass counter toggles the least significant bit of the pass counter, which results in the process reversing the direction of the rotation of the motor 150 via the decision block 3404.

In the decision block 3422, the process evaluates the count stored in the commutation counter, which is updated in the increment commutation counter step 3414. If the count has a value of 0, 1, 2, or 3, the process proceeds from the decision block 3422 to an increase step 3424. Otherwise, the process proceeds from the decision block 3422 to a decision block 3426.

In the increase step 3424, the process increases the first time interval T0 by a predetermined amount. In one embodiment, the predetermined amount is about one-eighth (⅛) of the first time interval T0. Other predetermined amounts can by selected, such as one-sixteenth (1/16) of the first time interval T0. The process advances from the increase step 3424 to a reset step 3428.

In the decision block 3426, the process evaluates the count stored in the commutation counter. The process proceeds to a decrease step 3430 if the count has a value of greater than 4. If the count is not greater than 4, i.e., is 4, then the values of the starting time intervals T0, T1 and T2 generated by the process are stored for future starts in a store interval times step 3434, and the process ends. In one embodiment, only one of the interval times is stored, such as the first time interval T0, as the remaining interval times can be computed from the first time interval T0.

In the decrease step 3430, the process decreases the first time interval T0 by a predetermined amount. In one embodiment, the predetermined amount is about one-eighth (⅛) of the previous first time interval T0. Other predetermined amounts can by selected, such as one-sixteenth (1/16) of the previous first time interval T0. The process advances from the decrease step 3430 to the reset step 3428.

In the reset step 3428, the process resets the commutation counter, which is incremented in the increment commutation counter step 3414. The process advances from the reset step 3428 to the step 3420.

In the wait step 3432, the process waits to allow the motor 150 to stop ringing. Preferably, the wait step 3432 allows the motor 150 to stop ringing completely. The delay in the wait step 3432 can be a predetermined time delay or can be a variable time delay based on the movement of the motor 150 as detected by observation of the PWM commutation signal 235a. The process advances from the wait step 3432 to the decision block 3404 and continues.

In another embodiment, the number of sequences applied to the motor 150 during a start is increased. For example, an additional sequencing with the fourth time interval T3 can be applied and monitored. The fourth time interval T3 can also be related to a fraction of the first time interval T0.

In another embodiment, the duty cycle of the PWM chopping is varied to provided additional power or decreased power upon a start-up.

What is claimed is:

1. An electromotive force (EMF) detection circuit that provides an indication of a position of a rotor in an electric motor with at least a first unipolar winding and a second unipolar winding, the EMF detection circuit comprising:

a first sense circuit connected to a first transistor and a second transistor, where the first transistor is configured to energize a first portion of the first unipolar winding and the second transistor is configured to energize a second portion of the first unipolar winding, and where the first sense circuit detects a first EMF associated with the first unipolar winding;

a second sense circuit connected to a third transistor and a fourth transistor, where the third transistor is configured to energize a first portion of the second unipolar winding and the fourth transistor is configured to energize a second portion of the second unipolar winding, and where the second sense circuit detects a second EMF associated with the second unipolar winding;

a combiner circuit adapted to generate an output responsive to a difference in the first EMF detected by the first sense circuit and the second EMF detected by the second sense circuit; and a comparator circuit coupled to the output of the combiner circuit, the comparator circuit configured to generate a PWM commutation signal when the electric motor is operated in a PWM mode and to generate a commutation signal corresponding to a first EMF phase when the electric motor is operated in a non-PWM mode, where the comparator circuit is further configured to provide a filtered signal that provides an output that is approximately proportional to displacement of the rotor, rather than to the EMF phase.

2. The EMF detection circuit as defined in claim 1, wherein the first EMF phase is about 135 degrees.

3. The EMF detection circuit as defined in claim 1, wherein the first transistor, the second transistor, the third transistor, and the fourth transistor are metal oxide semiconductor field effect transistors (MOSFETs), where a drain of the first transistor is connected to a first terminal of the first winding and a drain of the second transistor is connected to a second terminal of the first winding, where a source of the first transistor and a source of the second transistor are connected together and to the first sense circuit, where a drain of the third transistor is connected to a first terminal of the second winding and a drain of the fourth transistor is connected to a second terminal of the second winding, and where a source of the third transistor and a source of the fourth transistor are connected together and to the second sense circuit.

4. The EMF detection circuit as defined in claim 1, wherein:

the first sense circuit comprises a first winding of a transformer;

the second sense circuit comprises a second transformer winding of the transformer, where the second transformer winding has approximately the same number of turns as the first transformer winding, and where the second transformer winding is connected in opposite polarity to the second unipolar winding than the connection of the first transformer winding to the first motor winding; and the combiner circuit comprises a third transformer winding inductively coupled to the first transformer winding and the second transformer winding, and where the third transformer winding generates the output of the combiner circuit at output terminals of the third transformer winding.

5. The EMF detection circuit as defined in claim 4, wherein the third transformer winding includes a center tap, which is connected to a reference voltage source.

6. The EMF detection circuit as defined in claim 4, wherein the third transformer winding has about 10 times the number of turns of the first winding.

7. The EMF detection circuit as defined in claim 1, wherein the first sense circuit, the second sense circuit, and the combiner circuit emulate a response of a transformer with at least three windings, where the first sense circuit and the second sense circuit correspond to a first winding and a second winding of the emulated transformer, where the second winding is out-of-phase with respect to the first winding, where a winding ratio between the first winding and the second winding is approximately unity, and where the combiner circuit emulates a third winding inductively coupled to the first winding and to the second winding.

8. The EMF detection circuit as defined in claim 1, further comprising a feedback circuit around the comparator, where the feedback circuit includes a low-pass filter, and where an output of the low-pass filter is the filtered signal.

9. The EMF detection circuit as defined in claim 8, wherein the low-pass filter has a time constant of about 0.002 seconds to about 0.0002 seconds.

10. The EMF detection circuit as defined in claim 1, wherein the electric motor is a stepper motor.

11. An electromotive force (EMF) detection circuit that provides an indication of a position of a rotor in an electric motor with at least a first bipolar winding and a second bipolar winding, the EMF detection circuit comprising:

a first sense circuit connected in series with a first transistor of a first leg of a first H-bridge, where the first H-bridge energizes the first bipolar winding of the electric motor, and where the first sense circuit is configured to detect a first EMF associated with the first bipolar winding when the first leg of the first H-bridge is active;

a second sense circuit connected in series with a second transistor of a second leg of the first H-bridge, where the second sense circuit is in-phase with the first sense circuit, where the second sense circuit is configured to detect the first EMF associated with the first bipolar winding when the second leg of the first H-bridge is active, and where the second sense circuit generates approximately equal output as the first sense circuit in response to an approximately equal amount of EMF detected;

a third sense circuit connected in series with a third transistor of a third leg of a second H-bridge, where the second H-bridge energizes the second bipolar winding of the electric motor, where the third sense circuit is configured to detect a second EMF associated with the second bipolar winding when the third leg is active, where the third sense circuit is out-of-phase with respect to the first sense circuit, and where the third sense circuit generates approximately equal output as the first sense circuit in response to an approximately equal amount of EMF detected between the first EMF and the second EMF;

a fourth sense circuit connected in series with a fourth transistor of a fourth leg of the second H-bridge, where the fourth sense circuit is out-of-phase with respect to the first sense circuit, where the fourth sense circuit is configured to detect the second EMF associated with the second bipolar winding when the fourth leg of the second H-bridge is active, and where the fourth sense circuit generates approximately equal output as the first sense circuit in response to an approximately equal amount of EMF detected;

a combiner circuit adapted to generate an output responsive to a difference in the first EMF and the second EMF, where the first EMF is detected by summing outputs of the first sense circuit and the second sense circuit, and the second EMF is detected summing outputs of the third sense circuit and the fourth sense circuit; and a comparator circuit coupled to the output of the combiner circuit, the comparator circuit configured to generate a PWM commutation signal when the electric motor is operated in a PWM mode and to generate a commutation signal corresponding to a first EMF phase when the electric motor is operated in a non-PWM mode, where the comparator circuit is further configured to provide a filtered signal that provides an output that is approximately proportional to displacement of the rotor, rather than to the EMF phase.

12. The EMF detection circuit as defined in claim 11, wherein the first EMF phase is about 135 degrees.

13. The EMF detection circuit as defined in claim 11, wherein the first transistor, the second transistor, the third transistor, and the fourth transistor are metal oxide semiconductor field effect transistors (MOSFETs), where a drain of the first transistor is connected to a first terminal of the first winding and a drain of the second transistor is connected to a second terminal of the first winding, where a source of the first transistor is connected to the first sense circuit and a source of the second transistor is connected to the second sense circuit, where a drain of the third transistor is connected to a first terminal of the second winding and a drain of the fourth transistor is connected to a second terminal of the second winding, and where a source of the third transistor is connected to the third sense circuit and a source of the fourth transistor is connected to the fourth sense circuit.

14. The EMF detection circuit as defined in claim 11, wherein:

the first sense circuit comprises a first winding of a transformer, where the first winding is connected in series with the first leg of the first H-bridge;

the second sense circuit comprises a second transformer winding of the transformer, where the second transformer winding is connected in series with the second leg of the first H-bridge, where the second transformer winding has approximately the same number of turns as the first transformer winding, and where the second transformer winding is connected in-phase with the first transformer winding;

the third sense circuit comprises a third transformer winding of the transformer, where the third transformer winding is connected in series with the third leg of the second H-bridge, where the third transformer winding has approximately the same number of turns as the first transformer winding, and where the third transformer winding is connected out-of-phase with respect to the first transformer winding;

the fourth sense circuit comprises a fourth transformer winding of the transformer, where the fourth transformer winding is connected in series with the fourth leg of the second H-bridge, where the fourth transformer winding has approximately the same number of turns as the first transformer winding, and where the fourth transformer winding is connected out-of-phase with respect to the first transformer winding; and the combiner circuit comprises a fifth transformer winding inductively coupled to the first transformer winding, the second transformer winding, the third transformer winding, and the fourth transformer winding, and where the fifth transformer winding generates the output of the combiner circuit at output terminals of the fifth transformer winding.

15. The EMF detection circuit as defined in claim 14, wherein the fifth transformer winding includes a center tap, which is connected to a reference voltage source.

16. The EMF detection circuit as defined in claim 14, wherein the fifth transformer winding has about 10 times the number of turns of the first winding.

17. The EMF detection circuit as defined in claim 11, wherein the first sense circuit, the second sense circuit, the third sense circuit, the fourth sense circuit, and the combiner circuit emulate a response of a transformer with at least five windings, where the first sense circuit, the second sense circuit, the third sense circuit, and the fourth sense circuit correspond to a first winding, a second winding, a third winding, and a fourth winding, respectively, of the emulated transformer, where the second winding of the emulated transformer is in-phase with respect to the first winding, where the third winding and the fourth winding are out-of-phase with respect to the first winding, where a winding ratio among the first winding, the second winding, the third winding, and the fourth winding is approximately unity, and where the combiner circuit emulates a fifth winding inductively coupled to the first winding, to the second winding, to the third winding, and to the fourth winding.

18. The EMF detection circuit as defined in claim 11, further comprising a feedback circuit around the comparator, where the feedback circuit includes a low-pass filter, and where an output of the low-pass filter is the filtered signal.

19. The EMF detection circuit as defined in claim 18, wherein the low-pass filter has a time constant of about 0.002 seconds to about 0.0002 seconds.

20. The EMF detection circuit as defined in claim 11, wherein the electric motor is a stepper motor.

21. A method of generating a sense signal for an electric motor with a first bipolar winding and a second bipolar winding, the method comprising:

detecting a first electromotive force (EMF) from the first bipolar winding by monitoring current flowing through a first leg of a first H-bridge, where the first H-bridge activates the first bipolar winding and by monitoring current flowing through a second leg of the first H-bridge;

detecting a second EMF from the second bipolar winding by monitoring current flowing through a third leg of a second H-bridge, and by monitoring current flowing through a fourth leg of a second H-bridge; where the second H-bridge activates the second bipolar winding; and combining the first EMF with the second EMF to generate the sense signal, where such combining combines the second EMF out-of-phase with respect to the first EMF.

22. The method as defined in claim 21, further comprising low-pass filtering the sense signal to a filtered signal.

23. The method as defined in claim 21, wherein a time constant of the low-pass filtering is about 0.002 seconds to about 0.0002 seconds.

24. The method as defined in claim 21, further comprising using a transformer with at least three windings to detect the first EMF, to detect the second EMF, and to combine the first EMF with the second EMF, wherein:

detecting the first EMF further comprises coupling the current flowing through the first leg of the first H-bridge to a first transformer winding and coupling the current flowing through the second leg of the first H-bridge to a second transformer winding, where the second transformer winding has approximately the same number of turns as the first transformer winding, and where the first EMF coupled to the second transformer winding is in-phase with the first EMF coupled to the first transformer winding;

detecting the second EMF further comprises coupling the current flowing through the third leg of the second H-bridge to a third transformer winding and coupling the current flowing through the fourth leg of the second H-bridge to a fourth transformer winding, where the third transformer winding and the fourth transformer winding both have approximately the same number of turns as the first transformer winding, and where the second EMF coupled to the third transformer winding and to the fourth transformer winding is out-of-phase with respect to the first EMF coupled to the first transformer winding; and combining of the first EMF with the second EMF further comprises inductively coupling the first transformer winding, the second transformer winding, the third transformer winding, and the fourth transformer winding to a fifth transformer winding.

25. The method as defined in claim 21, further comprising using the sense signal to control a pulse-width modulation (PWM) signal when the current to the motor is chopped in accordance with a pulse width modulator, and using the sense signal to control a commutation signal, which is used at least in part to control a sequencing of the motor, when the motor is not operated in accordance with a pulse modulator.

26. A method of controlling hunting in an electric motor, comprising:

sequencing the motor by applying a voltage to at least one winding;

sensing a commutation of the motor in response to the voltage applied to the at least one winding;

determining a current time interval between the sequencing and the commutation;

comparing the current time interval with a previous time interval between a previous sequencing and a previous commutation to determine a time interval difference; and applying the interval difference as feedback to a motor control circuit, the motor control circuit responsive to the time interval difference to reduce hunting of the motor.

27. The method as defined in claim 26, wherein the time interval difference is used to change the sequencing time.

28. The method as defined in claim 26, wherein the time interval difference is used to back sequence the motor.

29. The method as defined in claim 26, wherein the time interval difference is used to control the voltage applied to the motor.

30. A method of controlling the power applied to an electric motor, comprising:

sequencing the motor by applying a voltage to at least one winding;

sensing a commutation of the motor in response to the voltage applied to the at least one winding;

determining a time interval between the sequencing and the commutation; and adjusting the voltage in response to the time interval.

31. A method of commutating an electric motor while pulse width modulating a drive to the motor, the method further comprising:

determining from a monitored time whether to activate a sequencing of the motor, where the monitored time is allocated to an "on" time and an "off" time, where the "on" time corresponds to a first period of time when sequencing of the motor is enabled and where the "off" time corresponds to a second period of time when sequencing of the motor is disabled;

receiving a commutation signal;

setting a set commutation signal in response to the receiving of the commutation signal just before the monitored time corresponds to the "off" time;

waiting for the monitored time to correspond to the "off" time when the commutation signal is received when the monitored time corresponds to the "on" time;

waiting for a setting of the set commutation signal;

waiting for a pulse in response to the setting of the set commutation signal;

providing the sequencing signal in response to receiving the pulse;

sequencing the motor in response to the sequencing signal and to the monitored time; and activating a pulse timer in response to the sequencing signal.

32. The method as described in claim 31, wherein the commutation signal is provided by an electromotive force (EMF) detection circuit.

33. The method as described in claim 31, wherein the commutation signal is provided by an optical encoder.

34. The method as described in claim 31, wherein the pulse is generated in response to a time-out of the pulse timer.

35. The method as described in claim 31, wherein the pulse is generated by a pulse generator.

36. The method as described in claim 31, wherein the "off time" is fixed at approximately 50 microseconds.

37. A method of controlling an output power of an electric motor comprising:

computing a desired commutation time, where the desired commutation time approximately corresponds to a time when a first EMF phase signal is desired to be detected;

waiting for an activation of a commutation signal, where the commutation signal corresponds to the first EMF phase;

receiving the activation of the commutation signal;

measuring an actual time of the activation of the commutation signal;

storing the actual time;

comparing the desired commutation time to the actual time;

waiting for a timing pulse, where the timing pulse is related to a desired speed of the motor;

sequencing the motor in response to receiving the timing pulse; and adjusting a direct current power supply to the motor in response to the comparison between the desired commutation time and the actual time.

38. The method as described in claim 37, wherein the first EMF phase is approximately 135 degrees of EMF phase.

39. The method as described in claim 37, wherein the commutation signal is provided by an electromotive force (EMF) detection circuit.

40. The method as described in claim 37, wherein the commutation signal is provided by an optical encoder.

41. The method as described in claim 37, wherein the pulse is generated in response to a time-out of the pulse timer.

42. The method as described in claim 37, wherein the pulse is generated by a pulse generator.

43. A method of controlling hunting in an electric motor, the method comprising:

waiting for an activation of a commutation signal, where the commutation signal corresponds to a predetermined EMF phase;

receiving the activation of the commutation signal;

removing power applied to windings of the electric motor in response to the activation of the commutation signal;

waiting for a timing pulse, where the timing pulse is related to a desired speed of the motor;

applying power to the motor by sequencing the motor in response to receiving the timing pulse; and activating a pulse timer in response to sequencing the motor.

44. The method as described in claim 43, wherein the predetermined EMF phase is approximately 135 degrees.

45. The method as described in claim 43, wherein the commutation signal is provided by an electromotive force (EMF) detection circuit.

46. The method as described in claim 43, wherein the commutation signal is provided by an optical encoder.

47. The method as described in claim 43, wherein the pulse is generated in response to a time-out of the pulse timer.

48. The method as described in claim 43, wherein the pulse is generated by a pulse generator.

49. A method of controlling hunting in an electric motor, the method comprising:

waiting for an activation of a commutation signal, where the commutation signal corresponds to a predetermined EMF phase;

receiving the activation of the commutation signal;

measuring a commutation time, where the commutation time is a time from sequencing to the activation of the commutation signal;

adding an offset to the commutation time;

storing the commutation time into an anti-hunt timer;

activating the anti-hunt timer;

waiting for a time-out of the anti-hunt timer;

waiting for a timing pulse, where the timing pulse is related to a desired speed of the motor;

applying power to the motor by sequencing the motor in response to receiving the timing pulse;

activating a pulse timer in response to sequencing the motor; and subtracting the commutation time from a time of the sequence, and storing the result of the subtraction to the offset.

50. The method as described in claim 49, wherein the predetermined EMF phase is approximately 135 degrees.

51. The method as described in claim 49, wherein the commutation signal is provided by an electromotive force (EMF) detection circuit.

52. The method as described in claim 49, wherein the commutation signal is provided by an optical encoder.

53. The method as described in claim 49, wherein the pulse is generated in response to a time-out of the pulse timer.

54. The method as described in claim 49, wherein the pulse is generated by a pulse generator.

55. A method of controlling hunting in an electric motor, the method comprising:

maintaining a clock time;

waiting for an activation of a commutation signal, where the commutation signal corresponds to a predetermined EMF phase;

receiving the activation of the commutation signal;

storing the clock time as a commutation time in response to the activation of the commutation signal;

computing a sequence-to-commutation time, where the sequence-to-commutation time is the commutation time minus a prior sequence time;

computing a rate, where the rate is the sequence-to-commutation time minus a last commutation time;

adding the rate to a pulse timer if the rate is negative;

storing the sequence-to-commutation time to the last commutation time;

waiting for a timing pulse, where the timing pulse is generated in response to a time-out of the pulse timer;

sequencing the motor in response to receiving the timing pulse;

activating a pulse timer in response to sequencing the motor; and storing the clock time as the sequence time in response to sequencing the motor.

56. The method as described in claim 55, wherein the predetermined EMF is approximately 135 degrees.

57. The method as described in claim 55, wherein the commutation signal is provided by an electromotive force (EMF) detection circuit.

58. The method as described in claim 55, wherein the commutation signal is provided by an optical encoder.

59. A method of detecting an out of synchronization condition in an electric motor, the method comprising:

waiting for an activation of a commutation signal, where the commutation signal corresponds to a predetermined EMF phase;

receiving the activation of the commutation signal;

waiting for a timing pulse, where the timing pulse is related to a desired speed of the motor;

storing a value of a sync register, where the sync register stores an indication of a difference between a first number of activations of the commutation signal detected and a second number of timing pulses detected from a time of a prior sequencing;

sequencing the motor in response to receiving the timing pulse;

activating a pulse timer in response to sequencing the motor;

determining a time from a prior sequencing; and providing an alert of the out of synchronization condition when the sync register does not correspond to a reset value, and resetting the sync register to the reset value after providing the alert.

60. The method as described in claim 59, wherein the predetermined EMF phase is approximately 135 degrees.

61. The method as described in claim 59, further comprising:

reading a content of a counter as the sync register;

incrementing the counter in a first direction in response to a detection of a timing pulse and incrementing the counter in a second direction in response to a detection of an activation of the commutation signal, where the second direction is opposite to the first direction; and resetting the sync register by resetting the counter to zero.

62. The method as described in claim 59, further comprising providing an alert of a stall where the time from the prior sequencing exceeds a predetermined time.

63. The method as described in claim 59, wherein the reset value is zero.

64. The method as described in claim 59, wherein the commutation signal is provided by an electromotive force (EMF) detection circuit.

65. The method as described in claim 59, wherein the commutation signal is provided by an optical encoder.

66. The method as described in claim 59, wherein the pulse is generated in response to a time-out of the pulse timer.

67. The method as described in claim 59, wherein the pulse is generated by a pulse generator.

68. A method of synchronizing a plurality of electric motors that are not mechanically coupled, the method comprising:

detecting that a first commutation signal has been activated from each of the plurality of synchronized motors, where the activation of the first commutation signal corresponds to a first predetermined EMF phase;

waiting for a pulse timer to time out after the first commutation signal has been detected for each of the plurality of synchronized motors;

sequencing each of the plurality of motors in response to the time-out of the pulse timer; and activating the pulse timer in response to the sequencing of the plurality of motors.

69. The method as described in claim 68, wherein the first predetermined EMF phase is approximately 135 degrees.

70. The method as described in claim 68, further comprising:

detecting that a second commutation signal has been activated from any of the plurality of synchronized motors, where the activation of the second commutation signal corresponds to a second predetermined EMF phase; and immediately sequencing the plurality of electric motors in response to the detection of the second commutation signal.

71. The method as described in claim 68, wherein the first predetermined phase is approximately 135 degrees and the second predetermined EMF phase is approximately 315 degrees.

72. The method as described in claim 68, wherein the commutation signal is provided by an electromotive force (EMF) detection circuit.

73. The method as described in claim 68, wherein the commutation signal is provided by an optical encoder.

74. A method of synchronizing a plurality of electric motors that are not mechanically coupled, the plurality of electric motors including a master motor and at least one slave motor, the method comprising:

sequencing the master motor at least partially in response to a commutation signal from the master motor;

counting the sequencing of the master motor in a first count;

counting a sequencing of the slave motor in a second count;

comparing the first count to the second count; and sequencing the slave motor at least partially in response to a commutation signal from the slave motor and a comparison between the first count and the second count.

75. The method as defined in claim 74, wherein the slave motor comprises a plurality of slave motors.

76. The method as defined in claim 74, wherein at least one slave motor of the plurality of motors has a separate motor controller, the method further comprising providing the first count to the at least one slave motor.

77. The method as defined in claim 74, wherein the counting of the sequencing is performed by incrementing a counter in response to a sequencing.

78. The method as defined in claim 74, wherein the plurality of motors are synchronized to maintain an absolute phase relationship, the method further comprising:

detecting a complete revolution of the master motor;

detecting a complete revolution of the slave motor; and wherein the comparing of the first count to the second count is in response to a detection of the complete revolution of the master motor and the detection of the complete revolution of the slave motor.

79. The method as defined in claim 78, wherein at least one slave motor of the plurality of motors has a separate motor controller, the method further comprising providing the first count to the at least one slave motor in response to the detection of the complete revolution of the master motor.

80. A process for automatically starting an electric motor comprising:

preparing the motor to be sequenced with a first starting sequence;

sequencing the motor in accordance with the first starting sequence;

preparing the motor to be sequenced with a second starting sequence;

loading a pulse timer with a first predetermined time;

activating the pulse timer;

waiting for a time-out of the pulse timer;

sequencing the motor in accordance with the second starting sequence in response to the time-out of the pulse timer;

preparing the motor to be sequenced with a third starting sequence;

activating the pulse timer;

waiting for the time-out of the pulse timer;

sequencing the motor in accordance with the third starting sequence in response to the time-out of the pulse timer;

preparing the motor to be sequenced with a fourth starting sequence;

loading a pulse timer with a second predetermined time;

sequencing the motor in accordance with the fourth starting sequence in response to the time-out of the pulse timer;

preparing the motor to be sequenced with a fifth starting sequence;

waiting for an activation of a subsequent commutation signal, where the commutation signal corresponds to a predetermined EMF phase;

measuring an elapsed time between the sequencing of the motor in accordance with the fourth starting sequence and the activation of the subsequent commutation signal;

ending the starting process when the elapsed time is less than a third predetermined time; and restarting the starting process with a new value for the first predetermined time when the elapsed time is greater than or equal to the third predetermined time.

81. The starting process as defined in claim 80, wherein the predetermined EMF phase is approximately 135 degrees.

82. The starting process as defined in claim 80, wherein the third predetermined time is the second predetermined time.

83. The starting process as defined in claim 80, wherein the second predetermined time is in a range of about 65% to about 85% of the first predetermined time.

84. The starting process as defined in claim 80, wherein the second predetermined time is in a range of about 70% to about 80% of the first predetermined time.

85. The starting process as defined in claim 80, wherein the second predetermined time is about 75% of the first predetermined time.

86. The starting process as defined in claim 80, further comprising loading the pulse timer with a fourth predetermined time after sequencing the motor in accordance with the second starting sequence.

87. The process as defined in claim 80, wherein preparing the motor to be sequenced comprises retrieving a sequence from a phase table.

88. A process of detecting an error in stopping an electric motor comprising:

(a) sequencing the motor, where the sequencing corresponds to a last sequencing commanded by a motor controller to stop the motor;

(b) detecting a first activation of a commutation signal, where the commutation signal corresponds to a predetermined EMF phase;

(c) measuring a first elapsed time, where the first elapsed time is from a time of the sequencing of the motor to a time of the detection of the first activation of the commutation signal;

(d) detecting a new activation of the commutation signal;

(e) measuring a second elapsed time, where the second elapsed time is from a time of a preceding activation of the commutation signal to a time of the new activation of the commutation signal;

(f) comparing the first elapsed time to the second elapsed time; and (g) providing an error indicating that the motor is not holding to a detent position when the second elapsed time is less than a predetermined multiple of the first elapsed time.

89. The process as defined in claim 88, wherein the predetermined EMF phase is approximately 135 degrees.

90. The process as defined in claim 88, wherein the predetermined multiple is three.

91. The process as defined in claim 88, further comprising:

storing the second elapsed time to the first elapsed time for a subsequent iteration through the process;

maintaining a count of errors detected in (g); and returning to (d).

92. The process as defined in claim 88, further comprising storing the second elapsed time to the first elapsed time for a subsequent iteration through the process;

maintaining a count of ringing, where the count of ringing increments when the second elapsed time is greater than or equal to the predetermined multiple of the first elapsed time; and returning to (d).

93. A process of detent-zero positioning a motor with substantially reduced ringing, the method comprising:

(a) sequencing the motor;

(b) waiting for an activation of a first commutation signal;

(c) determining whether a modified commutation mode is enabled;

(d) preparing the motor for sequencing with a forward sequence phase if the modified commutation mode is enabled;

(e) preparing the motor for sequencing with a reverse sequence phase if the modified commutation mode is not enabled;

(f) sequencing the motor;

(g) comparing a rate of the activations of the first commutation signal to a predetermined rate;

(h) waiting a first elapsed time if the rate of the activations of the commutation signal is lower than the predetermined rate;

(i) preparing the motor for sequencing with a stop phase;

(j) sequencing the motor (k) ending the process where the rate of the activations exceeds the predetermined rate;

(l) waiting for a second elapsed time; and (m) returning to (b).

94. The process as defined in claim 93, further comprising:

determining whether the motor is moving in a direction selected from a forward direction and a reverse direction;

determining whether a desired direction to apply motor torque lies in the a direction selected from the forward direction and the reverse direction;

detecting an activation of the first commutation signal corresponding to about a 135-degree EMF phase in response to a first edge of a commutation signal and detecting an activation of the second commutation signal corresponding to about a 315-degree EMF phase in response to a second edge of the commutation signal when the motor is moving in the forward direction and the desired direction is the forward direction;

detecting the activation of the first commutation signal corresponding to about a 135-degree EMF phase in response to the first edge of the commutation signal and detecting the activation of the second commutation signal corresponding to about a 315-degree EMF phase in response to the second edge of the commutation signal when the motor is moving in the reverse direction and the desired direction is the reverse direction;

detecting the activation of the first commutation signal corresponding to about a 135-degree EMF phase in response to the second edge of the commutation signal and detecting the activation of the second commutation signal corresponding to about a 315-degree EMF phase in response to the first edge of the commutation signal when the motor is moving in the forward direction and the desired direction is the reverse direction; and detecting the activation of the first commutation signal corresponding to about a 135-degree EMF phase in response to the second edge of the commutation signal and detecting the activation of the second commutation signal corresponding to about a 315-degree EMF phase in response to the first edge of the commutation signal when the motor is moving in the reverse direction and the desired direction is the forward direction.

95. A method of detent-zero positioning with substantially reduced ringing, the method comprising:

(a) sequencing the motor;

(b) converting a commutation signal from analog to digital to detect a first commutation signal;

(c) waiting for an activation of the first commutation signal;

(d) determining whether the first commutation signal is detected higher than a predetermined level;

(e) preparing the motor for sequencing with a forward sequence phase when the first commutation signal is detected higher than the predetermined level;

(f) preparing the motor for sequencing with a reverse sequence phase when the first commutation signal is not detected higher than the predetermined level;

(g) sequencing the motor;

(h) waiting a first elapsed time;

(i) preparing the motor for sequencing with a stop phase;

(j) sequencing the motor (k) waiting for a second elapsed time; and (l) returning to (c).

96. The process as defined in claim 95, further comprising:

determining whether the motor is moving in a direction selected from a forward direction and a reverse direction;

determining whether a desired direction to apply motor torque lies in the a direction selected from the forward direction and the reverse direction;

detecting an activation of a first commutation signal corresponding to about a 135-degree EMF phase in response to a first edge of a commutation signal and detecting an activation of the second commutation signal corresponding to about a 315-degree EMF phase in response to a second edge of the commutation signal when the motor is moving in the forward direction and the desired direction is the forward direction;

detecting the activation of the first commutation signal corresponding to about a 135-degree EMF phase in response to the first edge of the commutation signal and detecting the activation of the second commutation signal corresponding to about a 315-degree EMF phase in response to the second edge of the commutation signal when the motor is moving in the reverse direction and the desired direction is the reverse direction;

detecting the activation of the first commutation signal corresponding to about a 135-degree EMF phase in response to the second edge of the commutation signal and detecting the activation of the second commutation signal corresponding to about a 315-degree EMF phase in response to the first edge of the commutation signal when the motor is moving in the forward direction and the desired direction is the reverse direction; and detecting the activation of the first commutation signal corresponding to about a 135-degree EMF phase in response to the second edge of the commutation signal and detecting the activation of the second commutation signal corresponding to about a 315-degree EMF phase in response to the first edge of the commutation signal when the motor is moving in the reverse direction and the desired direction is the forward direction.

97. An electromotive force (EMF) detection circuit that generates a sense signal for an electric motor with a first unipolar winding and a second unipolar winding, the EMF detection circuit comprising:

means for detecting a first EMF from the first unipolar winding by monitoring current flowing through the first unipolar winding;

means for detecting a second EMF from the second unipolar winding by monitoring current flowing the second unipolar winding; and means for combining the first EMF with the second EMF to generate the sense signal, where such combining combines the second EMF out-of-phase with respect to the first EMF.

98. An electromotive force (EMF) detection circuit that generates a sense signal for an electric motor with a first bipolar winding and a second bipolar winding, the EMF detection circuit comprising:

means for detecting a first EMF from the first bipolar winding by monitoring current flowing through a first leg of a first H-bridge, where the first H-bridge activates the first bipolar winding and by monitoring current flowing through a second leg of the first H-bridge;

means for detecting a second EMF from the second bipolar winding by monitoring current flowing through a third leg of a second H-bridge, and by monitoring current flowing through a fourth leg of a second H-bridge; where the second H-bridge activates the second bipolar winding; and means for combining the first EMF with the second EMF to generate the sense signal, where such combining combines the second EMF out-of-phase with respect to the first EMF.

* * * * *

UNITED STATES PATENT AND TRADEMARK OFFICE
CERTIFICATE OF CORRECTION

PATENT NO. : 6,586,898 B2
DATED : July 1, 2003
INVENTOR(S) : Kenyon M. King

It is certified that error appears in the above-identified patent and that said Letters Patent is hereby corrected as shown below:

Title page,
Item [*] Notice, "Subject to any disclaimer, the term of this patent is extended or adjusted under 35 U.S.C. 154(b) by 6 days." should read -- Subject to any disclaimer, the term of this patent is extended or adjusted under 35 U.S.C. 154(b) by 41 days --

Signed and Sealed this

Twelfth Day of October, 2004

JON W. DUDAS
*Director of the United States Patent and Trademark Office*